United States Patent
Richard et al.

(10) Patent No.: US 12,466,864 B2
(45) Date of Patent: Nov. 11, 2025

(54) PRODUCTION OF LARGE-SIZED QUASIDYSTROPHINS USING OVERLAPPING AAV VECTORS

(71) Applicants: GENETHON, Evry-Courcouronnes (FR); INSERM (INSTITUT NATIONAL DE LA SANTE ET DE LA RECHERCHE MEDICALE), Paris (FR); UNIVERSITE D'EVRY-VAL-D'ESSONNE, Evry-Courcouronnes (FR)

(72) Inventors: Isabelle Richard, Corbeil Essonnes (FR); William Lostal, Savigny sur Orge (FR)

(73) Assignees: GENETHON, Evry-Courcouronnes (FR); INSERM (INSTITUT NATIONAL DE LA SANTE ET DE LA RECHERCHE MEDICALE), Paris (FR); UNIVERSITE D'EVRY-VAL-D'ESSONNE, Evry-Courcouronnes (FR)

( * ) Notice: Subject to any disclaimer, the term of this patent is extended or adjusted under 35 U.S.C. 154(b) by 1041 days.

(21) Appl. No.: 17/593,285

(22) PCT Filed: Mar. 25, 2020

(86) PCT No.: PCT/EP2020/058372
§ 371 (c)(1),
(2) Date: Sep. 14, 2021

(87) PCT Pub. No.: WO2020/193636
PCT Pub. Date: Oct. 1, 2020

(65) Prior Publication Data
US 2022/0204574 A1    Jun. 30, 2022

(30) Foreign Application Priority Data
Mar. 25, 2019    (EP) .................................... 19305377

(51) Int. Cl.
*C12N 15/86*    (2006.01)
*A61K 35/76*    (2015.01)
(Continued)

(52) U.S. Cl.
CPC .......... *C07K 14/4708* (2013.01); *A61K 35/76* (2013.01); *A61P 21/00* (2018.01);
(Continued)

(58) Field of Classification Search
CPC ..... C07K 14/4708; A61P 21/00; A61K 35/76; C12N 5/0652; C12N 15/86
See application file for complete search history.

(56) References Cited

U.S. PATENT DOCUMENTS

| 6,156,303 A | 12/2000 | Russell et al. |
| 7,282,199 B2 | 10/2007 | Gao et al. |

FOREIGN PATENT DOCUMENTS

| EP | 3749771 | 12/2020 |
| WO | WO 03/042397 | 5/2003 |

(Continued)

OTHER PUBLICATIONS

Crawford et al., J Cell Biol (2000) 150(6): 1399-1410 (Year: 2000).*

(Continued)

*Primary Examiner* — Evelyn Y Pyla
*Assistant Examiner* — Katherine R Small
(74) *Attorney, Agent, or Firm* — KNOBBE, MARTENS, OLSON & BEAR, LLP

(57) ABSTRACT

The present invention concerns a quasidystrophin (QD) having the structure CH1CH2H1R1R2R3H2R8R9 in its N-terminal part and advantageously further comprising the (Continued)

R16 and R17 rod domains, as well as the dual AAV vector system which allows producing it.

10 Claims, 9 Drawing Sheets

Specification includes a Sequence Listing.

(51) Int. Cl.
  *A61P 21/00* (2006.01)
  *C07K 14/47* (2006.01)
  *C12N 5/077* (2010.01)
  *A61K 38/00* (2006.01)

(52) U.S. Cl.
  CPC ............ *C12N 5/0652* (2013.01); *C12N 15/86* (2013.01); *A61K 38/00* (2013.01); *C12N 2750/14143* (2013.01); *C12N 2750/14145* (2013.01); *C12N 2750/14171* (2013.01)

(56) References Cited

FOREIGN PATENT DOCUMENTS

| WO | WO 2005/033321 A2 | 4/2005 |
|----|-------------------|--------|
| WO | WO 2008/088895 A2 | 7/2008 |
| WO | WO 2016/177911    | 11/2016 |
| WO | WO 2019/193119    | 10/2019 |

OTHER PUBLICATIONS

Crawford et al., The Journal of Cell Biology (2000) 150: 1399-1409 (Year: 2000).*
Coley et al., "Effect of genetic background on the dystrophicphenotype in mdx mice", Hum Mol Genet Jan. 1, 2016;25(1):130-45.
Decrouy et al., "Mini-dystrophin gene transfer in mdx4cv diaphragm-muscle fibers increases sarcolemmal stability", Gene Ther May 1997;4(5):401-8.
Dumont et al., "Dystrophin expression in muscle stem cells regulatestheir polarity and asymmetric division", Nat Med Dec. 2015;21(12):1455-63.
Ervasti, "Dystrophin, its interactions with other proteins, andimplications for muscular dystrophy", Biochim Biophys Acta Feb. 2007;1772(2):108-17.
Foster et al., "Codon and mRNA sequence optimization ofmicrodystrophin transgenes improves expressionand physiological outcome in dystrophic mdx micefollowing AAV2/8 gene transfer", Mol Ther Nov. 2008;16(11):1825-32.
Jarmin et al., "New developments in the use of gene therapy to treatDuchenne muscular dystrophy", Expert Opin Biol Ther. Feb. 2014;14(2):209-30.
Kodippili et al., "Dual AAV Gene Therapy for Duchenne MuscularDystrophy with a 7-kb Mini-Dystrophin Gene in theCanine Model", Hum Gene Ther. Mar. 2018;29(3):299-311.
Koo et al., "Long-term functional adeno-associated virus-microdystrophin expression in the dystrophic CXMDjdog", J Gene Med. Sep. 2011;13(9):497-506.
Lai et al., "Dystrophins carrying spectrin-like repeats 16 and 17anchor nNOS to the sarcolemma and enhanceexercise performance in a mouse model of musculardystrophy", J Clin Invest. Mar. 2009;119(3):624-35.
Lai et al., "Evidence for the failure of adeno-associated virus-serotype 5 to package a viral genome > or = 8.2 kb", Mol. Ther. Jan. 2010;18(1):75-9.
Larcher et al., "Characterization of dystrophin deficient rats: a newmodel for Duchenne muscular dystrophy", PLoS One Oct. 13, 2014;9(10):e110371.
Le Guiner et al., "Forelimb treatment in a large cohort of dystrophicdogs supports delivery of a recombinant AAV forexon skipping in Duchenne patients", Mol Ther. Nov. 2014;22(11):1923-35.
Le Guiner et al., "Long-term microdystrophin gene therapy is effectivein a canine model of Duchenne muscular dystrophy", Nat Commun. Jul. 25, 2017;8:16105.
Moser. "Duchenne muscular dystrophy: pathogenetic aspectsand genetic prevention", Hum Genet. 1984;66(1):17-40.
Muntoni et al., "Dystrophin and mutations: one gene, severalproteins, multiple phenotypes", Lancet Neurol. Dec. 2003;2(12):731-40.
Pryadkina et al., "A comparison of AAV strategies distinguishesoverlapping vectors for efficient systemic delivery ofthe 6.2 kb Dysferlin coding sequence", Mol Ther Methods Clin Dev. Mar. 25, 2015;2:15009.
Rodino-Klapac et al., "Update on the treatment of Duchenne musculardystrophy", Curr Neurol Neurosci Rep. Mar. 2013;13(3):332.
Wang et al., "Limitations of encapsidation of recombinant self-complementary adeno-associated viral genomes indifferent serotype capsids and their quantitation", Hum Gene Ther Methods. Aug. 2012;23(4):225-33.
Yamashita et al., "The 8th and 9th tandem spectrin-like repeats ofutrophin cooperatively form a functional unit tointeract with polarity-regulating kinase PAR-1b", Biochem Biophys Res Commun. Jan. 1, 2010;391(1):812-7.
Yue et al., "C-terminal-truncated microdystrophin recruits dystrobrevin and syntrophin to the dystrophin-associated glycoprotein complex and reduces muscular dystrophy in symptomatic utrophin/dystrophin double knockout mice", Mol Ther Jul. 2006; 14(1):79-87.
Zhang et al., "Dual AAV therapy ameliorates exercise-induced muscle injury and functional ischemia in murine models of Duchenne muscular dystrophy", Human Molecular Genetics, vol. 22, No. 18, May 15, 2013 (May 15, 2013), pp. 3720-3729.
Zhang et al., "Novel Mini-Dystrophin Gene Dual Adena-Associated Virus Vectors Restore Neuronal Nitric Oxide Synthase Expression at the Sarcolemma", Human Gene Therapy, vol. 23, No. 1, Jan. 1, 2012 (Jan. 1, 2012), pp. 98-103.
Zheng et al., "Safety and feasibility of high-pressure transvenous limb perfusion with 0.9% saline in human muscular dystrophy", Mol Ther Feb. 2012;20(2):456-61.
International Search Report issued in application No. PCT/EP2020/058372, dated Jun. 12, 2020.

* cited by examiner hDMD    427 kDa
Quasi OPT 280 kDa
MD1     138 kDa

SEQUENCE LISTING

<160> NUMBER OF SEQ ID NOS: 23

<210> SEQ ID NO 1
<211> LENGTH: 2361
<212> TYPE: PRT
<213> ORGANISM: Artificial Sequence
<220> FEATURE:
<223> OTHER INFORMATION: Synthetic Polypeptide
<220> FEATURE:
<221> NAME/KEY: misc_feature
<223> OTHER INFORMATION: "DD"

<400> SEQUENCE: 1

```
Met Leu Trp Trp Glu Val Glu Asp Cys Tyr Glu Arg Glu Asp Val
1               5                   10                  15

Gln Lys Lys Thr Phe Thr Lys Trp Val Asn Ala Gln Phe Ser Lys Phe
                20                  25                  30

Gly Lys Gln His Ile Glu Asn Leu Phe Ser Asp Leu Gln Asp Gly Arg
            35                  40                  45

Arg Leu Leu Asp Leu Leu Glu Gly Leu Thr Gly Gln Lys Leu Pro Lys
    50                  55                  60

Glu Lys Gly Ser Thr Arg Val His Ala Leu Asn Asn Val Asn Lys Ala
65                  70                  75                  80

Leu Arg Val Leu Gln Asn Asn Asn Val Asp Leu Val Asn Ile Gly Ser
                85                  90                  95

Thr Asp Ile Val Asp Gly Asn His Lys Leu Thr Leu Gly Leu Ile Trp
                100                 105                 110

Asn Ile Ile Leu His Trp Gln Val Lys Asn Val Met Lys Asn Ile Met
            115                 120                 125

Ala Gly Leu Gln Gln Thr Asn Ser Glu Lys Ile Leu Leu Ser Trp Val
        130                 135                 140

Arg Gln Ser Thr Arg Asn Tyr Pro Gln Val Asn Val Ile Asn Phe Thr
145                 150                 155                 160

Thr Ser Trp Ser Asp Gly Leu Ala Leu Asn Ala Leu Ile His Ser His
                165                 170                 175

Arg Pro Asp Leu Phe Asp Trp Asn Ser Val Val Cys Gln Gln Ser Ala
                180                 185                 190

Thr Gln Arg Leu Glu His Ala Phe Asn Ile Ala Arg Tyr Gln Leu Gly
            195                 200                 205

Ile Glu Lys Leu Leu Asp Pro Glu Asp Val Asp Thr Thr Tyr Pro Asp
        210                 215                 220

Lys Lys Ser Ile Leu Met Tyr Ile Thr Ser Leu Phe Gln Val Leu Pro
225                 230                 235                 240

Gln Gln Val Ser Ile Glu Ala Ile Gln Glu Val Glu Met Leu Pro Arg
                245                 250                 255

Pro Pro Lys Val Thr Lys Glu Glu His Phe Gln Leu His His Gln Met
                260                 265                 270

His Tyr Ser Gln Gln Ile Thr Val Ser Leu Ala Gln Gly Tyr Glu Arg
            275                 280                 285

Thr Ser Ser Pro Lys Pro Arg Phe Lys Ser Tyr Ala Tyr Thr Gln Ala
        290                 295                 300

Ala Tyr Val Thr Ser Asp Pro Thr Arg Ser Pro Phe Pro Ser Gln
305                 310                 315                 320

His Leu Glu Ala Pro Glu Asp Lys Ser Phe Gly Ser Ser Leu Met Glu
                325                 330                 335

Ser Glu Val Asn Leu Asp Arg Tyr Gln Thr Ala Leu Glu Glu Val Leu
```

-continued

```
                340                 345                 350
    Ser Trp Leu Leu Ser Ala Glu Asp Thr Leu Gln Ala Gln Gly Glu Ile
                    355                 360                 365

Ser Asn Asp Val Glu Val Val Lys Asp Gln Phe His Thr His Glu Gly
                370                 375                 380

Tyr Met Met Asp Leu Thr Ala His Gln Gly Arg Val Gly Asn Ile Leu
    385                 390                 395                 400

Gln Leu Gly Ser Lys Leu Ile Gly Thr Gly Lys Leu Ser Glu Asp Glu
                    405                 410                 415

Glu Thr Glu Val Gln Glu Gln Met Asn Leu Leu Asn Ser Arg Trp Glu
                420                 425                 430

Cys Leu Arg Val Ala Ser Met Glu Lys Gln Ser Asn Leu His Arg Val
                435                 440                 445

Leu Met Asp Leu Gln Asn Gln Lys Leu Lys Glu Leu Asn Asp Trp Leu
                450                 455                 460

Thr Lys Thr Glu Glu Arg Thr Arg Lys Met Glu Glu Pro Leu Gly
    465                 470                 475                 480

Pro Asp Leu Glu Asp Leu Lys Arg Gln Val Gln Gln His Lys Val Leu
                    485                 490                 495

Gln Glu Asp Leu Glu Gln Glu Gln Val Arg Val Asn Ser Leu Thr His
                500                 505                 510

Met Val Val Val Asp Glu Ser Ser Gly Asp His Ala Thr Ala Ala
                515                 520                 525

Leu Glu Glu Gln Leu Lys Val Leu Gly Asp Arg Trp Ala Asn Ile Cys
                530                 535                 540

Arg Trp Thr Glu Asp Arg Trp Val Leu Leu Gln Asp Ile Leu Leu Lys
    545                 550                 555                 560

Trp Gln Arg Leu Thr Glu Glu Gln Cys Leu Phe Ser Ala Trp Leu Ser
                    565                 570                 575

Glu Lys Glu Asp Ala Val Asn Lys Ile His Thr Thr Gly Phe Lys Asp
                580                 585                 590

Gln Asn Glu Met Leu Ser Ser Leu Gln Lys Leu Ala Val Leu Lys Ala
                595                 600                 605

Asp Leu Glu Lys Lys Lys Gln Ser Met Gly Lys Leu Tyr Ser Leu Lys
                610                 615                 620

Gln Asp Leu Leu Ser Thr Leu Lys Asn Lys Ser Val Thr Gln Lys Thr
    625                 630                 635                 640

Glu Ala Trp Leu Asp Asn Phe Ala Arg Cys Trp Asp Asn Leu Val Gln
                    645                 650                 655

Lys Leu Glu Lys Ser Thr Ala Gln Ile Ser Gln Glu Ile Ser Tyr Val
                660                 665                 670

Pro Ser Thr Tyr Leu Thr Glu Ile Thr His Val Ser Gln Ala Leu Leu
                675                 680                 685

Glu Val Glu Gln Leu Leu Asn Ala Pro Asp Leu Cys Ala Lys Asp Phe
                690                 695                 700

Glu Asp Leu Phe Lys Gln Glu Glu Ser Leu Lys Asn Ile Lys Asp Ser
    705                 710                 715                 720

Leu Gln Gln Ser Ser Gly Arg Ile Asp Ile Ile His Ser Lys Lys Thr
                    725                 730                 735

Ala Ala Leu Gln Ser Ala Thr Pro Val Glu Arg Val Lys Leu Gln Glu
                740                 745                 750

Ala Leu Ser Gln Leu Asp Phe Gln Trp Glu Lys Val Asn Lys Met Tyr
                755                 760                 765
```

```
Lys Asp Arg Gln Gly Arg Phe Asp Arg Ser Val Glu Lys Trp Arg Arg
    770                 775                 780
Phe His Tyr Asp Ile Lys Ile Phe Asn Gln Trp Leu Thr Glu Ala Glu
785                 790                 795                 800
Gln Phe Leu Arg Lys Thr Gln Ile Pro Glu Asn Trp Glu His Ala Lys
                805                 810                 815
Tyr Lys Trp Tyr Leu Lys Glu Leu Gln Asp Gly Ile Gly Gln Arg Gln
                820                 825                 830
Thr Val Val Arg Thr Leu Asn Ala Thr Gly Glu Glu Ile Ile Gln Gln
            835                 840                 845
Ser Ser Lys Thr Asp Ala Ser Ile Leu Gln Glu Lys Leu Gly Ser Leu
    850                 855                 860
Asn Leu Arg Trp Gln Glu Val Cys Lys Gln Leu Ser Asp Arg Lys Lys
865                 870                 875                 880
Arg Leu Glu Glu Gln Lys Asn Ile Leu Ser Glu Phe Gln Arg Asp Leu
                885                 890                 895
Asn Glu Phe Val Leu Trp Leu Glu Glu Ala Asp Asn Ile Ala Ser Ile
                900                 905                 910
Pro Leu Glu Pro Gly Lys Glu Gln Gln Leu Lys Glu Lys Leu Glu Gln
            915                 920                 925
Val Lys Leu Leu Val Glu Glu Leu Pro Leu Arg Gln Gly Ile Leu Lys
    930                 935                 940
Gln Leu Asn Glu Thr Gly Gly Pro Val Leu Val Ser Ala Pro Ile Ser
945                 950                 955                 960
Pro Glu Glu Gln Asp Lys Leu Glu Asn Lys Leu Lys Gln Thr Asn Leu
                965                 970                 975
Gln Trp Ile Lys Val Ser Arg Ala Leu Pro Glu Lys Gln Gly Glu Ile
                980                 985                 990
Glu Ala Gln Ile Lys Asp Leu Gly Gln Leu Glu Lys Lys Leu Glu Asp
            995                 1000                1005
Leu Glu Glu Gln Leu Asn His Leu Leu Leu Trp Leu Ser Pro Ile Arg
    1010                1015                1020
Asn Gln Leu Glu Ile Tyr Asn Gln Pro Asn Gln Glu Gly Pro Phe Asp
1025                1030                1035                1040
Val Gln Glu Thr Glu Ile Ala Val Gln Ala Lys Gln Pro Asp Val Glu
                1045                1050                1055
Glu Ile Leu Ser Lys Gly Gln His Leu Tyr Lys Glu Lys Pro Ala Thr
                1060                1065                1070
Gln Pro Val Lys Arg Lys Leu Glu Asp Leu Ser Ser Glu Trp Lys Ala
            1075                1080                1085
Val Asn Arg Leu Leu Gln Glu Leu Arg Ala Lys Gln Pro Asp Leu Ala
    1090                1095                1100
Pro Gly Leu Thr Thr Ile Gly Ala Ser Pro Thr Gln Thr Val Thr Leu
1105                1110                1115                1120
Val Thr Gln Pro Val Val Thr Lys Glu Thr Ala Ile Ser Lys Leu Glu
                1125                1130                1135
Met Pro Ser Ser Leu Met Leu Glu Val Pro Ala Leu Ala Asp Phe Asn
                1140                1145                1150
Arg Ala Trp Thr Glu Leu Thr Asp Trp Leu Ser Leu Leu Asp Gln Val
            1155                1160                1165
Ile Lys Ser Gln Arg Val Met Val Gly Asp Leu Glu Asp Ile Asn Glu
    1170                1175                1180
```

-continued

```
Met Ile Ile Lys Gln Lys Ala Thr Met Gln Asp Leu Glu Gln Arg Arg
1185                1190                1195                1200

Pro Gln Leu Glu Glu Leu Ile Thr Ala Ala Gln Asn Leu Lys Asn Lys
            1205                1210                1215

Thr Ser Asn Gln Glu Ala Arg Thr Ile Ile Thr Asp Arg Ile Glu Arg
        1220                1225                1230

Ile Gln Asn Gln Trp Asp Glu Val Gln Glu His Leu Gln Asn Arg Arg
    1235                1240                1245

Gln Gln Leu Asn Glu Met Leu Lys Asp Ser Thr Gln Trp Leu Glu Ala
1250                1255                1260

Lys Glu Glu Ala Glu Gln Val Leu Gly Gln Ala Arg Ala Lys Leu Glu
1265                1270                1275                1280

Ser Trp Lys Glu Gly Pro Tyr Thr Val Asp Ala Ile Gln Lys Lys Ile
            1285                1290                1295

Thr Glu Thr Lys Gln Leu Ala Lys Asp Leu Arg Gln Trp Gln Thr Asn
        1300                1305                1310

Val Asp Val Ala Asn Asp Leu Ala Leu Lys Leu Leu Arg Asp Tyr Ser
    1315                1320                1325

Ala Asp Asp Thr Arg Lys Val His Met Ile Thr Glu Asn Ile Asn Ala
1330                1335                1340

Ser Trp Arg Ser Ile His Lys Arg Val Ser Glu Arg Glu Ala Ala Leu
1345                1350                1355                1360

Glu Glu Thr His Arg Leu Leu Gln Gln Phe Pro Leu Asp Leu Glu Lys
            1365                1370                1375

Phe Leu Ala Trp Leu Thr Glu Ala Glu Thr Thr Ala Asn Val Leu Gln
        1380                1385                1390

Asp Ala Thr Arg Lys Glu Arg Leu Leu Glu Asp Ser Lys Gly Val Lys
    1395                1400                1405

Glu Leu Met Lys Gln Trp Gln Asp Leu Gln Gly Glu Ile Glu Ala His
1410                1415                1420

Thr Asp Val Tyr His Asn Leu Asp Glu Asn Ser Gln Lys Ile Leu Arg
1425                1430                1435                1440

Ser Leu Glu Gly Ser Asp Asp Ala Val Leu Leu Gln Arg Arg Leu Asp
            1445                1450                1455

Asn Met Asn Phe Lys Trp Ser Glu Leu Arg Lys Lys Ser Leu Asn Ile
        1460                1465                1470

Arg Ser His Leu Glu Ala Ser Ser Asp Gln Trp Lys Arg Leu His Leu
    1475                1480                1485

Ser Leu Gln Glu Leu Leu Val Trp Leu Gln Leu Lys Asp Asp Glu Leu
1490                1495                1500

Ser Arg Gln Ala Pro Ile Gly Gly Asp Phe Pro Ala Val Gln Lys Gln
1505                1510                1515                1520

Asn Asp Val His Arg Ala Phe Lys Arg Glu Leu Lys Thr Lys Glu Pro
            1525                1530                1535

Val Ile Met Ser Thr Leu Glu Thr Val Arg Ile Phe Leu Thr Glu Gln
        1540                1545                1550

Pro Leu Glu Gly Leu Glu Lys Leu Tyr Gln Glu Pro Arg Glu Leu Pro
    1555                1560                1565

Pro Glu Glu Arg Ala Gln Asn Val Thr Arg Leu Leu Arg Lys Gln Ala
1570                1575                1580

Glu Glu Val Asn Thr Glu Trp Glu Lys Leu Asn Leu His Ser Ala Asp
1585                1590                1595                1600

Trp Gln Arg Lys Ile Asp Glu Thr Leu Glu Arg Leu Gln Glu Leu Gln
```

-continued

```
                1605                1610                1615
Glu Ala Thr Asp Glu Leu Asp Leu Lys Leu Arg Gln Ala Glu Val Ile
            1620                1625                1630
Lys Gly Ser Trp Gln Pro Val Gly Asp Leu Leu Ile Asp Ser Leu Gln
        1635                1640                1645
Asp His Leu Glu Lys Val Lys Ala Leu Arg Gly Glu Ile Ala Pro Leu
    1650                1655                1660
Lys Glu Asn Val Ser His Val Asn Asp Leu Ala Arg Gln Leu Thr Thr
1665                1670                1675                1680
Leu Gly Ile Gln Leu Ser Pro Tyr Asn Leu Ser Thr Leu Glu Asp Leu
            1685                1690                1695
Asn Thr Arg Trp Lys Leu Leu Gln Val Ala Val Glu Asp Arg Val Arg
        1700                1705                1710
Gln Leu His Glu Ala His Arg Asp Phe Gly Pro Ala Ser Gln His Phe
    1715                1720                1725
Leu Ser Thr Ser Val Gln Gly Pro Trp Glu Arg Ala Ile Ser Pro Asn
        1730                1735                1740
Lys Val Pro Tyr Tyr Ile Asn His Glu Thr Gln Thr Thr Cys Trp Asp
1745                1750                1755                1760
His Pro Lys Met Thr Glu Leu Tyr Gln Ser Leu Ala Asp Leu Asn Asn
            1765                1770                1775
Val Arg Phe Ser Ala Tyr Arg Thr Ala Met Lys Leu Arg Arg Leu Gln
        1780                1785                1790
Lys Ala Leu Cys Leu Asp Leu Leu Ser Leu Ser Ala Ala Cys Asp Ala
    1795                1800                1805
Leu Asp Gln His Asn Leu Lys Gln Asn Asp Gln Pro Met Asp Ile Leu
    1810                1815                1820
Gln Ile Ile Asn Cys Leu Thr Thr Ile Tyr Asp Arg Leu Glu Gln Glu
1825                1830                1835                1840
His Asn Asn Leu Val Asn Val Pro Leu Cys Val Asp Met Cys Leu Asn
            1845                1850                1855
Trp Leu Leu Asn Val Tyr Asp Thr Gly Arg Thr Gly Arg Ile Arg Val
        1860                1865                1870
Leu Ser Phe Lys Thr Gly Ile Ile Ser Leu Cys Lys Ala His Leu Glu
    1875                1880                1885
Asp Lys Tyr Arg Tyr Leu Phe Lys Gln Val Ala Ser Ser Thr Gly Phe
    1890                1895                1900
Cys Asp Gln Arg Arg Leu Gly Leu Leu Leu His Asp Ser Ile Gln Ile
1905                1910                1915                1920
Pro Arg Gln Leu Gly Glu Val Ala Ser Phe Gly Gly Ser Asn Ile Glu
            1925                1930                1935
Pro Ser Val Arg Ser Cys Phe Gln Phe Ala Asn Asn Lys Pro Glu Ile
        1940                1945                1950
Glu Ala Ala Leu Phe Leu Asp Trp Met Arg Leu Glu Pro Gln Ser Met
    1955                1960                1965
Val Trp Leu Pro Val Leu His Arg Val Ala Ala Ala Glu Thr Ala Lys
    1970                1975                1980
His Gln Ala Lys Cys Asn Ile Cys Lys Glu Cys Pro Ile Ile Gly Phe
1985                1990                1995                2000
Arg Tyr Arg Ser Leu Lys His Phe Asn Tyr Asp Ile Cys Gln Ser Cys
            2005                2010                2015
Phe Phe Ser Gly Arg Val Ala Lys Gly His Lys Met His Tyr Pro Met
        2020                2025                2030
```

Val Glu Tyr Cys Thr Pro Thr Thr Ser Gly Glu Asp Val Arg Asp Phe
                2035                2040                2045

Ala Lys Val Leu Lys Asn Lys Phe Arg Thr Lys Arg Tyr Phe Ala Lys
            2050                2055                2060

His Pro Arg Met Gly Tyr Leu Pro Val Gln Thr Val Leu Glu Gly Asp
2065                2070                2075                2080

Asn Met Glu Thr Pro Val Thr Leu Ile Asn Phe Trp Pro Val Asp Ser
                2085                2090                2095

Ala Pro Ala Ser Ser Pro Gln Leu Ser His Asp Asp Thr His Ser Arg
            2100                2105                2110

Ile Glu His Tyr Ala Ser Arg Leu Ala Glu Met Glu Asn Ser Asn Gly
        2115                2120                2125

Ser Tyr Leu Asn Asp Ser Ile Ser Pro Asn Glu Ser Ile Asp Asp Glu
            2130                2135                2140

His Leu Leu Ile Gln His Tyr Cys Gln Ser Leu Asn Gln Asp Ser Pro
2145                2150                2155                2160

Leu Ser Gln Pro Arg Ser Pro Ala Gln Ile Leu Ile Ser Leu Glu Ser
                2165                2170                2175

Glu Glu Arg Gly Glu Leu Glu Arg Ile Leu Ala Asp Leu Glu Glu Glu
            2180                2185                2190

Asn Arg Asn Leu Gln Ala Glu Tyr Asp Arg Leu Lys Gln Gln His Glu
        2195                2200                2205

His Lys Gly Leu Ser Pro Leu Pro Ser Pro Pro Glu Met Met Pro Thr
    2210                2215                2220

Ser Pro Gln Ser Pro Arg Asp Ala Glu Leu Ile Ala Glu Ala Lys Leu
2225                2230                2235                2240

Leu Arg Gln His Lys Gly Arg Leu Glu Ala Arg Met Gln Ile Leu Glu
                2245                2250                2255

Asp His Asn Lys Gln Leu Glu Ser Gln Leu His Arg Leu Arg Gln Leu
            2260                2265                2270

Leu Glu Gln Pro Gln Ala Glu Ala Lys Val Asn Gly Thr Thr Val Ser
        2275                2280                2285

Ser Pro Ser Thr Ser Leu Gln Arg Ser Asp Ser Ser Gln Pro Met Leu
    2290                2295                2300

Leu Arg Val Val Gly Ser Gln Thr Ser Asp Ser Met Gly Glu Glu Asp
2305                2310                2315                2320

Leu Leu Ser Pro Pro Gln Asp Thr Ser Thr Gly Leu Glu Glu Val Met
                2325                2330                2335

Glu Gln Leu Asn Asn Ser Phe Pro Ser Ser Arg Gly Arg Asn Thr Pro
            2340                2345                2350

Gly Lys Pro Met Arg Glu Asp Thr Met
        2355                2360

<210> SEQ ID NO 2
<211> LENGTH: 2427
<212> TYPE: PRT
<213> ORGANISM: Artificial Sequence
<220> FEATURE:
<223> OTHER INFORMATION: Synthetic Polypeptide
<220> FEATURE:
<221> NAME/KEY: misc_feature
<223> OTHER INFORMATION: "WL1"

<400> SEQUENCE: 2

Met Leu Trp Trp Glu Glu Val Glu Asp Cys Tyr Glu Arg Glu Asp Val
1               5                   10                  15

```
Gln Lys Lys Thr Phe Thr Lys Trp Val Asn Ala Gln Phe Ser Lys Phe
                 20                  25                  30

Gly Lys Gln His Ile Glu Asn Leu Phe Ser Asp Leu Gln Asp Gly Arg
             35                  40                  45

Arg Leu Leu Asp Leu Leu Glu Gly Leu Thr Gly Gln Lys Leu Pro Lys
 50                  55                  60

Glu Lys Gly Ser Thr Arg Val His Ala Leu Asn Asn Val Asn Lys Ala
 65                  70                  75                  80

Leu Arg Val Leu Gln Asn Asn Val Asp Leu Val Asn Ile Gly Ser
                 85                  90                  95

Thr Asp Ile Val Asp Gly Asn His Lys Leu Thr Leu Gly Leu Ile Trp
             100                 105                 110

Asn Ile Ile Leu His Trp Gln Val Lys Asn Val Met Lys Asn Ile Met
             115                 120                 125

Ala Gly Leu Gln Gln Thr Asn Ser Glu Lys Ile Leu Leu Ser Trp Val
 130                 135                 140

Arg Gln Ser Thr Arg Asn Tyr Pro Gln Val Asn Val Ile Asn Phe Thr
 145                 150                 155                 160

Thr Ser Trp Ser Asp Gly Leu Ala Leu Asn Ala Leu Ile His Ser His
                 165                 170                 175

Arg Pro Asp Leu Phe Asp Trp Asn Ser Val Val Cys Gln Gln Ser Ala
             180                 185                 190

Thr Gln Arg Leu Glu His Ala Phe Asn Ile Ala Arg Tyr Gln Leu Gly
             195                 200                 205

Ile Glu Lys Leu Leu Asp Pro Glu Asp Val Asp Thr Thr Tyr Pro Asp
 210                 215                 220

Lys Lys Ser Ile Leu Met Tyr Ile Thr Ser Leu Phe Gln Val Leu Pro
225                 230                 235                 240

Gln Gln Val Ser Ile Glu Ala Ile Gln Glu Val Glu Met Leu Pro Arg
                 245                 250                 255

Pro Pro Lys Val Thr Lys Glu Glu His Phe Gln Leu His His Gln Met
             260                 265                 270

His Tyr Ser Gln Gln Ile Thr Val Ser Leu Ala Gln Gly Tyr Glu Arg
             275                 280                 285

Thr Ser Ser Pro Lys Pro Arg Phe Lys Ser Tyr Ala Tyr Thr Gln Ala
 290                 295                 300

Ala Tyr Val Thr Thr Ser Asp Pro Thr Arg Ser Pro Phe Pro Ser Gln
305                 310                 315                 320

His Leu Glu Ala Pro Glu Asp Lys Ser Phe Gly Ser Ser Leu Met Glu
                 325                 330                 335

Ser Glu Val Asn Leu Asp Arg Tyr Gln Thr Ala Leu Glu Glu Val Leu
             340                 345                 350

Ser Trp Leu Leu Ser Ala Glu Asp Thr Leu Gln Ala Gln Gly Glu Ile
             355                 360                 365

Ser Asn Asp Val Glu Val Val Lys Asp Gln Phe His Thr His Glu Gly
 370                 375                 380

Tyr Met Met Asp Leu Thr Ala His Gln Gly Arg Val Gly Asn Ile Leu
385                 390                 395                 400

Gln Leu Gly Ser Lys Leu Ile Gly Thr Gly Lys Leu Ser Glu Asp Glu
                 405                 410                 415

Glu Thr Glu Val Gln Glu Gln Met Asn Leu Leu Asn Ser Arg Trp Glu
             420                 425                 430
```

```
Cys Leu Arg Val Ala Ser Met Glu Lys Gln Ser Asn Leu His Arg Val
            435                 440                 445

Leu Met Asp Leu Gln Asn Gln Lys Leu Lys Glu Leu Asn Asp Trp Leu
    450                 455                 460

Thr Lys Thr Glu Glu Arg Thr Arg Lys Met Glu Glu Glu Pro Leu Gly
465                 470                 475                 480

Pro Asp Leu Glu Asp Leu Lys Arg Gln Val Gln Gln His Lys Val Leu
                485                 490                 495

Gln Glu Asp Leu Glu Gln Glu Gln Val Arg Val Asn Ser Leu Thr His
            500                 505                 510

Met Val Val Val Asp Glu Ser Ser Gly Asp His Ala Thr Ala Ala
        515                 520                 525

Leu Glu Glu Gln Leu Lys Val Leu Gly Asp Arg Trp Ala Asn Ile Cys
    530                 535                 540

Arg Trp Thr Glu Asp Arg Trp Val Leu Leu Gln Asp Ile Leu Leu Lys
545                 550                 555                 560

Trp Gln Arg Leu Thr Glu Glu Gln Cys Leu Phe Ser Ala Trp Leu Ser
                565                 570                 575

Glu Lys Glu Asp Ala Val Asn Lys Ile His Thr Thr Gly Phe Lys Asp
            580                 585                 590

Gln Asn Glu Met Leu Ser Ser Leu Gln Lys Leu Ala Val Leu Lys Ala
    595                 600                 605

Asp Leu Glu Lys Lys Lys Gln Ser Met Gly Lys Leu Tyr Ser Leu Lys
            610                 615                 620

Gln Asp Leu Leu Ser Thr Leu Lys Asn Lys Ser Val Thr Gln Lys Thr
625                 630                 635                 640

Glu Ala Trp Leu Asp Asn Phe Ala Arg Cys Trp Asp Asn Leu Val Gln
                645                 650                 655

Lys Leu Glu Lys Ser Thr Ala Gln Ile Ser Gln Ala Val Thr Thr Thr
            660                 665                 670

Gln Pro Ser Leu Thr Gln Thr Thr Val Met Glu Thr Val Thr Thr Val
    675                 680                 685

Thr Thr Arg Glu Gln Ile Leu Val Lys His Ala Gln Glu Glu Leu Pro
690                 695                 700

Pro Pro Pro Pro Gln Lys Lys Arg Gln Ile Thr Val Asp Gly Leu Glu
                705                 710                 715                 720

Lys Thr Val Ser Leu Gln Lys Asp Leu Ser Glu Met His Glu Trp Met
            725                 730                 735

Thr Gln Ala Glu Glu Glu Tyr Leu Glu Arg Asp Phe Glu Tyr Lys Thr
    740                 745                 750

Pro Asp Glu Leu Gln Lys Ala Val Glu Glu Met Lys Arg Ala Lys Glu
            755                 760                 765

Glu Ala Gln Gln Lys Glu Ala Lys Val Lys Leu Leu Thr Glu Ser Val
    770                 775                 780

Asn Ser Val Ile Ala Gln Ala Pro Pro Val Ala Gln Glu Ala Leu Lys
785                 790                 795                 800

Lys Glu Leu Glu Thr Leu Thr Thr Asn Tyr Gln Trp Leu Cys Thr Arg
                805                 810                 815

Leu Asn Gly Lys Cys Lys Thr Leu Glu Glu Val Trp Ala Cys Trp His
            820                 825                 830

Glu Leu Leu Ser Tyr Leu Glu Lys Ala Asn Lys Trp Leu Asn Glu Val
    835                 840                 845

Glu Phe Lys Leu Lys Thr Thr Glu Asn Ile Pro Gly Gly Ala Glu Glu
```

-continued

```
            850                 855                 860
Ile Ser Glu Val Leu Asp Ser Leu Glu Asn Leu Met Arg His Ser Glu
865                 870                 875                 880

Asp Asn Pro Asn Gln Ile Arg Ile Leu Ala Gln Thr Leu Thr Asp Gly
                885                 890                 895

Gly Val Met Asp Glu Leu Ile Asn Glu Leu Glu Thr Phe Asn Ser
            900                 905                 910

Arg Trp Arg Glu Leu His Glu Glu Ala Val Arg Arg Gln Lys Leu Leu
            915                 920                 925

Glu Gln Ile His Thr Val Arg Glu Glu Thr Met Met Val Met Thr Glu
            930                 935                 940

Asp Met Pro Leu Glu Ile Ser Tyr Val Pro Ser Thr Tyr Leu Thr Glu
945                 950                 955                 960

Ile Thr His Val Ser Gln Ala Leu Leu Glu Val Glu Gln Leu Leu Asn
                965                 970                 975

Ala Pro Asp Leu Cys Ala Lys Asp Phe Glu Asp Leu Phe Lys Gln Glu
            980                 985                 990

Glu Ser Leu Lys Asn Ile Lys Asp Ser Leu Gln Gln Ser Ser Gly Arg
            995                 1000                1005

Ile Asp Ile Ile His Ser Lys Lys Thr Ala Ala Leu Gln Ser Ala Thr
    1010                1015                1020

Pro Val Glu Arg Val Lys Leu Gln Glu Ala Leu Ser Gln Leu Asp Phe
1025                1030                1035                1040

Gln Trp Glu Lys Val Asn Lys Met Tyr Lys Asp Arg Gln Gly Arg Phe
                1045                1050                1055

Asp Arg Ser Val Glu Lys Trp Arg Arg Phe His Tyr Asp Ile Lys Ile
            1060                1065                1070

Phe Asn Gln Trp Leu Thr Glu Ala Glu Gln Phe Leu Arg Lys Thr Gln
            1075                1080                1085

Ile Pro Glu Asn Trp Glu His Ala Lys Tyr Lys Trp Tyr Leu Lys Glu
    1090                1095                1100

Leu Gln Asp Gly Ile Gly Gln Arg Gln Thr Val Val Arg Thr Leu Asn
1105                1110                1115                1120

Ala Thr Gly Glu Glu Ile Ile Gln Gln Ser Ser Lys Thr Asp Ala Ser
                1125                1130                1135

Ile Leu Gln Glu Lys Leu Gly Ser Leu Asn Leu Arg Trp Gln Glu Val
            1140                1145                1150

Cys Lys Gln Leu Ser Asp Arg Lys Lys Arg Leu Glu Glu Gln Pro Asp
            1155                1160                1165

Leu Ala Pro Gly Leu Thr Thr Ile Gly Ala Ser Pro Thr Gln Thr Val
    1170                1175                1180

Thr Leu Val Thr Gln Pro Val Val Thr Lys Glu Thr Ala Ile Ser Lys
1185                1190                1195                1200

Leu Glu Met Pro Ser Ser Leu Met Leu Glu Val Pro Ala Leu Ala Asp
                1205                1210                1215

Phe Asn Arg Ala Trp Thr Glu Leu Thr Asp Trp Leu Ser Leu Leu Asp
            1220                1225                1230

Gln Val Ile Lys Ser Gln Arg Val Met Val Gly Asp Leu Glu Asp Ile
    1235                1240                1245

Asn Glu Met Ile Ile Lys Gln Lys Ala Thr Met Gln Asp Leu Glu Gln
    1250                1255                1260

Arg Arg Pro Gln Leu Glu Glu Leu Ile Thr Ala Ala Gln Asn Leu Lys
1265                1270                1275                1280
```

```
Asn Lys Thr Ser Asn Gln Glu Ala Arg Thr Ile Ile Thr Asp Arg Ile
            1285                1290                1295
Glu Arg Ile Gln Asn Gln Trp Asp Glu Val Gln Glu His Leu Gln Asn
        1300                1305                1310
Arg Arg Gln Gln Leu Asn Glu Met Leu Lys Asp Ser Thr Gln Trp Leu
        1315                1320                1325
Glu Ala Lys Glu Glu Ala Glu Gln Val Leu Gly Gln Ala Arg Ala Lys
        1330                1335                1340
Leu Glu Ser Trp Lys Glu Gly Pro Tyr Thr Val Asp Ala Ile Gln Lys
1345                1350                1355                1360
Lys Ile Thr Glu Thr Lys Gln Leu Ala Lys Asp Leu Arg Gln Trp Gln
            1365                1370                1375
Thr Asn Val Asp Val Ala Asn Asp Leu Ala Leu Lys Leu Leu Arg Asp
            1380                1385                1390
Tyr Ser Ala Asp Asp Thr Arg Lys Val His Met Ile Thr Glu Asn Ile
        1395                1400                1405
Asn Ala Ser Trp Arg Ser Ile His Lys Arg Val Ser Glu Arg Glu Ala
        1410                1415                1420
Ala Leu Glu Glu Thr His Arg Leu Leu Gln Gln Phe Pro Leu Asp Leu
1425                1430                1435                1440
Glu Lys Phe Leu Ala Trp Leu Thr Glu Ala Glu Thr Thr Ala Asn Val
            1445                1450                1455
Leu Gln Asp Ala Thr Arg Lys Glu Arg Leu Leu Glu Asp Ser Lys Gly
            1460                1465                1470
Val Lys Glu Leu Met Lys Gln Trp Gln Asp Leu Gln Gly Glu Ile Glu
        1475                1480                1485
Ala His Thr Asp Val Tyr His Asn Leu Asp Glu Asn Ser Gln Lys Ile
        1490                1495                1500
Leu Arg Ser Leu Glu Gly Ser Asp Asp Ala Val Leu Leu Gln Arg Arg
1505                1510                1515                1520
Leu Asp Asn Met Asn Phe Lys Trp Ser Glu Leu Arg Lys Lys Ser Leu
            1525                1530                1535
Asn Ile Arg Ser His Leu Glu Ala Ser Ser Asp Gln Trp Lys Arg Leu
            1540                1545                1550
His Leu Ser Leu Gln Glu Leu Leu Val Trp Leu Gln Leu Lys Asp Asp
        1555                1560                1565
Glu Leu Ser Arg Gln Ala Pro Ile Gly Gly Asp Phe Pro Ala Val Gln
        1570                1575                1580
Lys Gln Asn Asp Val His Arg Ala Phe Lys Arg Glu Leu Lys Thr Lys
1585                1590                1595                1600
Glu Pro Val Ile Met Ser Thr Leu Glu Thr Val Arg Ile Phe Leu Thr
            1605                1610                1615
Glu Gln Pro Leu Glu Gly Leu Glu Lys Leu Tyr Gln Glu Pro Arg Glu
            1620                1625                1630
Leu Pro Pro Glu Glu Arg Ala Gln Asn Val Thr Arg Leu Leu Arg Lys
        1635                1640                1645
Gln Ala Glu Glu Val Asn Thr Glu Trp Glu Lys Leu Asn Leu His Ser
        1650                1655                1660
Ala Asp Trp Gln Arg Lys Ile Asp Glu Thr Leu Glu Arg Leu Gln Glu
1665                1670                1675                1680
Leu Gln Glu Ala Thr Asp Glu Leu Asp Leu Lys Leu Arg Gln Ala Glu
            1685                1690                1695
```

Val Ile Lys Gly Ser Trp Gln Pro Val Gly Asp Leu Leu Ile Asp Ser
             1700              1705              1710

Leu Gln Asp His Leu Glu Lys Val Lys Ala Leu Arg Gly Glu Ile Ala
         1715              1720              1725

Pro Leu Lys Glu Asn Val Ser His Val Asn Asp Leu Ala Arg Gln Leu
         1730              1735              1740

Thr Thr Leu Gly Ile Gln Leu Ser Pro Tyr Asn Leu Ser Thr Leu Glu
1745              1750              1755              1760

Asp Leu Asn Thr Arg Trp Lys Leu Leu Gln Val Ala Val Glu Asp Arg
             1765              1770              1775

Val Arg Gln Leu His Glu Ala His Arg Asp Phe Gly Pro Ala Ser Gln
         1780              1785              1790

His Phe Leu Ser Thr Ser Val Gln Gly Pro Trp Glu Arg Ala Ile Ser
         1795              1800              1805

Pro Asn Lys Val Pro Tyr Tyr Ile Asn His Glu Thr Gln Thr Thr Cys
         1810              1815              1820

Trp Asp His Pro Lys Met Thr Glu Leu Tyr Gln Ser Leu Ala Asp Leu
1825              1830              1835              1840

Asn Asn Val Arg Phe Ser Ala Tyr Arg Thr Ala Met Lys Leu Arg Arg
             1845              1850              1855

Leu Gln Lys Ala Leu Cys Leu Asp Leu Leu Ser Leu Ser Ala Ala Cys
         1860              1865              1870

Asp Ala Leu Asp Gln His Asn Leu Lys Gln Asn Asp Gln Pro Met Asp
         1875              1880              1885

Ile Leu Gln Ile Ile Asn Cys Leu Thr Thr Ile Tyr Asp Arg Leu Glu
         1890              1895              1900

Gln Glu His Asn Asn Leu Val Asn Val Pro Leu Cys Val Asp Met Cys
1905              1910              1915              1920

Leu Asn Trp Leu Leu Asn Val Tyr Asp Thr Gly Arg Thr Gly Arg Ile
             1925              1930              1935

Arg Val Leu Ser Phe Lys Thr Gly Ile Ile Ser Leu Cys Lys Ala His
             1940              1945              1950

Leu Glu Asp Lys Tyr Arg Tyr Leu Phe Lys Gln Val Ala Ser Ser Thr
         1955              1960              1965

Gly Phe Cys Asp Gln Arg Arg Leu Gly Leu Leu Leu His Asp Ser Ile
         1970              1975              1980

Gln Ile Pro Arg Gln Leu Gly Glu Val Ala Ser Phe Gly Gly Ser Asn
1985              1990              1995              2000

Ile Glu Pro Ser Val Arg Ser Cys Phe Gln Phe Ala Asn Asn Lys Pro
         2005              2010              2015

Glu Ile Glu Ala Ala Leu Phe Leu Asp Trp Met Arg Leu Glu Pro Gln
         2020              2025              2030

Ser Met Val Trp Leu Pro Val Leu His Arg Val Ala Ala Ala Glu Thr
         2035              2040              2045

Ala Lys His Gln Ala Lys Cys Asn Ile Cys Lys Glu Cys Pro Ile Ile
         2050              2055              2060

Gly Phe Arg Tyr Arg Ser Leu Lys His Phe Asn Tyr Asp Ile Cys Gln
2065              2070              2075              2080

Ser Cys Phe Phe Ser Gly Arg Val Ala Lys Gly His Lys Met His Tyr
             2085              2090              2095

Pro Met Val Glu Tyr Cys Thr Pro Thr Thr Ser Gly Glu Asp Val Arg
         2100              2105              2110

Asp Phe Ala Lys Val Leu Lys Asn Lys Phe Arg Thr Lys Arg Tyr Phe

```
                   2115                2120                2125
Ala Lys His Pro Arg Met Gly Tyr Leu Pro Val Gln Thr Val Leu Glu
               2130                2135                2140

Gly Asp Asn Met Glu Thr Pro Val Thr Leu Ile Asn Phe Trp Pro Val
2145                2150                2155                2160

Asp Ser Ala Pro Ala Ser Ser Pro Gln Leu Ser His Asp Thr His
                2165                2170                2175

Ser Arg Ile Glu His Tyr Ala Ser Arg Leu Ala Glu Met Glu Asn Ser
               2180                2185                2190

Asn Gly Ser Tyr Leu Asn Asp Ser Ile Ser Pro Asn Glu Ser Ile Asp
               2195                2200                2205

Asp Glu His Leu Leu Ile Gln His Tyr Cys Gln Ser Leu Asn Gln Asp
                2210                2215                2220

Ser Pro Leu Ser Gln Pro Arg Ser Pro Ala Gln Ile Leu Ile Ser Leu
2225                2230                2235                2240

Glu Ser Glu Glu Arg Gly Glu Leu Glu Arg Ile Leu Ala Asp Leu Glu
               2245                2250                2255

Glu Glu Asn Arg Asn Leu Gln Ala Glu Tyr Asp Arg Leu Lys Gln Gln
               2260                2265                2270

His Glu His Lys Gly Leu Ser Pro Leu Pro Ser Pro Pro Glu Met Met
                2275                2280                2285

Pro Thr Ser Pro Gln Ser Pro Arg Asp Ala Glu Leu Ile Ala Glu Ala
               2290                2295                2300

Lys Leu Leu Arg Gln His Lys Gly Arg Leu Glu Ala Arg Met Gln Ile
2305                2310                2315                2320

Leu Glu Asp His Asn Lys Gln Leu Glu Ser Gln Leu His Arg Leu Arg
               2325                2330                2335

Gln Leu Leu Glu Gln Pro Gln Ala Glu Ala Lys Val Asn Gly Thr Thr
               2340                2345                2350

Val Ser Ser Pro Ser Thr Ser Leu Gln Arg Ser Asp Ser Ser Gln Pro
               2355                2360                2365

Met Leu Leu Arg Val Val Gly Ser Gln Thr Ser Asp Ser Met Gly Glu
               2370                2375                2380

Glu Asp Leu Leu Ser Pro Pro Gln Asp Thr Ser Thr Gly Leu Glu Glu
2385                2390                2395                2400

Val Met Glu Gln Leu Asn Asn Ser Phe Pro Ser Ser Arg Gly Arg Asn
                2405                2410                2415

Thr Pro Gly Lys Pro Met Arg Glu Asp Thr Met
                2420                2425

<210> SEQ ID NO 3
<211> LENGTH: 2406
<212> TYPE: PRT
<213> ORGANISM: Artificial Sequence
<220> FEATURE:
<223> OTHER INFORMATION: Synthetic Polypeptide
<220> FEATURE:
<221> NAME/KEY: misc_feature
<223> OTHER INFORMATION: "WL2"

<400> SEQUENCE: 3

Met Leu Trp Trp Glu Glu Val Glu Asp Cys Tyr Glu Arg Glu Asp Val
1               5                   10                  15

Gln Lys Lys Thr Phe Thr Lys Trp Val Asn Ala Gln Phe Ser Lys Phe
                20                  25                  30

Gly Lys Gln His Ile Glu Asn Leu Phe Ser Asp Leu Gln Asp Gly Arg
```

```
              35                  40                  45
Arg Leu Leu Asp Leu Leu Glu Gly Leu Thr Gly Gln Lys Leu Pro Lys
    50                  55                  60

Glu Lys Gly Ser Thr Arg Val His Ala Leu Asn Asn Val Asn Lys Ala
65                  70                  75                  80

Leu Arg Val Leu Gln Asn Asn Val Asp Leu Val Asn Ile Gly Ser
                85                  90                  95

Thr Asp Ile Val Asp Gly Asn His Lys Leu Thr Leu Gly Leu Ile Trp
                100                 105                 110

Asn Ile Ile Leu His Trp Gln Val Lys Asn Val Met Lys Asn Ile Met
            115                 120                 125

Ala Gly Leu Gln Gln Thr Asn Ser Glu Lys Ile Leu Leu Ser Trp Val
        130                 135                 140

Arg Gln Ser Thr Arg Asn Tyr Pro Gln Val Asn Val Ile Asn Phe Thr
145                 150                 155                 160

Thr Ser Trp Ser Asp Gly Leu Ala Leu Asn Ala Leu Ile His Ser His
                165                 170                 175

Arg Pro Asp Leu Phe Asp Trp Asn Ser Val Val Cys Gln Gln Ser Ala
                180                 185                 190

Thr Gln Arg Leu Glu His Ala Phe Asn Ile Ala Arg Tyr Gln Leu Gly
            195                 200                 205

Ile Glu Lys Leu Leu Asp Pro Glu Asp Val Asp Thr Thr Tyr Pro Asp
210                 215                 220

Lys Lys Ser Ile Leu Met Tyr Ile Thr Ser Leu Phe Gln Val Leu Pro
225                 230                 235                 240

Gln Gln Val Ser Ile Glu Ala Ile Gln Glu Val Met Leu Pro Arg
                245                 250                 255

Pro Pro Lys Val Thr Lys Glu Glu His Phe Gln Leu His Gln Met
                260                 265                 270

His Tyr Ser Gln Gln Ile Thr Val Ser Leu Ala Gln Gly Tyr Glu Arg
        275                 280                 285

Thr Ser Ser Pro Lys Pro Arg Phe Lys Ser Tyr Ala Tyr Thr Gln Ala
290                 295                 300

Ala Tyr Val Thr Thr Ser Asp Pro Thr Arg Ser Pro Phe Pro Ser Gln
305                 310                 315                 320

His Leu Glu Ala Pro Glu Asp Lys Ser Phe Gly Ser Ser Leu Met Glu
                325                 330                 335

Ser Glu Val Asn Leu Asp Arg Tyr Gln Thr Ala Leu Glu Glu Val Leu
            340                 345                 350

Ser Trp Leu Leu Ser Ala Glu Asp Thr Leu Gln Ala Gln Gly Glu Ile
        355                 360                 365

Ser Asn Asp Val Glu Val Val Lys Asp Gln Phe His Thr His Glu Gly
    370                 375                 380

Tyr Met Met Asp Leu Thr Ala His Gln Gly Arg Val Gly Asn Ile Leu
385                 390                 395                 400

Gln Leu Gly Ser Lys Leu Ile Gly Thr Gly Lys Leu Ser Glu Asp Glu
                405                 410                 415

Glu Thr Glu Val Gln Glu Gln Met Asn Leu Leu Asn Ser Arg Trp Glu
            420                 425                 430

Cys Leu Arg Val Ala Ser Met Glu Lys Gln Ser Asn Leu His Arg Val
        435                 440                 445

Leu Met Asp Leu Gln Asn Gln Lys Leu Lys Glu Leu Asn Asp Trp Leu
    450                 455                 460
```

-continued

```
Thr Lys Thr Glu Glu Arg Thr Arg Lys Met Glu Glu Pro Leu Gly
465                 470                 475                 480

Pro Asp Leu Glu Asp Leu Lys Arg Gln Val Gln His Lys Val Leu
                485                 490                 495

Gln Glu Asp Leu Glu Gln Glu Gln Val Arg Val Asn Ser Leu Thr His
            500                 505                 510

Met Val Val Val Asp Glu Ser Ser Gly Asp His Ala Thr Ala Ala
        515                 520                 525

Leu Glu Glu Gln Leu Lys Val Leu Gly Asp Arg Trp Ala Asn Ile Cys
530                 535                 540

Arg Trp Thr Glu Asp Arg Trp Val Leu Leu Gln Asp Ile Leu Leu Lys
545                 550                 555                 560

Trp Gln Arg Leu Thr Glu Glu Gln Cys Leu Phe Ser Ala Trp Leu Ser
                565                 570                 575

Glu Lys Glu Asp Ala Val Asn Lys Ile His Thr Thr Gly Phe Lys Asp
            580                 585                 590

Gln Asn Glu Met Leu Ser Ser Leu Gln Lys Leu Ala Val Leu Lys Ala
        595                 600                 605

Asp Leu Glu Lys Lys Gln Ser Met Gly Lys Leu Tyr Ser Leu Lys
610                 615                 620

Gln Asp Leu Leu Ser Thr Leu Lys Asn Lys Ser Val Thr Gln Lys Thr
625                 630                 635                 640

Glu Ala Trp Leu Asp Asn Phe Ala Arg Cys Trp Asp Asn Leu Val Gln
                645                 650                 655

Lys Leu Glu Lys Ser Thr Ala Gln Ile Ser Gln Ala Val Thr Thr Thr
            660                 665                 670

Gln Pro Ser Leu Thr Gln Thr Thr Val Met Glu Thr Val Thr Thr Val
        675                 680                 685

Thr Thr Arg Glu Gln Ile Leu Val Lys His Ala Gln Glu Glu Leu Pro
690                 695                 700

Pro Pro Pro Gln Lys Lys Arg Gln Ile Thr Val Asp Gly Leu Glu
705                 710                 715                 720

Lys Thr Val Ser Leu Gln Lys Asp Leu Ser Glu Met His Glu Trp Met
                725                 730                 735

Thr Gln Ala Glu Glu Glu Tyr Leu Glu Arg Asp Phe Glu Tyr Lys Thr
            740                 745                 750

Pro Asp Glu Leu Gln Lys Ala Val Glu Glu Met Lys Arg Ala Lys Glu
        755                 760                 765

Glu Ala Gln Gln Lys Glu Ala Lys Val Lys Leu Leu Thr Glu Ser Val
770                 775                 780

Asn Ser Val Ile Ala Gln Ala Pro Pro Val Ala Gln Glu Ala Leu Lys
785                 790                 795                 800

Lys Glu Leu Glu Thr Leu Thr Thr Asn Tyr Gln Trp Leu Cys Thr Arg
                805                 810                 815

Leu Asn Gly Lys Cys Lys Thr Leu Glu Glu Val Trp Ala Cys Trp His
            820                 825                 830

Glu Leu Leu Ser Tyr Leu Glu Lys Ala Asn Lys Trp Leu Asn Glu Val
        835                 840                 845

Glu Phe Lys Leu Lys Thr Thr Glu Asn Ile Pro Gly Gly Ala Glu Glu
        850                 855                 860

Ile Ser Glu Val Leu Asp Ser Leu Glu Asn Leu Met Arg His Ser Glu
865                 870                 875                 880
```

```
Asp Asn Pro Asn Gln Ile Arg Ile Leu Ala Gln Thr Leu Thr Asp Gly
            885                 890                 895
Gly Val Met Asp Glu Leu Ile Asn Glu Glu Leu Glu Thr Phe Asn Ser
            900                 905                 910
Arg Trp Arg Glu Leu His Glu Glu Ala Val Arg Arg Gln Lys Leu Leu
            915                 920                 925
Glu Gln Pro Leu Lys Glu Leu Glu Gln Phe Asn Ser Asp Ile Gln Lys
            930                 935                 940
Leu Leu Glu Pro Leu Glu Ala Glu Ile Gln Gln Gly Val Asn Leu Lys
945                 950                 955                 960
Glu Glu Asp Phe Asn Lys Asp Met Asn Glu Asp Asn Glu Gly Thr Val
            965                 970                 975
Lys Glu Leu Leu Gln Arg Gly Asp Asn Leu Gln Gln Arg Ile Thr Asp
            980                 985                 990
Glu Arg Lys Arg Glu Glu Ile Lys Ile Lys Gln Gln Leu Leu Gln Thr
            995                1000                1005
Lys His Asn Ala Phe Lys Asp Leu Arg Ser Gln Arg Arg Lys Lys Ala
        1010                1015                1020
Leu Glu Ile Ser His Gln Trp Tyr Gln Tyr Lys Arg Gln Ala Asp Asp
1025                1030                1035                1040
Leu Leu Lys Cys Leu Asp Asp Ile Glu Lys Lys Leu Ala Ser Leu Pro
            1045                1050                1055
Glu Pro Arg Asp Glu Arg Lys Ile Lys Glu Ile Asp Arg Glu Leu Gln
        1060                1065                1070
Lys Lys Lys Glu Glu Leu Asn Ala Val Arg Arg Gln Ala Glu Gly Leu
        1075                1080                1085
Ser Glu Asp Gly Ala Ala Met Ala Val Glu Pro Thr Gln Ile Gln Leu
        1090                1095                1100
Ser Lys Arg Trp Arg Glu Ile Glu Ser Lys Phe Ala Gln Phe Arg Arg
1105                1110                1115                1120
Leu Asn Phe Ala Gln Ile His Thr Val Arg Glu Glu Thr Met Met Val
            1125                1130                1135
Met Thr Glu Asp Met Pro Leu Glu Ile Ser Tyr Val Pro Ser Thr Tyr
            1140                1145                1150
Leu Thr Glu Ile Thr His Val Ser Gln Ala Leu Leu Glu Val Glu Gln
            1155                1160                1165
Leu Leu Asn Ala Pro Asp Leu Cys Ala Lys Asp Phe Glu Asp Leu Phe
            1170                1175                1180
Lys Gln Glu Glu Ser Leu Lys Asn Ile Lys Asp Ser Leu Gln Gln Ser
1185                1190                1195                1200
Ser Gly Arg Ile Asp Ile Ile His Ser Lys Lys Thr Ala Ala Leu Gln
            1205                1210                1215
Ser Ala Thr Pro Val Glu Arg Val Lys Leu Gln Glu Ala Leu Ser Gln
            1220                1225                1230
Leu Asp Phe Gln Trp Glu Lys Val Asn Lys Met Tyr Lys Asp Arg Gln
            1235                1240                1245
Gly Arg Phe Asp Arg Ser Val Glu Lys Trp Arg Arg Phe His Tyr Asp
            1250                1255                1260
Ile Lys Ile Phe Asn Gln Trp Leu Thr Glu Ala Glu Gln Phe Leu Arg
1265                1270                1275                1280
Lys Thr Gln Ile Pro Glu Asn Trp Glu His Ala Lys Tyr Lys Trp Tyr
            1285                1290                1295
Leu Lys Glu Leu Gln Asp Gly Ile Gly Gln Arg Gln Thr Val Val Arg
```

```
                    1300                1305                1310
Thr Leu Asn Ala Thr Gly Glu Glu Ile Ile Gln Gln Ser Ser Lys Thr
        1315                1320                1325

Asp Ala Ser Ile Leu Gln Glu Lys Leu Gly Ser Leu Asn Leu Arg Trp
            1330                1335                1340

Gln Glu Val Cys Lys Gln Leu Ser Asp Arg Lys Lys Arg Leu Glu Glu
1345                1350                1355                1360

Gln Pro Asp Leu Ala Pro Gly Leu Thr Thr Ile Gly Ala Ser Pro Thr
                1365                1370                1375

Gln Thr Val Thr Leu Val Thr Gln Pro Val Val Thr Lys Glu Thr Ala
            1380                1385                1390

Ile Ser Lys Leu Glu Met Pro Ser Ser Leu Met Leu Glu Val Pro Thr
        1395                1400                1405

His Arg Leu Leu Gln Gln Phe Pro Leu Asp Leu Glu Lys Phe Leu Ala
    1410                1415                1420

Trp Leu Thr Glu Ala Glu Thr Thr Ala Asn Val Leu Gln Asp Ala Thr
1425                1430                1435                1440

Arg Lys Glu Arg Leu Leu Glu Asp Ser Lys Gly Val Lys Glu Leu Met
                1445                1450                1455

Lys Gln Trp Gln Asp Leu Gln Gly Glu Ile Glu Ala His Thr Asp Val
            1460                1465                1470

Tyr His Asn Leu Asp Glu Asn Ser Gln Lys Ile Leu Arg Ser Leu Glu
        1475                1480                1485

Gly Ser Asp Asp Ala Val Leu Leu Gln Arg Arg Leu Asp Asn Met Asn
    1490                1495                1500

Phe Lys Trp Ser Glu Leu Arg Lys Lys Ser Leu Asn Ile Arg Ser His
1505                1510                1515                1520

Leu Glu Ala Ser Ser Asp Gln Trp Lys Arg Leu His Leu Ser Leu Gln
                1525                1530                1535

Glu Leu Leu Val Trp Leu Gln Leu Lys Asp Asp Glu Leu Ser Arg Gln
            1540                1545                1550

Ala Pro Ile Gly Gly Asp Phe Pro Ala Val Gln Lys Gln Asn Asp Val
        1555                1560                1565

His Arg Ala Phe Lys Arg Glu Leu Lys Thr Lys Glu Pro Val Ile Met
    1570                1575                1580

Ser Thr Leu Glu Thr Val Arg Ile Phe Leu Thr Glu Gln Pro Leu Glu
1585                1590                1595                1600

Gly Leu Glu Lys Leu Tyr Gln Glu Pro Arg Glu Leu Pro Pro Glu Glu
                1605                1610                1615

Arg Ala Gln Asn Val Thr Arg Leu Leu Arg Lys Gln Ala Glu Glu Val
            1620                1625                1630

Asn Thr Glu Trp Glu Lys Leu Asn Leu His Ser Ala Asp Trp Gln Arg
        1635                1640                1645

Lys Ile Asp Glu Thr Leu Glu Arg Leu Gln Glu Leu Gln Glu Ala Thr
    1650                1655                1660

Asp Glu Leu Asp Leu Lys Leu Arg Gln Ala Glu Val Ile Lys Gly Ser
1665                1670                1675                1680

Trp Gln Pro Val Gly Asp Leu Leu Ile Asp Ser Leu Gln Asp His Leu
                1685                1690                1695

Glu Lys Val Lys Ala Leu Arg Gly Glu Ile Ala Pro Leu Lys Glu Asn
            1700                1705                1710

Val Ser His Val Asn Asp Leu Ala Arg Gln Leu Thr Thr Leu Gly Ile
        1715                1720                1725
```

-continued

Gln Leu Ser Pro Tyr Asn Leu Ser Thr Leu Glu Asp Leu Asn Thr Arg
    1730                1735                1740

Trp Lys Leu Leu Gln Val Ala Val Glu Asp Arg Val Arg Gln Leu His
1745                1750                1755                1760

Glu Ala His Arg Asp Phe Gly Pro Ala Ser Gln His Phe Leu Ser Thr
                1765                1770                1775

Ser Val Gln Gly Pro Trp Glu Arg Ala Ile Ser Pro Asn Lys Val Pro
            1780                1785                1790

Tyr Tyr Ile Asn His Glu Thr Gln Thr Thr Cys Trp Asp His Pro Lys
        1795                1800                1805

Met Thr Glu Leu Tyr Gln Ser Leu Ala Asp Leu Asn Asn Val Arg Phe
    1810                1815                1820

Ser Ala Tyr Arg Thr Ala Met Lys Leu Arg Arg Leu Gln Lys Ala Leu
1825                1830                1835                1840

Cys Leu Asp Leu Leu Ser Leu Ser Ala Ala Cys Asp Ala Leu Asp Gln
                1845                1850                1855

His Asn Leu Lys Gln Asn Asp Gln Pro Met Asp Ile Leu Gln Ile Ile
            1860                1865                1870

Asn Cys Leu Thr Thr Ile Tyr Asp Arg Leu Glu Gln Glu His Asn Asn
        1875                1880                1885

Leu Val Asn Val Pro Leu Cys Val Asp Met Cys Leu Asn Trp Leu Leu
    1890                1895                1900

Asn Val Tyr Asp Thr Gly Arg Thr Gly Arg Ile Arg Val Leu Ser Phe
1905                1910                1915                1920

Lys Thr Gly Ile Ile Ser Leu Cys Lys Ala His Leu Glu Asp Lys Tyr
                1925                1930                1935

Arg Tyr Leu Phe Lys Gln Val Ala Ser Ser Thr Gly Phe Cys Asp Gln
            1940                1945                1950

Arg Arg Leu Gly Leu Leu His Asp Ser Ile Gln Ile Pro Arg Gln
        1955                1960                1965

Leu Gly Glu Val Ala Ser Phe Gly Gly Ser Asn Ile Glu Pro Ser Val
    1970                1975                1980

Arg Ser Cys Phe Gln Phe Ala Asn Asn Lys Pro Glu Ile Glu Ala Ala
1985                1990                1995                2000

Leu Phe Leu Asp Trp Met Arg Leu Glu Pro Gln Ser Met Val Trp Leu
                2005                2010                2015

Pro Val Leu His Arg Val Ala Ala Glu Thr Ala Lys His Gln Ala
        2020                2025                2030

Lys Cys Asn Ile Cys Lys Glu Cys Pro Ile Ile Gly Phe Arg Tyr Arg
        2035                2040                2045

Ser Leu Lys His Phe Asn Tyr Asp Ile Cys Gln Ser Cys Phe Phe Ser
    2050                2055                2060

Gly Arg Val Ala Lys Gly His Lys Met His Tyr Pro Met Val Glu Tyr
2065                2070                2075                2080

Cys Thr Pro Thr Thr Ser Gly Glu Asp Val Arg Asp Phe Ala Lys Val
                2085                2090                2095

Leu Lys Asn Lys Phe Arg Thr Lys Arg Tyr Phe Ala Lys His Pro Arg
            2100                2105                2110

Met Gly Tyr Leu Pro Val Gln Thr Val Leu Glu Gly Asp Asn Met Glu
        2115                2120                2125

Thr Pro Val Thr Leu Ile Asn Phe Trp Pro Val Asp Ser Ala Pro Ala
    2130                2135                2140

Ser Ser Pro Gln Leu Ser His Asp Asp Thr His Ser Arg Ile Glu His
2145                2150                2155                2160

Tyr Ala Ser Arg Leu Ala Glu Met Glu Asn Ser Asn Gly Ser Tyr Leu
            2165                2170                2175

Asn Asp Ser Ile Ser Pro Asn Glu Ser Ile Asp Asp Glu His Leu Leu
        2180                2185                2190

Ile Gln His Tyr Cys Gln Ser Leu Asn Gln Asp Ser Pro Leu Ser Gln
    2195                2200                2205

Pro Arg Ser Pro Ala Gln Ile Leu Ile Ser Leu Glu Ser Glu Glu Arg
2210                2215                2220

Gly Glu Leu Glu Arg Ile Leu Ala Asp Leu Glu Glu Glu Asn Arg Asn
2225                2230                2235                2240

Leu Gln Ala Glu Tyr Asp Arg Leu Lys Gln Gln His Glu His Lys Gly
            2245                2250                2255

Leu Ser Pro Leu Pro Ser Pro Pro Glu Met Met Pro Thr Ser Pro Gln
        2260                2265                2270

Ser Pro Arg Asp Ala Glu Leu Ile Ala Glu Ala Lys Leu Leu Arg Gln
    2275                2280                2285

His Lys Gly Arg Leu Glu Ala Arg Met Gln Ile Leu Glu Asp His Asn
2290                2295                2300

Lys Gln Leu Glu Ser Gln Leu His Arg Leu Arg Gln Leu Leu Glu Gln
2305                2310                2315                2320

Pro Gln Ala Glu Ala Lys Val Asn Gly Thr Thr Val Ser Ser Pro Ser
            2325                2330                2335

Thr Ser Leu Gln Arg Ser Asp Ser Ser Gln Pro Met Leu Leu Arg Val
        2340                2345                2350

Val Gly Ser Gln Thr Ser Asp Ser Met Gly Glu Glu Asp Leu Leu Ser
    2355                2360                2365

Pro Pro Gln Asp Thr Ser Thr Gly Leu Glu Glu Val Met Glu Gln Leu
2370                2375                2380

Asn Asn Ser Phe Pro Ser Ser Arg Gly Arg Asn Thr Pro Gly Lys Pro
2385                2390                2395                2400

Met Arg Glu Asp Thr Met
            2405

<210> SEQ ID NO 4
<211> LENGTH: 7284
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: "WL1 wt"

<400> SEQUENCE: 4
atgctttggt gggaagaagt agaggactgt tatgaaagag aagatgttca aaagaaaaca      60
ttcacaaaat gggtaaatgc acaatttttct aagtttggga agcagcatat tgagaacctc     120
ttcagtgacc tacaggatgg gaggcgcctc ctagacctcc tcgaaggcct gacagggcaa     180
aaactgccaa agaaaaagg atccacaaga gttcatgccc tgaacaatgt caacaaggca     240
ctgcgggttt tgcagaacaa taatgttgat ttagtgaata ttggaagtac tgacatcgta     300
gatggaaatc ataaactgac tcttggtttg atttggaata taatcctcca ctggcaggtc     360
aaaaatgtaa tgaaaatat catggctgga ttgcaacaaa ccaacagtga aaagattctc     420
ctgagctggg tccgacaatc aactcgtaat tatccacagg ttaatgtaat caacttcacc     480

```
accagctggt ctgatggcct ggctttgaat gctctcatcc atagtcatag gccagaccta    540
tttgactgga atagtgtggt ttgccagcag tcagccacac aacgactgga acatgcattc    600
aacatcgcca gatatcaatt aggcatagag aaactactcg atcctgaaga tgttgatacc    660
acctatccag ataagaagtc catcttaatg tacatcacat cactcttcca agttttgcct    720
caacaagtga gcattgaagc catccaggaa gtggaaatgt tgccaaggcc acctaaagtg    780 actaagaag aacattttca gttacatcat caaatgcact attctcaaca gatcacggtc    840
agtctagcac agggatatga gagaacttct tcccctaagc ctcgattcaa gagctatgcc    900
tacacacagg ctgcttatgt caccacctct gaccctacac ggagcccatt tccttcacag    960
catttggaag ctcctgaaga caagtcattt ggcagttcat tgatggagag tgaagtaaac   1020
ctggaccgtt atcaaacagc tttagaagaa gtattatcgt ggcttctttc tgctgaggac   1080
acattgcaag cacaaggaga gatttctaat gatgtggaag tggtgaaaga ccagtttcat   1140
actcatgagg ggtacatgat ggatttgaca gcccatcagg gccgggttgg taatattcta   1200
caattgggaa gtaagctgat tggaacagga aaattatcag aagatgaaga aactgaagta   1260
caagagcaga tgaatctcct aaattcaaga tgggaatgcc tcagggtagc tagcatggaa   1320
aaacaaagca atttacatag agttttaatg gatctccaga atcagaaact gaaagagttg   1380
aatgactggc taacaaaaac agaagaaaga acaaggaaaa tggaggaaga gcctcttgga   1440
cctgatcttg aagacctaaa acgccaagta caacaacata aggtgcttca agaagatcta   1500
gaacaagaac aagtcagggt caattctctc actcacatgg tggtggtagt tgatgaatct   1560
agtggagatc acgcaactgc tgcttttggaa gaacaactta aggtattggg agatcgatgg   1620
gcaaacatct gtagatggac agaagaccgc tgggttcttt tacaagacat ccttctcaaa   1680
tggcaacgtc ttactgaaga acagtgcctt tttagtgcat ggctttcaga aaaagaagat   1740
gcagtgaaca agattcacac aactggcttt aaagatcaaa atgaaatgtt atcaagtctt   1800
caaaaactgg ccgttttaaa agcggatcta gaaaagaaaa agcaatccat gggcaaactg   1860
tattcactca acaagatctc tctttcaaca ctgaagaata agtcagtgac ccagaagacg   1920
gaagcatggc tggataactt tgcccggtgt tgggataatt tagtccaaaa acttgaaaag   1980
agtacagcac agatttcaca ggctgtcacc accactcagc catcactaac acagacaact   2040
gtaatgaaaa cagtaactac ggtgaccaca agggaacaga tcctggtaaa gcatgctcaa   2100
gaggaacttc caccaccacc tccccaaaag aagaggcaga ttactgtgga tggtttggag   2160
aaaactgtaa gcctccagaa agatctatca gagatgcacg aatggatgac acaagctgaa   2220
gaagagtatc ttgagagaga ttttgaatat aaaactccag atgaattaca gaaagcagtt   2280
gaagagatga gagagctaa agaagaggcc aacaaaaag aagcgaaagt gaaactcctt    2340
actgagtctg taaatagtgt catagctcaa gctccacctg tagcacaaga ggccttaaaa   2400
aaggaacttg aaactctaac caccaactac cagtggctct gcactaggct gaatgggaaa   2460
tgcaagactt tggaagaagt ttgggcatgt tggcatgagt tattgtcata cttggagaaa   2520
gcaaacaagt ggctaaatga agtagaattt aaacttaaaa ccactgaaaa cattcctggc   2580
ggagctgagg aaatctctga ggtgctagat tcacttgaaa atttgatgcg acattcagag   2640
gataacccaa atcagattcg catattggca cagaccctaa cagatggcgg agtcatggat   2700
gagctaatca atgaggaact tgagacattt aattctcgtt ggagggaact acatgaagag   2760
gctgtaagga ggcaaaagtt gcttgaacag attcacactg tccgtgaaga aacgatgatg   2820
```

```
gtgatgactg aagacatgcc tttggaaatt tcttatgtgc cttctactta tttgactgaa    2880
atcactcatg tctcacaagc cctattagaa gtggaacaac ttctcaatgc tcctgacctc    2940
tgtgctaagg actttgaaga tctctttaag caagaggagt ctctgaagaa tataaaagat    3000
agtctacaac aaagctcagg tcggattgac attattcata gcaagaagac agcagcattg    3060
caaagtgcaa cgcctgtgga aagggtgaag ctacaggaag ctctctccca gcttgatttc    3120
caatgggaaa aagttaacaa aatgtacaag gaccgacaag ggcgatttga cagatctgtt    3180
gagaaatggc ggcgttttca ttatgatata aagatattta atcagtggct aacagaagct    3240
gaacagtttc tcagaaagac acaaattcct gagaattggg aacatgctaa atacaaatgg    3300
tatcttaagg aactccagga tggcattggg cagcggcaaa ctgttgtcag aacattgaat    3360
gcaactgggg aagaaataat tcagcaatcc tcaaaaacag atgccagtat tctacaggaa    3420
aaattgggaa gcctgaatct gcggtggcag gaggtctgca aacagctgtc agacagaaaa    3480
aagaggctag aagagcagcc tgacctagct cctggactga ccactattgg agcctctcct    3540
actcagactg ttactctggt gacacaacct gtggttacta aggaaactgc catctccaaa    3600
ctagaaatgc catcttcctt gatgttggag gtacctgctc tggcagattt caaccgggct    3660
tggacagaac ttaccgactg gctttctctg cttgatcaag ttataaaatc acagagggtg    3720
atggtgggtg accttgagga tatcaacgag atgatcatca gcagaaggc aacaatgcag    3780 gatttgaac agaggcgtcc ccagttggaa gaactcatta ccgctgccca aaatttgaaa    3840
aacaagacca gcaatcaaga ggctagaaca atcattacgg atcgaattga aagaattcag    3900
aatcagtggg atgaagtaca agaacacctt cagaaccgga ggcaacagtt gaatgaaatg    3960
ttaaaggatt caacacaatg gctggaagct aaggaagaag ctgagcaggt cttaggacag    4020
gccagagcca gcttgagtc atggaaggag ggtccctata cagtagatgc aatccaaaag    4080
aaaatcacag aaaccaagca gttggccaaa gacctccgcc agtggcagac aaatgtagat    4140
gtggcaaatg acttggccct gaaacttctc cgggattatt ctgcagatga taccagaaaa    4200
gtccacatga taacagagaa tatcaatgcc tcttggagaa gcattcataa aggggtgagt    4260
gagcgagagg ctgctttgga agaaactcat agattactgc aacagttccc cctggacctg    4320
gaaaagtttc ttgcctggct tacagaagct gaaacaactg ccaatgtcct acaggatgct    4380
acccgtaagg aaaggctcct agaagactcc aagggagtaa aagagctgat gaaacaatgg    4440
caagacctcc aaggtgaaat tgaagctcac acagatgttt atcacaacct ggatgaaaac    4500
agccaaaaaa tcctgagatc cctggaaggt tccgatgatg cagtcctgtt acaaagacgt    4560
ttggataaca tgaacttcaa gtggagtgaa cttcggaaaa agtctctcaa cattaggtcc    4620
catttggaag ccagttctga ccagtggaag cgtctgcacc tttctctgca ggaacttctg    4680
gtgtggctac agctgaaaga tgatgaatta agccggcagg cacctattgg aggcgacttt    4740
ccagcagttc agaagcagaa cgatgtacat agggccttca gagggaatt gaaaactaaa    4800 gaacctgtaa tcatgagtac tcttgagact gtacgaatat ttctgacaga gcagcctttg    4860
gaaggactag agaaactcta ccaggagccc agagagctgc ctcctgagga gagagcccag    4920
aatgtcactc ggcttctacg aaagcaggct gaggaggtca atactgagtg ggaaaaattg    4980
aacctgcact ccgctgactg gcagagaaaa atagatgaga cccttgaaag actccaggaa    5040
cttcaagagg ccacggatga gctggaccte aagctgcgcc aagctgaggt gatcaaggga    5100
tcctggcagc ccgtgggcga tctcctcatt gactctctcc aagatcacct cgagaaagtc    5160
aaggcacttc gaggagaaat tgcgcctctg aaagagaacg tgagccacgt caatgacctt    5220
```

```
gctcgccagc ttaccacttt gggcattcag ctctcaccgt ataacctcag cactctggaa    5280
gacctgaaca ccagatggaa gcttctgcag gtggccgtcg aggaccgagt caggcagctg    5340
catgaagccc acagggactt tggtccagca tctcagcact ttctttccac gtctgtccag    5400
ggtccctggg agagagccat ctcgccaaac aaagtgccct actatatcaa ccacgagact    5460
caaacaactt gctgggacca tcccaaaatg acagagctct accagtcttt agctgacctg    5520
aataatgtca gattctcagc ttataggact gccatgaaac tccgaagact gcagaaggcc    5580
ctttgcttgg atctcttgag cctgtcagct gcatgtgatg ccttggacca gcacaacctc    5640
aagcaaaatg accagcccat ggatatcctg cagattatta attgtttgac cactatttat    5700
gaccgcctgg agcaagagca caacaatttg gtcaacgtcc ctctctgcgt ggatatgtgt    5760
ctgaactggc tgctgaatgt ttatgatacg ggacgaacag ggaggatccg tgtcctgtct    5820
tttaaaactg gcatcatttc cctgtgtaaa gcacatttgg aagacaagta cagataccct    5880
ttcaagcaag tggcaagttc aacaggattt tgtgaccagc gcaggctggg cctccttctg    5940
catgattcta tccaaattcc aagacagttg ggtgaagttg catcctttgg gggcagtaac    6000
attgagccaa gtccggagc tgcttccaa tttgctaata ataagccaga gatcgaagcg    6060
gccctcttcc tagactggat gagactggaa ccccagtcca tggtgtggct gcccgtcctg    6120
cacagagtgg ctgctgcaga aactgccaag catcaggcca aatgtaacat ctgcaaagag    6180
tgtccaatca ttggattcag gtacaggagt ctaaagcact ttaattatga catctgccaa    6240
agctgctttt tttctggtcg agttgcaaaa ggccataaaa tgcactatcc catggtggaa    6300
tattgcactc cgactacatc aggagaagat gttcgagact ttgccaaggt actaaaaaac    6360
aaatttcgaa ccaaaaggta ttttgcgaag catccccgaa tgggctacct gccagtgcag    6420
actgtcttag aggggacaa catggaaact cccgttactc tgatcaactt ctggccagta    6480
gattctgcgc ctgcctcgtc ccctcagctt tcacacgatg atactcattc acgcattgaa    6540
cattatgcta gcaggctagc agaaatggaa aacagcaatg gatcttatct aaatgatagc    6600
atctctccta tgagagcat agatgatgaa catttgttaa tccagcatta ctgccaaagt    6660
ttgaaccagg actcccccct gagccagcct cgtagtcctg cccagatctt gatttcctta    6720
gagagtgagg aaagagggga gctagagaga atcctagcag atcttgagga agaaaacagg    6780
aatctgcaag cagaatatga ccgtctaaag cagcagcacg aacataaagg cctgtccca    6840
ctgccgtccc ctcctgaaat gatgcccacc tctcccagt gtccccggga tgctgagctc    6900
attgctgagg ccaagctact gcgtcaacac aaaggccgcc tggaagccag gatgcaaatc    6960
ctggaagacc acaataaaca gctggagtca cagttacaca ggctaaggca gctgctggag    7020
caaccccagg cagaggccaa agtgaatggc acaacggtgt cctctccttc tacctctcta    7080
cagaggtccg acagcagtca gcctatgctg ctccgagtgg ttggcagtca aacttcggac    7140
tccatgggtg aggaagatct tctcagtcct cccaggaca caagcacagg gttagaggag    7200
gtgatggagc aactcaacaa ctccttccct agttcaagag aagaaaatac ccctgaaag    7260
ccaatgagag aggacacaat gtag                                          7284
```

<210> SEQ ID NO 5
<211> LENGTH: 7284
<212> TYPE: DNA
<213> ORGANISM: Artificial Sequence
<220> FEATURE:
<223> OTHER INFORMATION: Synthetic Polynucleotide
<220> FEATURE:

<221> NAME/KEY: misc_feature
<223> OTHER INFORMATION: "WL1 opt"

<400> SEQUENCE: 5

| | | | | | |
|---|---|---|---|---|---|
| atgctgtggt | gggaggaggt | ggaggactgc | tatgagagag | aggatgtgca | gaagaagacc | 60 |
| ttcaccaagt | gggtgaatgc | ccagttcagc | aagtttggca | agcagcacat | tgagaacctg | 120 |
| ttctctgacc | tgcaggatgg | caggagcctg | ctggacctgc | tggagggcct | aacaggccag | 180 |
| aagctgccca | aggagaaggg | cagtaccagg | gtgcatgccc | tgaacaatgt | gaacaaggcc | 240 |
| ctgagggtgc | tgcagaacaa | caatgtggac | ctagtgaata | ttggcagtac | agatattgtg | 300 |
| gatggcaacc | acaagctgac | cctgggcctg | atctggaata | ttatcctaca | ctggcaggtg | 360 |
| aagaatgtga | tgaagaatat | tatggctggc | ctgcagcaga | ccaactctga | aagatcctg | 420 |
| ctgagctggg | tgaggcagag | taccaggaac | taccccaggt | gaatgtgat | caacttcacc | 480 |
| accagctggt | ctgatggcct | ggccctgaat | gccctaatcc | acagccacag | gcctgacctg | 540 |
| tttgactgga | actctgtggt | gtgccagcag | tctgccaccc | agaggctaga | gcatgccttc | 600 |
| aatattgcca | ggtaccagct | ggggattgag | aagctgctgg | accctgagga | tgtggataca | 660 |
| acctaccctg | acaagaagag | catcctgatg | tacatcacca | gcctgttcca | ggtgctgccc | 720 |
| cagcaggtga | gcattgaggc | catccaggag | gtggagatgc | tacccaggcc | ccccaaggtg | 780 |
| accaaggagg | agcacttcca | gctacaccac | cagatgcact | acagccagca | gatcacagtg | 840 |
| agcctggccc | agggctatga | ggaccagc | agccccaagc | ccaggttcaa | gagctatgcc | 900 |
| tacacccagg | ctgcctatgt | gaccacctca | gaccccacca | ggagcccctt | ccccagccag | 960 |
| cacctggagg | cccctgagga | caagagcttt | ggcagcagcc | tgatggagtc | tgaggtgaac | 1020 |
| ctggacaggt | accagacagc | cctggaggag | gtgctgagct | ggctgctgtc | tgctgaggat | 1080 |
| accctacagg | cccagggaga | gatcagcaat | gatgtggagg | tggtgaagga | ccagttccat | 1140 |
| acccatgagg | gctacatgat | ggacctaaca | gcccaccagg | gcagggtggg | caacatcctg | 1200 |
| cagctgggca | gcaagctgat | tggcacaggc | aagctgtctg | aggatgagga | gacagaggtg | 1260 |
| caggagcaga | tgaacctgct | gaacagcagg | tgggagtgcc | tgagggtggc | cagtatggag | 1320 |
| aagcagagca | acctacacag | ggtgctgatg | gacctgcaga | accagaagct | gaaggagctg | 1380 |
| aatgactggc | tgaccaagac | agaggagagg | accaggaaga | tggaggagga | gcccctgggc | 1440 |
| cctgacctgg | aggacctaaa | gaggcaggtg | cagcagcaca | aggtgctgca | ggaggacctg | 1500 |
| gagcaggagc | aggtgagggt | gaacagccta | acccatatgg | tggtggtggt | ggatgagagc | 1560 |
| tcaggagacc | atgctacagc | tgccctggag | gagcagctga | aggtgctggg | agacaggtgg | 1620 |
| gctaatatct | gcaggtggac | agaggacagg | tgggtgctgc | tgcaggatat | cctgctgaag | 1680 |
| tggcagaggc | tgacagagga | gcagtgcctg | ttctctgcct | ggctgtcaga | gaaggaggat | 1740 |
| gctgtgaaca | agatccatac | aacaggcttc | aaggaccaga | atgagatgct | gagcagcctg | 1800 |
| cagaagctgg | ctgtgctgaa | ggctgacctg | gagaagaaga | agcagagtat | gggcaagctg | 1860 |
| tacagcctga | agcaggacct | gctgagtacc | ctgaagaaca | agtctgtgac | ccagaagaca | 1920 |
| gaggcctggc | tggacaactt | tgccaggtgc | tgggataacc | tggtgcagaa | gctggagaag | 1980 |
| agtacagccc | agatcagcca | ggctgtgaca | acaacccagc | ccagcctgac | ccagacaaca | 2040 |
| gtgatggaga | cagtgacaac | agtgacaacc | agggagcaga | tcctagtgaa | gcatgcccag | 2100 |
| gaggagctgc | cccccccccc | ccccagaag | aagaggcaga | ttacagtgga | tggcctggag | 2160 |
| aagacagtga | gcctccagaa | ggacctgtca | gagatgcatg | agtggatgac | ccaggctgag | 2220 |

```
gaggagtacc tggagaggga ctctgagtac aagacccctg atgagctgca gaaggctgtg    2280
gaggagatga agagggccaa ggaggaggcc cagcagaagg aggccaaggt gaagctgctg    2340
acagagtctg tgaactctgt gattgcccag gccccccctg tgcccaggaa ggccctgaag    2400
aaggagctgg agaccctgac aaccaactac cagtggctgt gcaccaggct gaatggcaag    2460
tgcaagaccc tagaggaggt gtgggcctgc tggcatgagc tgctgagcta cctggagaag    2520
gccaacaagt ggctgaatga ggtggagttc aagctgaaga ccacagagaa catccctgga    2580
ggagctgagg agatctctga ggtgctggac agcctggaga acctaatgag gcactctgag    2640 gacaaccccca accagatcag gatcctggcc cagaccctga cagatggagg agtgatggat    2700
gagctgatca atgaggagct ggagaccttc aacagcaggt ggagggagct acatgaggag    2760
gctgtgagga ggcagaagct gctagagcag atccatacag tgagggagga gacaatgatg    2820
gtgatgacag aggatatgcc cctggagatc agctatgtgc ccagcaccta cctaacagag    2880
atcacccatg tgagccaggc cctgctggag gtggagcagc tgctgaatgc ccctgacctg    2940
tgtgccaagg actttgagga cctgttcaag caggaggaga gcctgaagaa catcaaggac    3000
agcctgcagc agagctcagg caggattgat attatccaca gcaagaagac agctgccctg    3060
cagtctgcta cccctgtgga gagggtgaag ctgcaggagg ccctgagcca gctggacttc    3120
cagtgggaga aggtgaacaa gatgtacaag gacaggcagg gcaggtttga caggtcagtg    3180
gagaagtgga ggaggttcca ctatgacatc aagatcttca accagtggct gacagaggct    3240
gagcagttcc taaggaagac ccagatccct gagaactggg agcatgccaa gtacaagtgg    3300
taccttaagg agctgcagga tggcattggc cagaggcaga cagtggtgag gaccctgaat    3360
gctacagggg aggagattat ccagcagagc agcaagacag atgccagtat cctgcaggag    3420
aagctgggca gcctgaacct gaggtggcag gaggtgtgca gcagctgtc tgacaggaag    3480 aagaggctgg aggagcagcc tgacctggcc cctggcctga caacaattgg agccagccct    3540
acccagacag tgaccctggt gacccagcct gtggtgacca aggagacagc tatcagcaag    3600
ctggagatgc ccagcagcct gatgctggag gtgcctgccc tggctgactt caacagggcc    3660
tggacagagc tgacagactg gctgagcctg ctggaccagg tgatcaagag ccagagggtg    3720 atggtgggg acctggagga tatcaatgag atgattatca gcagaaggc tacaatgcag    3780 gacctggagc agaggaggcc ccagctggag gagctgatta cagctgccca gaacctaaag    3840
aacaagacca gcaaccagga ggccaggaca attattacag acaggattga gaggatccag    3900
aaccagtggg atgaggtgca ggagcacctg cagaacagga ggcagcagct gaatgagatg    3960
ctgaaggaca gtacccagtg gctggaggcc aaggaggagg ctgagcaggt gctgggccag    4020
gccagggcca agctggagag ctggaaggag ggccccctaca cagtggatgc catccagaag    4080
aagatcacag agaccaagca gctggccaag gacctgaggc agtggcagac caatgtggat    4140
gtggccaatg acctggccct gaagctgctg agggactact cagctgatga caccaggaag    4200
gtgcacatga tcagagagaa catcaatgcc agctggaggg catccacaa gagggtgtct    4260 gagagggagg ctgccctaga ggagacccac aggctgctgc agcagttccc cctggacctg    4320
gagaagttcc tggcctggct gacagaggct gagacaacag ccaatgtgct gcaggatgct    4380
accaggaagg agaggctgct ggaggacagc aagggagtga aggagctgat gaagcagtgg    4440
caggacctac aggggagat tgaggcccat acagatgtgt accacaacct ggatgagaac    4500
agccagaaga tcctgaggag cctggagggc tctgatgatg ctgtgctgct gcagaggagg    4560
ctggacaata tgaacttcaa gtggtctgag ctgaggaaga agagcctaaa tatcaggagc    4620
```

```
cacctggagg ccagctctga ccagtggaag aggctacacc tgagcctgca ggagctgctg    4680
gtgtggctgc agctgaagga tgatgagcta agcaggcagg cccctattgg gggagacttc    4740
cctgctgtgc agaagcagaa tgatgtgcac agggccttca agagggagct gaagaccaag    4800
gagcctgtga ttatgagtac cctggagaca gtgaggatct tcctgacaga gcagcccctg    4860
gagggcctgg agaagctgta ccaggagccc agggagctgc ccctgaggga gagggcccag    4920
aatgtgacca ggctgctgag gaagcaggct gaggaggtga atacagagtg ggagaagctg    4980
aacctacact ctgctgactg gcagaggaag attgatgaga ccctggagag gctgcaggag    5040
ctgcaggagg ctacagatga gctggacctg aagctgaggc aggctgaggt gatcaagggc    5100
agctggcagc ctgtggggga cctgctgatt gacagcctac aggaccacct ggagaaggtg    5160 aagggccctga ggggagagat tgccccccta aaggagaatg tgagtcatgt gaatgacctg    5220
gccaggcagc tgaccaccct gggcatccag ctgagcccct acaacctgag caccctggag    5280
gacctgaaca ccaggtggaa gctgctgcag gtggctgtgg aggacagggt gaggcagcta    5340
catgaggccc acagggactt tggccctgcc agccagcact tcctaagcac ctctgttcag    5400
ggcccctggg agagggccat cagccccaac aaggtgccct actacatcaa ccatgagacc    5460
cagaccacct gctgggacca ccccaagatg acagagctgt accagagcct ggctgacctg    5520
aacaatgtga ggttctctgc ctacaggaca gccatgaagc tgaggaggct gcagaaggcc    5580
ctgtgcctgg acctgctgag cctgtctgct gcctgtgatg ccctagacca gcacaacctg    5640
aagcagaatg accagcccat ggacatcctt cagatcatca actgcctgac caccatctat    5700
gacaggctag agcaggagca caacaacctg gtgaatgtgc cctgtgtgt ggacatgtgc    5760 ctgaactggc tgctgaatgt gtatgacaca ggcaggacag gcaggatcag ggtgctgagc    5820
ttcaagacag gcatcatcag cctatgcaag gctcacctgg aggacaagta caggtacctg    5880
ttcaagcagg tggccagcag cacaggcttc tgtgaccaga ggaggctggg cctgctactt    5940
catgacagca ttcagatccc caggcagctg ggagaggtgg ccagctttgg aggcagcaac    6000
attgagccct cagtgaggag ctgcttccag tttgccaaca acaagcctga gattgaggct    6060
gccctgttcc tggactggat gaggctggag cctcagagca tggtgtggct gcctgtgctg    6120
cacagggtgg ctgctgctga cagccaag catcaggcca agtgcaacat ctgcaaggag    6180
tgccccatca ttggcttcag gtacaggagc taaagcact tcaactatga catctgccag    6240
agctgcttct tctcaggcag ggtggccaag ggccacaaga tgcactaccc catggtggag    6300
tactgcaccc ccaccacctc aggagaggat gtgagggact tgccaaggt gctgaagaac    6360 aagttcagga ccaagaggta ctttgccaag caccccagga tgggctacct gcctgtgcag    6420
acagtgctgg agggggacaa catggagacc cctgtgaccc tgatcaactt ctggcctgtg    6480
gactcagccc ctgccagcag ccccagctg agccatgatg acacccacag caggattgag    6540
cactatgcca gcaggctggc tgagatggag aacagcaatg gcagctacct aaatgacagc    6600
atcagcccca atgagagcat tgatgatgag cacctgctaa tccagcacta ctgccagagc    6660
ctgaaccagg acagcccct gagccagccc aggagccctg cccagatcct gatcagcctg    6720
gagtctgagg agaggggga gctggagagg atcctggctg acctggagga ggagaacagg    6780
aaccttcagg ctgagtatga caggctaaag cagcagcatg agcacaaggg cctgagcccc    6840
ctacccagcc cccctgagat gatgcccacc agccccagaa gccccaggga tgctgagctg    6900
attgctgagg ccaagctgct gaggcagcac aagggcaggc tggaggccag gatgcagatc    6960
```

```
ctagaggacc acaacaagca gctggagagc cagctacaca ggctgaggca gctgctggag    7020
cagcctcagg ctgaggccaa ggtgaatggc accacagtga gcagcccag caccagcctg      7080 cagaggtctg acagcagtca gcccatgctg ctcaggtgg tgggcagtca gacctctgac     7140
agcatgggag aggaggacct gctgagcccc cctcaggaca ccagcacagg cctggaggag    7200
gtgatggagc agctgaacaa cagcttcccc agcagcaggg gcaggaacac ccctggcaag    7260
cccatgaggg aggacaccat gtag                                            7284
```

<210> SEQ ID NO 6
<211> LENGTH: 4768
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: "5' WL1 opt"

<400> SEQUENCE: 6

```
ctgcgcgctc gctcgctcac tgaggccgcc cgggcaaagc ccgggcgtcg ggcgaccttt      60
ggtcgcccgg cctcagtgag cgagcgagcg cgcagagagg gagtggccaa ctccatcact     120
aggggttcct tgtagttaat gattaacccg ccatgctact tatctacgta ttggccgtcc    180
gccctcggca ccatcctcac gacacccaaa tatggcgacg ggtgaggaat ggtggggagt    240
tatttttaga gcggtgagga aggtgggcag gcagcaggtg ttggcgctct aaaaataact    300
cccgggagtt attttttagag cggaggaatg gtggacaccc aaatatggcg acggttcctc   360
acccgtcgcc atatttgggt gtccgccctc ggccggggcc gcattcctgg gggccgggcg   420
gtgctcccgc ccgcctcgat aaaaggctcc ggggccggcg gcggcccacg agctacccgg   480
aggagcggga ggcgccaagc tctagagtaa gtatcaaggt tacaagacag gtttaaggag   540
accaatagaa actgggcttg tcgagacaga gaagactctt gcgtttctga taggcaccta   600
ttggtcttac tgacatccac tttgcctttc tctccacagg ccaccatgct gtggtgggag   660
gaggtggagg actgctatga gagagaggat gtgcagaaga agaccttcac caagtgggtg   720
aatgcccagt tcagcaagtt tggcaagcag cacattgaga acctgttctc tgacctgcag   780
gatggcagga gcctgctgga cctgctggag ggcctaacag gccagaagct gcccaaggag   840
aagggcagta ccagggtgca tgccctgaac aatgtgaaca aggccctgag ggtgctgcag   900
aacaacaatg tggacctagt gaatattggc agtacagata ttgtggatgg caaccacaag   960
ctgacccctg gcctgatctg gaatattatc ctacactggc aggtgaagaa tgtgatgaag   1020 atattatgg ctggcctgca gcagaccaac tctgagaaga tcctgctgag ctgggtgagg   1080
cagagtacca ggaactaccc ccaggtgaat gtgatcaact tcaccaccag ctggtctgat   1140
ggcctggccc tgaatgccct aatccacagc cacaggcctg acctgtttga ctggaactct   1200
gtggtgtgcc agcagtctgc cacccagagg ctagagcatg ccttcaatat tgccaggtac   1260
cagctgggga ttgagaagct gctggaccct gaggatgtgg atacaaccta ccctgacaag   1320
aagagcatcc tgatgtacat caccagcctg ttccaggtgc tgccccagca ggtgagcatt    1380
gaggccatcc aggaggtgga gatgctaccc aggccccca aggtgaccaa ggaggagcac    1440
ttccagctac accaccagat gcactacagc cagcagatca cagtgagcct ggcccagggc    1500
tatgagagga ccagcagccc caagcccagg ttcaagagct atgcctacac ccaggctgcc    1560
tatgtgacca cctcagaccc caccaggagc cccttcccca gccagcacct ggaggccct    1620
```

```
gaggacaaga gctttggcag cagcctgatg gagtctgagg tgaacctgga caggtaccag    1680
acagccctgg aggaggtgct gagctggctg ctgtctgctg aggatacccT acaggcccag    1740
ggagagatca gcaatgatgt ggaggtggtg aaggaccagt tccatacccA tgagggctac    1800
atgatggacc taacagccca ccagggcagg gtgggcaaca tcctgcagct gggcagcaag    1860
ctgattggca caggcaagct gtctgaggat gaggagacag aggtgcagga gcagatgaac    1920
ctgctgaaca gcaggtggga gtgcctgagg gtggccagta tggagaagca gagcaaccta    1980
cacagggtgc tgatggacct gcagaaccag aagctgaagg agctgaatga ctggctgacc    2040
aagacagagg agaggaccag gaagatggag gaggagcccc tgggcccctg cctggaggac    2100
ctaaagaggc aggtgcagca gcacaaggtg ctgcaggagg acctggagca ggagcaggtg    2160
agggtgaaca gcctaaccca tatggtggtg gtggtggatg agagctcagg agaccatgct    2220
acagctgccc tggaggagca gctgaaggtg ctggagacag ggtgggctaa tatctgcagg    2280
tggacagagg acaggtgggt gctgctgcag gatatcctgc tgaagtggca gaggctgaca    2340
gaggagcagt gcctgttctc tgcctggctg tcagagaagg aggatgctgt gaacaagatc    2400
catacaacag gcttcaagga ccagaatgag atgctgagca gcctgcagaa gctggctgtg    2460
ctgaaggctg acctggagaa gaagaagcag agtatgggca agctgtacag cctgaagcag    2520
gacctgctga gtaccctgaa gaacaagtct gtgacccaga agacagaggc ctggctggac    2580
aactttgcca ggtgctggga taacctggtg cagaagctgg agaagagtac agcccagatc    2640
agccaggctg tgacaacaac ccagcccagc ctgacccaga caacagtgat ggagacagtg    2700
acaacagtga caaccaggga gcagatccta gtgaagcatg cccaggagga gctgccccCC    2760
CCCCCCCCCC agaagaagag gcagattaca gtggatggcc tggagaagac agtgagcctc    2820
cagaaggacc tgtcagagat gcatgagtgg atgacccagg ctgaggagga gtacctggag    2880
agggactctg agtacaagac ccctgatgag ctgcagaagg ctgtggagga gatgaagagg    2940
gccaaggagg aggcccagca gaaggaggcc aaggtgaagc tgctgacaga gtctgtgaac    3000
tctgtgattg cccaggcccc cctgtggcc caggaggccc tgaagaagga gctggagacc    3060
ctgacaacca actaccagtg gctgtgcacc aggctgaatg gcaagtgcaa gaccctagag    3120
gaggtgtggg cctgctggca tgagctgctg agctacctgg agaaggccaa caagtggctg    3180
aatgaggtgg agttcaagct gaagaccaca gagaacatcc ctggaggagc tgaggagatc    3240
tctgaggtgc tggacagcct ggagaaccta atgaggcact ctgaggacaa ccccaaccag    3300
atcaggatcc tggcccagac cctgacagat ggaggagtga tggatgagct gatcaatgag    3360
gagctggaga ccttcaacag caggtggagg gagctacatg aggaggctgt gaggaggcag    3420
aagctgctag agcagatcca tacagtgagg gaggagacaa tgatggtgat gacagaggat    3480
atgcccctgg agatcagcta tgtgcccagc acctacctaa cagagatcac ccatgtgagc    3540
caggccctgc tggaggtgga gcagctgctg aatgcccctg acctgtgtgc caaggacttt    3600
gaggacctgt tcaagcagga ggagagcctg aagaacatca aggacagcct gcagcagagc    3660
tcaggcagga ttgatattat ccacagcaag aagacagctg ccctgcagtc tgctacccct    3720
gtggagaggg tgaagctgca ggaggccctg agccagctgg acttccagtg ggagaaggtt    3780
aacaagatgt acaaggacag gcagggcagg tttgacaggt cagtggagaa gtggaggagg    3840
ttccactatg acatcaagat cttcaaccag tggctgacag aggctgagca gttcctaagg    3900
aagacccaga tccctgagaa ctgggagcat gccaagtaca agtggtacct taaggagctg    3960
caggatggca ttggccagag gcagacagtg gtgaggaccc tgaatgctac agggaggag    4020
```

```
attatccagc agagcagcaa gacagatgcc agtatcctgc aggagaagct gggcagcctg    4080
aacctgaggt ggcaggaggt gtgcaagcag ctgtctgaca ggaagaagag gctggaggag    4140
cagcctgacc tggcccctgg cctgacaaca attggagcca gccctaccca gacagtgacc    4200
ctggtgaccc agcctgtggt gaccaaggag acagctatca gcaagctgga gatgcccagc    4260
agcctgatgc tggaggtgcc tgccctggct gacttcaaca gggcctggac agagctgaca    4320
gactggctga gcctgctgga ccaggtgatc aagagccaga gggtgatggt ggggacctg    4380 gaggatatca atgagatgat tatcaagcag aaggctacaa tgcaggacct ggagcagagg    4440
aggccccagc tggaggagct gattacagct gcccagaacc taaagaacaa gaccagcaac    4500
caggaggcca ggacaattat tacagacagg attgagagga tccagaacca gtgggatgag    4560
gtgcaggagc acctgcagtt tacgcgtttt gcggccgctt tacgtagata agtagcatgg    4620
cgggttaatc attaactaca aggaacccct agtgatggag ttggccactc cctctctgcg    4680
cgctcgctcg ctcactgagg ccgggcgacc aaaggtcgcc cgacgcccgg gctttgcccg    4740
ggcggcctca gtgagcgagc gagcgcgc                                       4768

<210> SEQ ID NO 7
<211> LENGTH: 4715
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: "3' WL1 opt"

<400> SEQUENCE: 7
ctgcgcgctc gctcgctcac tgaggccgcc cgggcaaagc ccgggcgtcg ggcgaccttt      60
ggtcgcccgg cctcagtgag cgagcgagcg cgcagagagg gagtggccaa ctccatcact     120
aggggttcct tgtagttaat gattaacccg ccatgctact tatctacgta tttgaacaag     180
atgtacaagg acaggcaggg caggtttgac aggtcagtgg agaagtggag gaggttccac     240
tatgacatca agatcttcaa ccagtggctg acagaggctg agcagttcct aaggaagacc     300
cagatccctg agaactggga gcatgccaag tacaagtggt accttaagga gctgcaggat     360
ggcattggcc agaggcagac agtggtgagg accctgaatg ctacagggga ggagattatc     420
cagcagagca gcaagacaga tgccagtatc ctgcaggaga gctgggcag cctgaacctg     480 aggtggcagg aggtgtgcaa gcagctgtct gacaggaaga gaggctgga ggagcagcct     540 gacctggccc ctggcctgac aacaattgga gccagcccta cccagacagt gaccctggtg     600
acccagcctg tggtgaccaa ggagacagct atcagcaagc tggagatgcc cagcagcctg     660
atgctggagg tgcctgccct ggctgacttc aacagggcct ggacagagct gacagactgg     720
ctgagcctgc tggaccaggt gatcaagagc cagagggtga tggtggggga cctggaggat     780
atcaatgaga tgattatcaa gcagaaggct acaatgcagg acctggagca gaggaggccc     840
cagctggagg agctgattac agctgcccag aacctaaaga caagaccag caaccaggag     900 gccaggacaa ttattacaga caggattgag aggatccaga accagtggga tgaggtgcag     960
gagcacctgc agaacaggag gcagcagctg aatgagatgc tgaaggacag tacccagtgg    1020
ctggaggcca ggaggaggc tgagcaggtg ctgggccagg ccagggccaa gctggagagc    1080
tggaaggagg cccctacac agtggatgcc atccagaaga gatcacaga gaccaagcag    1140 ctggccaagg acctgaggca gtggcagacc aatgtggatg tggccaatga cctggcccctg    1200
```

```
aagctgctga gggactactc agctgatgac accaggaagg tgcacatgat cacagagaac   1260
atcaatgcca gctggaggag catccacaag agggtgtctg agaggaggc tgccctagag    1320 gagacccaca ggctgctgca gcagttcccc ctggacctgg agaagttcct ggcctggctg   1380
acagaggctg agacaacagc caatgtgctg caggatgcta ccaggaagga gaggctgctg   1440
gaggacagca agggagtgaa ggagctgatg aagcagtggc aggacctaca ggggagatt    1500 gaggcccata cagatgtgta ccacaacctg gatgagaaca gccagaagat cctgaggagc   1560
ctggagggct ctgatgatgc tgtgctgctg cagaggaggc tggacaatat gaacttcaag   1620
tggtctgagc tgaggaagaa gagcctaaat atcaggagcc acctggaggc cagctctgac   1680
cagtggaaga ggctacacct gagcctgcag gagctgctgg tgtggctgca gctgaaggat   1740
gatgagctaa gcaggcaggc ccctattggg ggagacttcc ctgctgtgca gaagcagaat   1800
gatgtgcaca gggccttcaa gagggagctg aagaccaagg agcctgtgat tatgagtacc   1860
ctggagacag tgaggatctt cctgacagag cagcccctgg agggcctgga gaagctgtac   1920
caggagccca gggagctgcc ccctgaggag agggcccaga atgtgaccag gctgctgagg   1980
aagcaggctg aggaggtgaa tacagagtgg gagaagctga acctacactc tgctgactgg   2040
cagaggaaga ttgatgagac cctggagagg ctgcaggagc tgcaggaggc tacagatgag   2100
ctggacctga agctgaggca ggctgaggtg atcaagggca gctggcagcc tgtggggac    2160 ctgctgattg acagcctaca ggaccacctg gagaaggtga aggccctgag gggagagatt   2220
gcccccctaa aggagaatgt gagtcatgtg aatgacctgg ccaggcagct gaccaccctg   2280
ggcatccagc tgagcccta caacctgagc accctggagg acctgaacac caggtggaag   2340
ctgctgcagg tggctgtgga ggacagggtg aggcagctac atgaggccca gggactttt    2400 ggccctgcca gccagcactt cctaagcacc tctgttcagg gccctggga gagggccatc   2460 agccccaaca aggtgcccta ctacatcaac catgagaccc agaccacctg ctgggaccac   2520
cccaagatga cagagctgta ccagagcctg gctgacctga caatgtgag gttctctgcc    2580 tacaggacag ccatgaagct gaggaggctg cagaaggccc tgtgcctgga cctgctgagc   2640
ctgtctgctg cctgtgatgc cctagaccag cacaacctga agcagaatga ccagcccatg   2700
gacatccttc agatcatcaa ctgcctgacc accatctatg acaggctaga gcaggagcac   2760
aacaacctgg tgaatgtgcc cctgtgtgtg acatgtgcc tgaactgggct gctgaatgtg    2820 tatgacacag gcaggacagg caggatcagg gtgctgagct caagacagg catcatcagc    2880 ctatgcaagg ctcacctgga ggacaagtac aggtacctgt tcaagcaggt ggccagcagc   2940
acaggcttct gtgaccagag gaggctgggc ctgctacttc atgacagcat tcagatcccc   3000
aggcagctgg gagaggtggc cagctttgga ggcagcaaca ttgagccctc agtgaggagc   3060
tgcttccagt ttgccaacaa caagcctgag attgaggctg ccctgttcct ggactggatg   3120
aggctggagc ctcagagcat ggtgtggctg cctgtgctgc acagggtggc tgctgctgag   3180
acagccaagc atcaggccaa gtgcaacatc tgcaaggagt gccccatcat tggcttcagg   3240
tacaggagcc taaagcactt caactatgac atctgccaga gctgcttctt ctcaggcagg   3300
gtggccaagg ccacaagat gcactacccc atggtggagt actgcacccc caccacctca   3360
ggagaggatg tgagggactt tgccaaggtg ctgaagaaca agttcaggac caagaggtac   3420
tttgccaagc accccaggat gggctacctg cctgtgcaga cagtgctgga ggggacaaac   3480
atggagaccc ctgtgaccct gatcaacttc tggcctgtgg actcagcccc tgccagcagc   3540
```

```
ccccagctga gccatgatga cacccacagc aggattgagc actatgccag caggctggct    3600
gagatggaga acagcaatgg cagctaccta aatgacagca tcagccccaa tgagagcatt    3660
gatgatgagc acctgctaat ccagcactac tgccagagcc tgaaccagga cagcccctg     3720
agccagccca ggagccctgc ccagatcctg atcagcctgg agtctgagga gaggggggag    3780
ctggagagga tcctggctga cctggaggag agaacagga  accttcaggc tgagtatgac    3840
aggctaaagc agcagcatga gcacaagggc ctgagccccc tacccagccc ccctgagatg    3900
atgcccacca gcccccagag ccccagggat gctgagctga ttgctgaggc caagctgctg    3960
aggcagcaca agggcaggct ggaggccagg atgcagatcc tagaggacca caacaagcag    4020
ctggagagcc agctacacag gctgaggcag ctgctggagc agcctcaggc tgaggccaag    4080
gtgaatggca ccacagtgag cagccccagc accagcctgc agaggtctga cagcagtcag    4140
cccatgctgc tcagggtggt gggcagtcag acctctgaca gcatgggaga ggaggacctg    4200
ctgagccccc ctcaggacac cagcacaggc ctggaggagg tgatggagca gctgaacaac    4260
agcttcccca gcagcagggg caggaacacc cctggcaagc ccatgaggga ggacaccatg    4320
tagcagacat gataagatac attgatgagt ttggacaaac cacaactaga atgcagtgaa    4380
aaaaatgctt tatttgtgaa atttgtgatg ctattgcttt atttgtaacc attataagct    4440
gcaataaaca agttaacaac aacaattgca ttcattttat gtttcaggtt caggggggaga   4500
tgtgggaggt tttttaaagc aagtaaaacc tctacaaatg tggtatttac gtagataagt    4560
agcatggcgg gttaatcatt aactacaagg aaccctagt  gatggagttg gccactccct    4620
ctctgcgcgc tcgctcgctc actgaggccg ggcgaccaaa ggtcgcccga cgcccgggct    4680
ttgcccgggc ggcctcagtg agcgagcgag cgcgc                               4715
```

<210> SEQ ID NO 8
<211> LENGTH: 4787
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: "WL1 wt 5'AAV"

<400> SEQUENCE: 8

```
ctgcgcgctc gctcgctcac tgaggccgcc cgggcaaagc ccgggcgtcg ggcgaccttt      60
ggtcgcccgg cctcagtgag cgagcgagcg cgcagagagg gagtggccaa ctccatcact    120
aggggttcct tgtagttaat gattaacccg ccatgctact tatctacgta tttactagtt    180
ttctcgagtt tggccgtccg ccctcggcac catcctcacg acacccaaat atggcgacgg    240
gtgaggaatg gtggggagtt attttttagag cggtgaggaa ggtgggcagg cagcaggtgt    300
tggcgctcta aaaataactc ccgggagtta ttttttagagc ggaggaatgg tggacaccca    360
aatatggcga cggttcctca cccgtcgcca tatttgggtg tccgccctcg ccgggggccg    420
cattcctggg ggccgggcgg tgctcccgcc cgcctcgata aaaggctccg ggccggcgg     480
cggcccacga gctacccgga ggagcgggag gcgccaagct ctagagtaag tatcaaggtt    540
acaagacagg tttaaggaga ccaatagaaa ctgggcttgt cgagacagag aagactcttg    600
cgtttctgat aggcacctat tggtcttact gacatccact ttgcctttct ctccacaggc    660
caccatgctt tggtgggaag aagtagagga ctgttatgaa agagaagatg ttcaaaagaa    720
aacattcaca aaatgggtaa atgcacaatt ttctaagttt gggaagcagc atattgagaa    780
```

```
cctcttcagt gacctacagg atgggaggcg cctcctagac ctcctcgaag gcctgacagg      840
gcaaaaactg ccaaaagaaa aaggatccac aagagttcat gccctgaaca atgtcaacaa      900
ggcactgcgg gttttgcaga acaataatgt tgatttagtg aatattggaa gtactgacat      960
cgtagatgga aatcataaac tgactcttgg tttgatttgg aatataatcc tccactggca     1020
ggtcaaaaat gtaatgaaaa atatcatggc tggattgcaa caaaccaaca gtgaaaagat     1080
tctcctgagc tgggtccgac aatcaactcg taattatcca caggttaatg taatcaactt     1140
caccaccagc tggtctgatg gcctggcttt gaatgctctc atccatagtc ataggccaga     1200
cctatttgac tggaatagtg tggttttgcca gcagtcagcc acacaacgac tggaacatgc     1260
attcaacatc gccagatatc aattaggcat agagaaacta ctcgatcctg aagatgttga     1320
taccacctat ccagataaga agtccatctt aatgtacatc acatcactct tccaagtttt     1380
gcctcaacaa gtgagcattg aagccatcca ggaagtggaa atgttgccaa ggccacctaa     1440
agtgactaaa aagaacatt ttcagttaca tcatcaaatg cactattctc aacagatcac     1500
ggtcagtcta gcacagggat atgagagaac ttcttcccct aagcctcgat tcaagagcta     1560
tgcctacaca caggctgctt atgtcaccac ctctgaccct acacggagcc catttccttc     1620
acagcatttg gaagctcctg aagacaagtc atttggcagt tcattgatgg agagtgaagt     1680
aaacctggac cgttatcaaa cagctttaga agaagtatta tcgtggcttc tttctgctga     1740
ggacacattg caagcacaag gagagatttc taatgatgtg gaagtggtga agaccagtt     1800 tcatactcat gagggqtaca tgatggattt gacagcccat cagggccggg ttggtaatat     1860
tctacaattg ggaagtaagc tgattggaac aggaaaatta tcagaagatg aagaaactga     1920
agtacaagag cagatgaatc tcctaaattc aagatgggaa tgcctcaggg tagctagcat     1980
ggaaaaacaa agcaatttac atagagtttt aatggatctc cagaatcaga aactgaaaga     2040
gttgaatgac tggctaacaa aaacagaaga agaacaagg aaaatggagg aagagcctct     2100
tggacctgat cttgaagacc taaaacgcca agtacaacaa cataaggtgc ttcaagaaga     2160
tctagaacaa gaacaagtca gggtcaattc tctcactcac atggtggtgg tagttgatga     2220
atctagtgga gatcacgcaa ctgctgcttt ggaagaacaa cttaaggtat gggagatcg     2280 atgggcaaac atctgtagat ggacagaaga ccgctgggtt cttttacaag acatccttct     2340
caaatggcaa cgtcttactg aagaacagtg cctttttagt gcatggcttt cagaaaaaga     2400
agatgcagtg aacaagattc acacaactgg ctttaaagat caaaatgaaa tgttatcaag     2460
tcttcaaaaa ctggccgttt taaaagcgga tctagaaaag aaaaagcaat ccatgggcaa     2520
actgtattca ctcaaacaag atcttctttc aacactgaag aataagtcag tgacccagaa     2580
gacggaagca tggctggata ctttgcccg gtgttgggat aatttagtcc aaaaacttga     2640
aaagagtaca gcacagattt cacaggctgt caccaccact cagccatcac taacacagac     2700
aactgtaatg gaaacagtaa ctacggtgac cacaagggaa cagatcctgg taaagcatgc     2760
tcaagaggaa cttccaccac cacctcccca aaagaagagg cagattactg tggatggttt     2820
ggagaaaact gtaagcctcc agaaagatct atcagagatg cacgaatgga tgacacaagc     2880
tgaagaagag tatcttgaga gagattttga atataaaact ccagatgaat acagaaagc     2940 agttgaagag atgaagagag ctaaagaaga ggcccaacaa aagaagcga aagtgaaact     3000 ccttactgag tctgtaaata gtgtcatagc tcaagctcca cctgtagcac aagaggcctt     3060
aaaaaaggaa cttgaaactc taaccaccaa ctaccagtgg ctctgcacta ggctgaatgg     3120
gaaatgcaag actttggaag aagtttgggc atgttggcat gagttattgt catacttgga     3180
```

| | | | |
|---|---|---|---|
| gaaagcaaac | aagtggctaa | atgaagtaga | atttaaactt aaaaccactg aaaacattcc | 3240 |
| tggcggagct | gaggaaatct | ctgaggtgct | agattcactg aaaatttga tgcgacattc | 3300 |
| agaggataac | ccaaatcaga | ttcgcatatt | ggcacagacc ctaacagatg gcggagtcat | 3360 |
| ggatgagcta | atcaatgagg | aacttgagac | atttaattct cgttggaggg aactacatga | 3420 |
| agaggctgta | aggaggcaaa | agttgcttga | acagattcac actgtccgtg aagaaacgat | 3480 |
| gatggtgatg | actgaagaca | tgcctttgga | aatttcttat gtgccttcta cttatttgac | 3540 |
| tgaaatcact | catgtctcac | aagccctatt | agaagtggaa caacttctca atgctcctga | 3600 |
| cctctgtgct | aaggactttg | aagatctctt | taagcaagag gagtctctga agaatataaa | 3660 |
| agatagtcta | caacaaagct | caggtcggat | tgacattatt catagcaaga agacagcagc | 3720 |
| attgcaaagt | gcaacgcctg | tggaaagggt | gaagctacag gaagctctct cccagcttga | 3780 |
| tttccaatgg | gaaaaagtta | acaaaatgta | caaggaccga caagggcgat tgacagatc | 3840 |
| tgttgagaaa | tggcggcgtt | ttcattatga | tataaagata tttaatcagt ggctaacaga | 3900 |
| agctgaacag | tttctcagaa | agacacaaat | tcctgagaat tgggaacatg ctaaatacaa | 3960 |
| atggtatctt | aaggaactcc | aggatggcat | tgggcagcgg caaactgttg tcagaacatt | 4020 |
| gaatgcaact | ggggaagaaa | taattcagca | atcctcaaaa acagatgcca gtattctaca | 4080 |
| ggaaaaattg | ggaagcctga | atctgcggtg | gcaggaggtc tgcaaacagc tgtcagacag | 4140 |
| aaaaaagagg | ctagaagagc | agcctgacct | agctcctgga ctgaccacta ttggagcctc | 4200 |
| tcctactcag | actgttactc | tggtgacaca | acctgtggtt actaaggaaa ctgccatctc | 4260 |
| caaactagaa | atgccatctt | ccttgatgtt | ggaggtacct gctctggcag atttcaaccg | 4320 |
| ggcttggaca | gaacttaccg | actggctttc | tctgcttgat caagttataa aatcacagag | 4380 |
| ggtgatggtg | ggtgaccttg | aggatatcaa | cgagatgatc atcaagcaga aggcaacaat | 4440 |
| gcaggatttg | aacagaggc | gtccccagtt | ggaagaactc attaccgctg cccaaaattt | 4500 |
| gaaaaacaag | accagcaatc | aagaggctag | aacaatcatt acggatcgaa ttgaaagaat | 4560 |
| tcagaatcag | tgggatgaag | tacaagaaca | ccttcagttt acgcgttttg cggccgcttt | 4620 |
| acgtagataa | gtagcatggc | gggttaatca | ttaactacaa ggaaccccta gtgatggagt | 4680 |
| tggccactcc | ctctctgcgc | gctcgctcgc | tcactgaggc cgggcgacca aaggtcgccc | 4740 |
| gacgcccggg | ctttgcccgg | gcggcctcag | tgagcgagcg agcgcgc | 4787 |

<210> SEQ ID NO 9
<211> LENGTH: 4753
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: "WL1 wt 3'AAV"

<400> SEQUENCE: 9

| | | | |
|---|---|---|---|
| ctgcgcgctc | gctcgctcac | tgaggccgcc | cgggcaaagc ccgggcgtcg gcgaccttt | 60 |
| ggtcgcccgg | cctcagtgag | cgagcgagcg | cgcagagagg gagtggccaa ctccatcact | 120 |
| aggggttcct | tgtagttaat | gattaacccg | ccatgctact tatctacgta tttgcggccg | 180 |
| ctttacgcgt | ttttaacaaa | atgtacaagg | accgacaagg gcgatttgac agatctgttg | 240 |
| agaaatggcg | gcgttttcat | tatgatataa | agatatttaa tcagtggcta acagaagctg | 300 |
| aacagttcct | cagaaagaca | caaattcctg | agaattggga acatgctaaa tacaaatggt | 360 |

```
atcttaagga actccaggat ggcattgggc agcggcaaac tgttgtcaga acattgaatg      420
caactgggga agaaataatt cagcaatcct caaaaacaga tgccagtatt ctacaggaaa      480
aattgggaag cctgaatctg cggtggcagg aggtctgcaa acagctgtca gacagaaaaa      540
agaggctaga agagcagcct gacctagctc ctggactgac cactattgga gcctctccta      600
ctcagactgt tactctggtg acacaacctg tggttactaa ggaaactgcc atctccaaac      660
tagaaatgcc atcttccttg atgttggagg tacctgctct ggcagatttc aaccgggctt      720
ggacagaact taccgactgg ctttctctgc ttgatcaagt tataaaatca cagagggtga      780
tggtgggtga ccttgaggat atcaacgaga tgatcatcaa gcagaaggca caatgcagg      840 atttggaaca gaggcgtccc cagttggaag aactcattac cgctgcccaa aatttgaaaa      900
acaagaccag caatcaagag gctagaacaa tcattacgga tcgaattgaa agaattcaga      960
atcagtggga tgaagtacaa gaacaccttc agaaccggcg ccaacagttg aatgaaatgt     1020
taaaggattc aacacaatgg ctggaagcta aggaagaagc tgagcaggtc ttaggacagg     1080
ccagagccaa gcttgagtca tggaaggagg gtccctatac agtagatgca atccaaaaga     1140
aaatcacaga aaccaagcag ttggccaaag acctccgcca gtggcagaca aatgtagatg     1200
tggcaaatga cttggccctg aaacttctcc gggattattc tgcagatgat accagaaaag     1260
tccacatgat aacagagaat atcaatgcct cttggagaag cattcataaa agggtgagtg     1320
agcgagaggc tgctttggaa gaaactcata gattactgca acagttcccc ctggacctgg     1380
aaaagtttct tgcctggctt acagaagctg aaacaactgc caatgtccta caggatgcta     1440
cccgtaagga aaggctccta gaagactcca agggagtaaa agagctgatg aaacaatggc     1500
aagacctcca aggtgaaatt gaagctcaca cagatgttta tcacaacctg gatgaaaaca     1560
gccaaaaaat cctgagatcc ctggaaggtt ccgatgatgc agtcctgtta caaagacgtt     1620
tggataacat gaacttcaag tggagtgaac ttcggaaaaa gtctctcaac attaggtccc     1680
atttggaagc cagttctgac cagtggaagc gtctgcacct ttctctgcag gaacttctgg     1740
tgtggctaca gctgaaagat gatgaattaa gccggcaggc acctattgga ggcgactttc     1800
cagcagttca gaagcagaac gatgtacata gggccttcaa gagggaattg aaaactaaag     1860
aacctgtaat catgagtact cttgagactg tacgaatatt tctgacagag cagcctttgg     1920
aaggactaga gaaactctac caggagccca gagagctgcc tcctgaggag agagcccaga     1980
atgtcactcg gcttctacga aagcaggctg aggaggtcaa tactgagtgg gaaaaattga     2040
acctgcactc cgctgactgg cagagaaaaa tagatgagac ccttgaaaga ctccaggaac     2100
ttcaagaggc cacggatgag ctggaccctca agctgcgcca agctgaggtg atcaagggat     2160
cctggcagcc cgtgggcgat ctcctcattg actctctcca agatcacctc gagaaagtca     2220
aggcacttcg aggagaaatt gcgcctctga agagaacgt gagccacgtc aatgaccttg     2280
ctcgccagct taccactttg ggcattcagc tctcaccgta taacctcagc actctggaag     2340
acctgaacac cagatggaag cttctgcagg tggccgtcga ggaccgagtc aggcagctgc     2400
atgaagccca agggactttt ggtccagcat ctcagcactt tctttccacg tctgtccagg     2460
gtccctggga gagagccatc tcgccaaaca aagtgcccta ctatatcaac cacgagactc     2520
aaacaacttg ctgggaccat cccaaaatga cagagctcta ccagtcttta gctgacctga     2580
ataatgtcag attctcagct tataggactg ccatgaaact ccgaagactg cagaaggccc     2640
tttgcttgga tctcttgagc ctgtcagctg catgtgatgc cttggaccag cacaacctca     2700
```

```
agcaaaatga ccagcccatg gatatcctgc agattattaa ttgtttgacc actatttatg      2760
accgcctgga gcaagagcac aacaatttgg tcaacgtccc tctctgcgtg gatatgtgtc      2820
tgaactggct gctgaatgtt tatgatacgg gacgaacagg gaggatccgt gtcctgtctt      2880
ttaaaactgg catcatttcc ctgtgtaaag cacatttgga agacaagtac agatacccttt     2940 tcaagcaagt ggcaagttca acaggatttt gtgaccagcg caggctgggc ctccttctgc      3000
atgattctat ccaaattcca agacagttgg gtgaagttgc atcctttggg ggcagtaaca      3060
ttgagccaag tgtccggagc tgcttccaat ttgctaataa taagccagag atcgaagcgg      3120
ccctcttcct agactggatg agactggaac cccagtccat ggtgtggctg cccgtcctgc      3180
acagagtggc tgctgcagaa actgccaagc atcaggccaa atgtaacatc tgcaaagagt      3240
gtccaatcat tggattcagg tacaggagtc taaagcactt taattatgac atctgccaaa      3300
gctgcttttt ttctggtcga gttgcaaaag gccataaaat gcactatccc atggtggaat      3360
attgcactcc gactacatca ggagaagatg ttcgagactt tgccaaggta ctaaaaaaca      3420
aatttcgaac caaaaggtat tttgcgaagc atccccgaat gggctacctg ccagtgcaga      3480
ctgtcttaga gggggacaac atggaaactc ccgttactct gatcaacttc tggccagtag      3540
attctgcgcc tgcctcgtcc cctcagcttt cacacgatga tactcattca cgcattgaac      3600
attatgctag caggctagca gaaatggaaa acagcaatgg atcttatcta aatgatagca      3660
tctctcctaa tgagagcata gatgatgaac atttgttaat ccagcattac tgccaaagtt      3720
tgaaccagga ctccccctg agccagcctc gtagtcctgc ccagatcttg atttccttag      3780
agagtgagga aagaggggag ctagagagaa tcctagcaga tcttgaggaa gaaaacagga      3840
atctgcaagc agaatatgac cgtctaaagc agcagcacga acataaaggc ctgtccccac      3900
tgccgtcccc tcctgaaatg atgcccacct ctccccagag tccccgggat gctgagctca      3960
ttgctgaggc caagctactg cgtcaacaca aaggccgcct ggaagccagg atgcaaatcc      4020
tggaagacca caataaacag ctggagtcac agttacacag gctaaggcag ctgctggagc      4080
aaccccaggc agaggccaaa gtgaatggca caacggtgtc ctctccttct acctctctac      4140
agaggtccga cagcagtcag cctatgctgc tccgagtggt tggcagtcaa acttcggact      4200
ccatgggtga ggaagatctt ctcagtcctc cccaggacac aagcacaggg ttagaggagg      4260
tgatggagca actcaacaac tccttcccta gttcaagagg aagaaatacc cctggaaagc      4320
caatgagaga ggacacaatg tagcagacat gataagatac attgatgagt ttggacaaac      4380
cacaactaga atgcagtgaa aaaaatgctt tatttgtgaa atttgtgatg ctattgcttt      4440
atttgtaacc attataagct gcaataaaca agttaacaac aacaattgca ttcattttat      4500
gtttcaggtt caggggggaga tgtgggaggt ttttttaagc aagtaaaacc tctacaaatg      4560
tggtattgtc gactttacta gttttttacgt agataagtag catggcgggt taatcattaa      4620
ctacaaggaa cccctagtga tggagttggc cactccctct ctgcgcgctc gctcgctcac      4680
tgaggccggg cgaccaaagg tcgcccgacg cccgggcttt gcccgggcgg cctcagtgag      4740
cgagcgagcg cgc                                                        4753
```

<210> SEQ ID NO 10
<211> LENGTH: 800
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: "HR WL1 partial OPT1"

<400> SEQUENCE: 10

| | | | | | |
|---|---|---|---|---|---|
| ttaacaagat | gtacaaggac | cggcaggggc | ggttcgaccg | gtcggtggag | aagtggcggc | 60 |
| ggttccacta | cgacatcaag | atcttcaacc | agtggctgac | ggaggcgag | cagttcctgc | 120 |
| ggaagacgca | gatcccggag | aactgggagc | acgcgaagta | caagtggtac | ctgaaggagc | 180 |
| tgcaggacgg | catcgggcag | cggcagacgg | tggtccggac | gctgaacgcg | acggggagg | 240 |
| agatcatcca | gcagtcctcg | aagacggacg | cctcgatcct | gcaggagaag | ctggggagcc | 300 |
| tgaacctgcg | gtggcaggag | gtctgcaagc | agctgtcgga | ccggaagaag | cggctggagg | 360 |
| agcagccgga | cctcgcgccg | gggctgacca | cgatcgggc | ctcgccgacg | cagacggtga | 420 |
| cgctggtgac | gcagccggtg | gtgacgaagg | agacggccat | ctccaagctg | gagatgccgt | 480 |
| cgtccctgat | gctggaggtg | ccggcgctgg | cggacttcaa | ccgggcgtgg | acggagctga | 540 |
| ccgactggct | gtcgctgctg | gaccaggtga | tcaagtcgca | gagggtgatg | gtgggcgacc | 600 |
| tggaggacat | caacgagatg | atcatcaagc | agaaggcgac | gatgcaggac | ctggagcagc | 660 |
| ggcggcccca | gctggaggag | ctgatcaccg | cggcccagaa | cctgaagaac | aagacctcga | 720 |
| accaggaggc | gcggacgatc | atcacggacc | ggatcgagcg | gatccagaac | cagtgggacg | 780 |
| aggtgcagga | gcacctgcag | | | | 800 |

<210> SEQ ID NO 11
<211> LENGTH: 800
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: "HR WL1 partial OPT2"

<400> SEQUENCE: 11

| | | | | | |
|---|---|---|---|---|---|
| ttaacaagat | gtacaaggac | aggcagggga | ggtttgacag | gtctgtggag | aagtggagga | 60 |
| ggttccacta | tgacatcaag | atcttcaacc | agtggctgac | agaggctgag | cagttcctca | 120 |
| ggaagaccca | gatccctgag | aactgggagc | atgccaagta | caagtggtac | ctgaaggagc | 180 |
| tccaggatgg | cattgggcag | aggcagactg | tggtcaggac | cctgaatgcc | actggggagg | 240 |
| agatcatcca | gcagtcctcc | aagacagatg | ccagcatcct | gcaggagaag | ctggggagcc | 300 |
| tgaacctgag | gtggcaggag | gtctgcaagc | agctgtcaga | caggaagaag | aggctggagg | 360 |
| agcagcctga | cctggcccct | ggcctgacca | ccattgggc | ctccccacc | cagactgtga | 420 |
| ccctggtgac | ccagcctgtg | gtgaccaagg | agactgccat | ctccaagctg | gagatgccct | 480 |
| cctccctgat | gctggaggtg | cctgcccgg | cagacttcaa | cagggcctgg | acagagctga | 540 |
| ctgactggct | gtccctgctg | gaccaggtga | tcaagtccca | gagggtgatg | gtggggacc | 600 |
| tggaggacat | caatgagatg | atcatcaagc | agaaggccac | catgcaggac | ctggagcaga | 660 |
| ggaggcccca | gctggaggag | ctcatcactg | ctgcccagaa | cctgaagaac | aagaccagca | 720 |
| accaggaggc | caggaccatc | atcactgaca | ggattgagag | gatccagaac | cagtgggatg | 780 |
| aggtgcagga | gcacctgcag | | | | 800 |

<210> SEQ ID NO 12
<211> LENGTH: 800
<212> TYPE: DNA
<213> ORGANISM: Artificial Sequence
<220> FEATURE:

<223> OTHER INFORMATION: Synthetic Polynucleotide
<220> FEATURE:
<221> NAME/KEY: misc_feature
<223> OTHER INFORMATION: "HR WL1 OPT"

<400> SEQUENCE: 12

| | | | | | |
|---|---|---|---|---|---|
| ttaacaagat | gtacaaggac | aggcagggca | ggtttgacag | gtcagtggag | aagtggagga | 60 |
| ggttccacta | tgacatcaag | atcttcaacc | agtggctgac | agaggctgag | cagttcctaa | 120 |
| ggaagaccca | gatccctgag | aactgggagc | atgccaagta | caagtggtac | cttaaggagc | 180 |
| tgcaggatgg | cattggccag | aggcagacag | tggtgaggac | cctgaatgct | acaggggagg | 240 |
| agattatcca | gcagagcagc | aagacagatg | ccagtatcct | gcaggagaag | ctgggcagcc | 300 |
| tgaacctgag | gtggcaggag | gtgtgcaagc | agctgtctga | caggaagaag | aggctggagg | 360 |
| agcagcctga | cctggcccct | ggcctgacaa | caattggagc | cagccctacc | cagacagtga | 420 |
| ccctggtgac | ccagcctgtg | gtgaccaagg | agacagctat | cagcaagctg | gagatgccca | 480 |
| gcagcctgat | gctggaggtg | cctgccctgg | ctgacttcaa | cagggcctgg | acagagctga | 540 |
| cagactggct | gagcctgctg | gaccaggtga | tcaagagcca | gagggtgatg | gtggggggacc | 600 |
| tggaggatat | caatgagatg | attatcaagc | agaaggctac | aatgcaggac | ctggagcaga | 660 |
| ggaggcccca | gctggaggag | ctgattacag | ctgcccagaa | cctaaagaac | aagaccagca | 720 |
| accaggaggc | caggacaatt | attacagaca | ggattgagag | gatccagaac | cagtgggatg | 780 |
| aggtgcagga | gcacctgcag | | | | | 800 |

<210> SEQ ID NO 13
<211> LENGTH: 4687
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: "WL2 wt 5'AAV"

<400> SEQUENCE: 13

| | | | | | |
|---|---|---|---|---|---|
| ctgcgcgctc | gctcgctcac | tgaggccgcc | cgggcaaagc | ccgggcgtcg | ggcgaccttt | 60 |
| ggtcgcccgg | cctcagtgag | cgagcgagcg | cgcagagagg | gagtggccaa | ctccatcact | 120 |
| aggggttcct | tgtagttaat | gattaacccg | ccatgctact | tatctacgta | ttggccgtcc | 180 |
| gccctcggca | ccatcctcac | gacacccaaa | tatggcgacg | ggtgaggaat | ggtggggagt | 240 |
| tatttttaga | gcggtgagga | aggtgggcag | gcagcaggtg | ttggcgctct | aaaaataact | 300 |
| cccgggagtt | attttttagag | cggaggaatg | gtggacaccc | aaatatggcg | acggttcctc | 360 |
| acccgtcgcc | atatttgggt | gtccgccctc | ggccggggcc | gcattcctgg | gggccgggcg | 420 |
| gtgctcccgc | ccgcctcgat | aaaaggctcc | ggggccggcg | gcggcccacg | agctacccgg | 480 |
| aggagcggga | ggcgccaagc | tctagagtaa | gtatcaaggt | tacaagacag | gtttaaggag | 540 |
| accaatagaa | actgggcttg | tcgagacaga | gaagactctt | gcgtttctga | taggcaccta | 600 |
| ttggtcttac | tgacatccac | tttgcctttc | tctccacagg | ccaccatgct | tggtgggaa | 660 |
| gaagtagagg | actgttatga | aagagaagat | gttcaaaaga | aaacattcac | aaaatgggta | 720 |
| aatgcacaat | tttctaagtt | tgggaagcag | catattgaga | acctcttcag | tgacctacag | 780 |
| gatgggaggc | gcctcctaga | cctcctcgaa | ggcctgacag | ggcaaaaact | gccaaaagaa | 840 |
| aaaggatcca | caagagttca | tgccctgaac | aatgtcaaca | aggcactgcg | ggttttgcag | 900 |
| aacaataatg | ttgatttagt | gaatattgga | agtactgaca | tcgtagatgg | aaatcataaa | 960 |

```
ctgactcttg gtttgatttg aatataatc ctccactggc aggtcaaaaa tgtaatgaaa    1020
aatatcatgg ctggattgca acaaaccaac agtgaaagaa ttctcctgag ctgggtccga    1080
caatcaactc gtaattatcc acaggttaat gtaatcaact tcaccaccag ctggtctgat    1140
ggcctggctt tgaatgctct catccatagt cataggccag acctatttga ctggaatagt    1200
gtggtttgcc agcagtcagc cacacaacga ctggaacatg cattcaacat cgccagatat    1260
caattaggca tagagaaact actcgatcct gaagatgttg ataccaccta tccagataag    1320
aagtccatct taatgtacat cacatcactc ttccaagttt tgcctcaaca agtgagcatt    1380
gaagccatcc aggaagtgga aatgttgcca aggccaccta agtgactaa agaagaacat    1440 tttcagttac atcatcaaat gcactattct caacagatca cggtcagtct agcacaggga    1500
tatgagagaa cttcttcccc taagcctcga ttcaagagct atgcctacac acaggctgct    1560
tatgtcacca cctctgaccc tacacggagc ccatttcctt cacagcattt ggaagctcct    1620
gaagacaagt catttggcag ttcattgatg gagagtgaag taaacctgga ccgttatcaa    1680
acagctttag aagaagtatt atcgtggctt ctttctgctg aggacacatt gcaagcacaa    1740
ggagagattt ctaatgatgt ggaagtggtg aaagaccagt tcatactca tgaggggtac    1800 atgatggatt tgacagccca tcagggccgg gttggtaata ttctacaatt gggaagtaag    1860
ctgattggaa caggaaaatt atcagaagat gaagaaactg aagtacaaga gcagatgaat    1920
ctcctaaatt caagatggga atgcctcagg gtagctagca tggaaaaaca aagcaattta    1980
catagagttt taatggatct ccagaatcag aaactgaaag agttgaatga ctggctaaca    2040
aaaacagaag aaagaacaag gaaaatggag gaagagcctc ttggacctga tcttgaagac    2100
ctaaaacgcc aagtacaaca acataaggtg cttcaagaag atctagaaca gaacaagtc    2160 agggtcaatt ctctcactca catggtggtg gtagttgatg aatctagtgg agatcacgca    2220
actgctgctt tggaagaaca acttaaggta ttgggagatc gatgggcaaa catctgtaga    2280
tggacagaag accgctgggt tctttttacaa gacatccttc tcaaatggca acgtcttact    2340
gaagaacagt gccttttttag tgcatggctt tcagaaaaag aagatgcagt gaacaagatt    2400
cacacaactg gctttaaaga tcaaaatgaa atgttatcaa gtcttcaaaa actggccgtt    2460
ttaaaagcgg atctagaaaa gaaaaagcaa tccatgggca aactgtattc actcaaacaa    2520
gatcttcttt caacactgaa gaataagtca gtgacccaga gacggaagc atggctggat    2580 aactttgccc ggtgttggga taatttagtc caaaaacttg aaaagagtac agcacagatt    2640
tcacaggctg tcaccaccac tcagccatca ctaacacaga caactgtaat ggaaacagta    2700
actacggtga ccacaaggga acagatcctg gtaaagcatg ctcaagagga acttccacca    2760
ccacctcccc aaaagaagag gcagattact gtggatggtt tggagaaaac tgtaagcctc    2820
cagaaagatc tatcagagat gcacgaatgg atgacacaag ctgaagaaga gtatcttgag    2880
agagattttg aatataaaac tccagatgaa ttacagaaag cagttgaaga gatgaagaga    2940
gctaaagaag aggcccaaca aaaagaagcg aaagtgaaac tccttactga gtctgtaaat    3000
agtgtcatag ctcaagctcc acctgtagca caagaggcct taaaaaagga acttgaaact    3060
ctaaccacca actaccagtg gtctctgcact aggctgaatg ggaaatgcaa gactttggaa    3120
gaagtttggg catgttggca tgagttattg tcatacttgg agaaagcaaa caagtggcta    3180
aatgaagtag aatttaaact taaaaccact gaaaacattc ctggcggagc tgaggaaatc    3240
tctgaggtgc tagattcact tgaaaatttg atgcgacatt cagaggataa cccaaatcag    3300
```

```
attcgcatat tggcacagac cctaacagat ggcggagtca tggatgagct aatcaatgag    3360
gaacttgaga catttaattc tcgttggagg gaactacatg aagaggctgt aaggaggcaa    3420
aagttgcttg aacagccttt gaaggaattg gagcagttta actcagatat acaaaaattg    3480
cttgaaccac tggaggctga aattcagcag ggggtgaatc tgaaagagga agacttcaat    3540
aaagatatga atgaagacaa tgagggtact gtaaaagaat tgttgcaaag aggagacaac    3600
ttacaacaaa gaatcacaga tgagagaaag agagaggaaa taaagataaa acagcagctg    3660
ttacagacaa acataacgc gttcaaggat ttgaggtctc aaagaagaaa aaaggctcta    3720
gaaatttctc atcagtggta tcagtacaag aggcaggctg atgatctcct gaaatgcttg    3780
gatgacattg aaaaaaaatt agccagccta cctgagccca gagatgaaag gaaaataaag    3840
gaaattgatc gggaattgca gaagaagaaa gaggagctga atgcagtgcg taggcaagct    3900
gagggcttgt ctgaggatgg ggccgcaatg gcagtggagc caactcagat ccagctcagc    3960
aagcgctggc gggaaattga gagcaaattt gctcagtttc gaagactcaa ctttgcacaa    4020
attcacactg tccgtgaaga aacgatgatg gtgatgactg aagacatgcc tttggaaatt    4080
tcttatgtgc cttctactta tttgactgaa atcactcatg tctcacaagc cctattagaa    4140
gtggaacaac ttctcaatgc tcctgacctc tgtgctaagg actttgaaga tctctttaag    4200
caagaggagt ctctgaagaa tataaaagat agtctacaac aaagctcagg tcggattgac    4260
attattcata gcaagaagac agcagcattg caaagtgcaa cgcctgtgga agggtgaag    4320
ctacaggaag ctctctccca gcttgatttc caatgggaaa agttaacaa aatgtacaag    4380
gaccgacaag ggcgatttga cagatctgtt gagaaatggc ggcgttttca ttatgatata    4440
aagatattta atcagtggct aacagaagct gaacagtttc tcagaaagac acaaattcct    4500
accggttttg cggccgcttt acgtagataa gtagcatggc gggttaatca ttaactacaa    4560
ggaaccccta gtgatggagt tggccactcc ctctctgcgc gctcgctcgc tcactgaggc    4620
cgggcgacca aggtcgccc gacgcccggg ctttgcccgg cggcctcag tgagcgagcg    4680
agcgcgc                                                              4687
```

<210> SEQ ID NO 14
<211> LENGTH: 4739
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: "WL2 wt 3'AAV"

<400> SEQUENCE: 14

```
ctgcgcgctc gctcgctcac tgaggccgcc cgggcaaagc ccgggcgtcg ggcgaccttt     60
ggtcgcccgg cctcagtgag cgagcgagcg cgcagagagg gagtggccaa ctccatcact    120
aggggttcct tgtagttaat gattaacccg ccatgctact tatctacgta ttacgcgttt    180
taaagaagaa aaaaggctct agaaatttct catcagtggt atcagtacaa gaggcaggct    240
gatgatctcc tgaaatgctt ggatgacatt gaaaaaaaat tagccagcct acctgagccc    300
agagatgaaa ggaaaataaa ggaaattgat cgggaattgc agaagaagaa agaggagctg    360
aatgcagtgc gtaggcaagc tgagggcttg tctgaggatg gggccgcaat ggcagtggag    420
ccaactcaga tccagctcag caagcgctgg cgggaaattg agagcaaatt tgctcagttt    480
cgaagactca actttgcaca aattcacact gtccgtgaag aaacgatgat ggtgatgact    540
```

```
gaagacatgc ctttggaaat ttcttatgtg ccttctactt atttgactga aatcactcat     600
gtctcacaag ccctattaga agtggaacaa cttctcaatg ctcctgacct ctgtgctaag     660
gactttgaag atctctttaa gcaagaggag tctctgaaga atataaaaga tagtctacaa     720
caaagctcag gtcggattga cattattcat agcaagaaga cagcagcatt gcaaagtgca     780
acgcctgtgg aaagggtgaa gctacaggaa gctctctccc agcttgattt ccaatgggaa     840
aaagttaaca aaatgtacaa ggaccgacaa gggcgatttg acagatctgt tgagaaatgg     900
cggcgttttc attatgatat aaagatattt aatcagtggc taacagaagc tgaacagttt     960
ctcagaaaga cacaaattcc tgagaattgg gaacatgcta aatacaaatg gtatcttaag    1020
gaactccagg atggcattgg gcagcggcaa actgttgtca gaacattgaa tgcaactggg    1080
gaagaaataa ttcagcaatc ctcaaaaaca gatgccagta ttctacagga aaaattggga    1140
agcctgaatc tgcggtggca ggaggtctgc aaacagctgt cagacagaaa aaagaggcta    1200
gaagagcagc ctgacctagc tcctggactg accactattg gagcctctcc tactcagact    1260
gttactctgg tgacacaacc tgtggttact aaggaaactg ccatctccaa actagaaatg    1320
ccatcttcct tgatgttgga ggtaccaact catagattac tgcaacagtt cccctggac    1380 ctggaaaagt ttcttgcctg gcttacgaa gctgaaacac tgccaatgt cctacaggat     1440 gctacccgta aggaaaggct cctagaagac tccaagggag taaaagagct gatgaaacaa    1500
tggcaagacc tccaaggtga aattgaagct cacacagatg tttatcacaa cctggatgaa    1560
aacagccaaa aaatcctgag atccctggaa ggttccgatg atgcagtcct gttacaaaga    1620
cgtttggata acatgaactt caagtggagt gaacttcgga aaaagtctct caacattagg    1680
tcccatttgg aagccagttc tgaccagtgg aagcgtctgc acctttctct gcaggaactt    1740
ctggtgtggc tacagctgaa agatgatgaa ttaagccggc aggcacctat ggaggcgac    1800 tttccagcag ttcagaagca gaacgatgta cataggcct tcaagaggga attgaaaact    1860
aaagaacctg taatcatgag tactcttgag actgtacgaa tatttctgac agagcagcct    1920
ttggaaggac tagagaaact ctaccaggag cccagagagc tgcctcctga ggagagagcc    1980
cagaatgtca ctcggcttct acgaaagcag gctgaggagg tcaatactga gtgggaaaaa    2040
ttgaacctgc actccgctga ctggcagaga aaaatagatg agacccttga aagactccag    2100
gaacttcaag aggccacgga tgagctggac ctcaagctgc gccaagctga ggtgatcaag    2160
ggatcctggc agcccgtggg cgatctcctc attgactctc tccaagatca cctcgagaaa    2220
gtcaaggcac ttcgaggaga aattgcgcct ctgaaagaga cgtgagcca cgtcaatgac    2280 cttgctcgcc agcttaccac tttgggcatt cagctctcac cgtataacct cagcactctg    2340
gaagacctga acaccagatg gaagcttctg caggtggccg tcgaggaccg agtcaggcag    2400
ctgcatgaag cccacaggga ctttggtcca gcatctcagc actttctttc cacgtctgtc    2460
cagggtccct gggagagagc catctcgcca aacaaagtgc cctactatat caaccacgag    2520
actcaaacaa cttgctggga ccatcccaaa atgacagagc tctaccagtc tttagctgac    2580
ctgaataatg tcagattctc agcttatagg actgccatga aactccgaag actgcagaag    2640 gcccttgct tggatctctt gagcctgtca gctgcatgtg atgccttgga ccagcacaac    2700
ctcaagcaaa atgaccagcc catggatatc ctgcagatta ttaattgttt gaccactatt    2760
tatgaccgcc tggagcaaga gcacaacaat ttggtcaacg tccctctctg cgtggatatg    2820
tgtctgaact ggctgctgaa tgtttatgat acggacgaa cagggaggat ccgtgtcctg    2880
tcttttaaaa ctggcatcat ttccctgtgt aaagcacatt tggaagacaa gtacagatac    2940
```

```
cttttcaagc aagtggcaag ttcaacagga ttttgtgacc agcgcaggct gggcctcctt    3000
ctgcatgatt ctatccaaat tccaagacag ttgggtgaag ttgcatcctt tgggggcagt    3060
aacattgagc caagtgtccg gagctgcttc caatttgcta ataataagcc agagatcgaa    3120
gcggccctct tcctagactg gatgagactg aacccagt ccatggtgtg gctgccgtc       3180 ctgcacagag tggctgctgc agaaactgcc aagcatcagg ccaaatgtaa catctgcaaa    3240
gagtgtccaa tcattggatt caggtacagg agtctaaagc actttaatta tgacatctgc    3300
caaagctgct ttttttctgg tcgagttgca aaaggccata aaatgcacta tcccatggtg    3360
gaatattgca ctccgactac atcaggagaa gatgttcgag actttgccaa ggtactaaaa    3420
aacaaatttc gaaccaaaag gtattttgcg aagcatcccc gaatgggcta cctgccagtg    3480
cagactgtct tagaggggga caacatggaa actcccgtta ctctgatcaa cttctggcca    3540
gtagattctg cgcctgcctc gtcccctcag cttttcacacg atgatactca ttcacgcatt    3600
gaacattatg ctagcaggct agcagaaatg gaaaacagca atggatctta tctaaatgat    3660
agcatctctc ctaatgagag catagatgat gaacatttgt taatccagca ttactgccaa    3720
agtttgaacc aggactcccc cctgagccag cctcgtagtc ctgcccagat cttgatttcc    3780
ttagagagtg aggaaagagg ggagctagag agaatcctag cagatcttga ggaagaaaac    3840
aggaatctgc aagcagaata tgaccgtcta aagcagcagc acgaacataa aggcctgtcc    3900
ccactgccgt cccctcctga aatgatgccc acctctcccc agagtcccg ggatgctgag      3960 ctcattgctg aggccaagct actgcgtcaa cacaaaggcc gcctggaagc caggatgcaa    4020
atcctggaag accacaataa acagctggag tcacagttac acaggctaag gcagctgctg    4080 gagcaaccc aggcagaggc caaagtgaat ggcacaacgg tgtcctctcc ttctacctct      4140
ctacagaggt ccgacagcag tcagcctatg ctgctccgag tggttggcag tcaaacttcg    4200
gactccatgg gtgaggaaga tcttctcagt cctccccagg acacaagcac agggttagag    4260
gaggtgatgg agcaactcaa caactccttc cctagttcaa gaggaagaaa taccctgga    4320 aagccaatga gaggacac aatgtagcag acatgataag atacattgat gagttttggac      4380 aaaccacaac tagaatgcag tgaaaaaat gctttatttg tgaaatttgt gatgctattg     4440
ctttatttgt aaccattata agctgcaata aacaagttaa caacaacaat tgcattcatt    4500
ttatgtttca ggttcagggg gagatgtggg aggttttta aagcaagtaa aacctctaca     4560
aatgtggtat ttacgtagat aagtagcatg gcgggttaat cattaactac aaggaaccccc     4620 tagtgatgga gttggccact ccctctctgc gcgctcgctc gctcactgag gccgggcgac     4680
caaaggtcgc ccgacgcccg ggctttgccc gggcggcctc agtgagcgag cgagcgcgc      4739
```

<210> SEQ ID NO 15
<211> LENGTH: 800
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: "HR WL2 partial OPT1"

<400> SEQUENCE: 15

```
agcggcggaa gaaggccctg gagatctccc accagtggta ccagtacaag cggcaggccg      60
acgacctcct gaagtgcctg gacgacatcg agaagaagct ggccagcctg ccggagcccc    120
gggacgagcg caagatcaag gagatcgacc gggagctgca gaagaagaag gaggagctga    180
```

```
acgccgtgcg ccggcaggcc gagggcctgt ccgaggacgg ggccgccatg gccgtggagc      240
ccacccagat ccagctcagc aagcgctggc gggagatcga gagcaagttc gcccagttcc      300
ggcgcctcaa cttcgcccag atccacaccg tccgggagga gacgatgatg gtgatgaccg      360
aggacatgcc cctggagatc tcctacgtgc cctccaccta cctgaccgag atcacccacg      420
tctcccaggc cctgctggag gtggagcagc tcctcaacgc ccccgacctc tgcgccaagg      480
acttcgagga cctcttcaag caggaggagt ccctgaagaa catcaaggac agcctgcagc      540
agagctccgg gcggatcgac atcatccaca gcaagaagac cgccgccctg cagagcgcca      600
cgcccgtgga gcgggtgaag ctgcaggagg ccctctccca gctggacttc cagtgggaga      660
aggtgaacaa gatgtacaag gaccggcagg ggcggttcga ccgctccgtg gagaagtggc      720
ggcgcttcca ctacgacatc aagatcttca accagtggct gaccgaggcc gagcagttcc      780
tccggaagac ccagatcccc                                                 800
```

<210> SEQ ID NO 16  
<211> LENGTH: 800  
<212> TYPE: DNA  
<213> ORGANISM: Artificial Sequence  
<220> FEATURE:  
<223> OTHER INFORMATION: Synthetic Polynucleotide  
<220> FEATURE:  
<221> NAME/KEY: misc_feature  
<223> OTHER INFORMATION: "HR WL2 partial OPT2"

<400> SEQUENCE: 16

```
agaggaggaa gaaggccctg gagatcagcc accagtggta ccagtacaag aggcaggctg       60
atgacctcct gaagtgcctg gatgacattg agaagaagct ggccagcctc cctgagccca      120
gggatgagag gaagatcaag gagattgaca gggagctgca gaagaagaag gaggagctga      180
atgcagtgag gaggcaggct gagggcctgt ctgaggatgg ggctgccatg gcagtggagc      240
ccacccagat ccagctcagc aagaggtgga gggagattga gagcaagttt gcccagttca      300
ggaggctcaa cttttgcccag atccacactg tcagggagga gaccatgatg gtgatgactg      360
aggacatgcc cctggagatc agctatgtgc ccagcaccta cctgactgag atcacccatg      420
tcagccaggc cctcctggag gtggagcagc tcctcaatgc ccctgacctc tgtgccaagg      480
actttgagga cctcttcaag caggaggaga gcctgaagaa catcaaggac agcctgcagc      540
agagctcagg caggattgac atcatccaca gcaagaagac agcagccctg cagagtgcca      600
cccctgtgga gagggtgaag ctgcaggagg ccctcagcca gctggacttc cagtgggaga      660
aggtgaacaa gatgtacaag gacaggcagg ggaggtttga caggagtgtg gagaagtgga      720
ggaggttcca ctatgacatc aagatcttca accagtggct gacagaggct gagcagttcc      780
tcaggaagac ccagatccct                                                 800
```

<210> SEQ ID NO 17  
<211> LENGTH: 800  
<212> TYPE: DNA  
<213> ORGANISM: Artificial Sequence  
<220> FEATURE:  
<223> OTHER INFORMATION: Synthetic Polynucleotide  
<220> FEATURE:  
<221> NAME/KEY: misc_feature  
<223> OTHER INFORMATION: "HR WL2 OPT"

<400> SEQUENCE: 17

```
agaggaggaa gaaggccctg gagatcagcc accagtggta ccagtacaag aggcaggctg       60
```

| | |
|---|---|
| atgacctgct gaagtgcctg atgacattg agaagaagct ggccagcctg cctgagccca | 120 |
| gggatgagag gaagatcaag gagattgaca gggagctgca gaagaagaag gaggagctga | 180 |
| atgctgtgag gaggcaggct gagggcctgt ctgaggatgg ggctgccatg gctgtggagc | 240 |
| ccacccagat ccagctgagc aagaggtgga gggagattga gagcaagttt gcccagttca | 300 |
| ggaggctgaa ctttgcccag atccacactg tgagggagga gaccatgatg gtgatgacag | 360 |
| aggacatgcc cctggagatc agctatgtgc ccagcaccta cctgactgag atcacccatg | 420 |
| tgagccaggc cctgctggag gtggagcagc tgctgaatgc ccctgacctg tgtgccaagg | 480 |
| actttgagga cctgttcaag caggaggaga gcctgaagaa catcaaggac agcctgcagc | 540 |
| agagctctgg caggattgac atcatccaca gcaagaagac tgctgccctg cagtctgcca | 600 |
| cccctgtgga gagggtgaag ctgcaggagg ccctgagcca gctggacttc agtgggaga | 660 |
| aggtgaacaa gatgtacaag gacaggcagg gcaggtttga caggtctgtg gagaagtgga | 720 |
| ggaggttcca ctatgacatc aagatcttca accagtggct gactgaggct gagcagttcc | 780 |
| tgaggaagac ccagatccct | 800 |

<210> SEQ ID NO 18
<211> LENGTH: 4655
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: "DD 5'AAV"

<400> SEQUENCE: 18

| | |
|---|---|
| ctgcgcgctc gctcgctcac tgaggccgcc cgggcaaagc ccgggcgtcg ggcgaccttt | 60 |
| ggtcgcccgg cctcagtgag cgagcgagcg cgcagagagg gagtggccaa ctccatcact | 120 |
| aggggttcct tgtagttaat gattaacccg ccatgctact tatctacgta tttactagtt | 180 |
| ttctcgagtt tggccgtccg ccctcggcac catcctcacg acacccaaat atggcgacgg | 240 |
| gtgaggaatg gtggggagtt atttttagag cggtgaggaa ggtgggcagg cagcaggtgt | 300 |
| tggcgctcta aaataactc ccgggagtta ttttagagc ggaggaatgg tggacaccca | 360 |
| aatatggcga cggttcctca cccgtcgcca tatttgggtg tccgccctcg gccggggccg | 420 |
| cattcctggg ggccgggcgg tgctcccgcc cgcctcgata aaaggctccg gggccggcgg | 480 |
| cggcccacga gctacccgga ggagcgggag gcgccaagct ctagagtaag tatcaaggtt | 540 |
| acaagacagg tttaaggaga ccaatagaaa ctgggcttgt cgagacagag aagactcttg | 600 |
| cgtttctgat aggcacctat tggtcttact gacatccact ttgcctttct ctccacaggc | 660 |
| caccatgctt ggtgggaag aagtagagga ctgttatgaa agaagatg ttcaaaagaa | 720 |
| aacattcaca aaatgggtaa atgcacaatt ttctaagttt gggaagcagc atattgagaa | 780 |
| cctcttcagt gacctacagg atgggaggcg cctcctagac ctcctcgaag gcctgacagg | 840 |
| gcaaaaactg ccaaaagaaa aaggatccac aagagttcat gccctgaaca atgtcaacaa | 900 |
| ggcactgcgg gttttgcaga caataatgt tgatttagtg aatattggaa gtactgacat | 960 |
| cgtagatgga aatcataaac tgactcttgg tttgatttgg aatataatcc tccactggca | 1020 |
| ggtcaaaaat gtaatgaaaa atatcatggc tggattgcaa caaaccaaca gtgaaaagat | 1080 |
| tctcctgagc tgggtccgac aatcaactcg taattatcca caggttaatg taatcaactt | 1140 |
| caccaccagc tggtctgatg gcctggcttt gaatgctctc atccatagtc ataggccaga | 1200 |

```
cctatttgac tggaatagtg tggtttgcca gcagtcagcc acacaacgac tggaacatgc      1260
attcaacatc gccagatatc aattaggcat agagaaacta ctcgatcctg aagatgttga      1320
taccacctat ccagataaga agtccatctt aatgtacatc acatcactct tccaagtttt      1380
gcctcaacaa gtgagcattg aagccatcca ggaagtggaa atgttgccaa ggccacctaa      1440
agtgactaaa gaagaacatt ttcagttaca tcatcaaatg cactattctc aacagatcac      1500
ggtcagtcta gcacagggat atgagagaac ttcttcccct aagcctcgat caagagcta       1560 tgcctacaca caggctgctt atgtcaccac ctctgacccc acacggagcc catttccttc      1620
acagcatttg gaagctcctg aagacaagtc atttggcagt tcattgatgg agagtgaagt      1680
aaacctggac cgttatcaaa cagctttaga agaagtatta tcgtggcttc tttctgctga      1740
ggacacattg caagcacaag gagagatttc taatgatgtg gaagtggtga agaccagtt       1800 tcatactcat gaggggtaca tgatggattt gacagcccat cagggccggg ttggtaatat      1860
tctacaattg ggaagtaagc tgattggaac aggaaaatta tcagaagatg aagaaactga     1920
agtacaagag cagatgaatc tcctaaattc aagatggaa tgcctcaggg tagctagcat       1980
ggaaaaacaa agcaatttac atagagtttt aatggatctc cagaatcaga aactgaaaga      2040
gttgaatgac tggctaacaa aaacagaaga agaacaagg aaaatggagg aagagcctct       2100
tggacctgat cttgaagacc taaaacgcca agtacaacaa cataaggtgc ttcaagaaga     2160
tctagaacaa gaacaagtca gggtcaattc tctcactcac atggtggtgg tagttgatga     2220
atctagtgga gatcacgcaa ctgctgcttt ggaagaacaa cttaaggtat gggagatcg      2280 atgggcaaac atctgtagat ggacagaaga ccgctgggtt cttttacaag acatccttct     2340
caaatggcaa cgtcttactg aagaacagtg cctttttagt gcatggcttt cagaaaaaga     2400
agatgcagtg aacaagattc acacaactgg ctttaaagat caaaatgaaa tgttatcaag     2460
tcttcaaaaa ctggccgttt taaaagcgga tctagaaaag aaaaagcaat ccatgggcaa     2520
actgtattca ctcaaacaag atcttctttc aacactgaag aataagtcag tgacccagaa     2580
gacggaagca tggctggata ctttgcccg gtgttgggat aatttagtcc aaaaacttga     2640
aaagagtaca gcacagattt cacaggaaat ttcttatgtg ccttctactt atttgactga      2700
aatcactcat gtctcacaag ccctattaga agtggaacaa cttctcaatg ctcctgacct     2760
ctgtgctaag gactttgaag atctcttta gcaagaggag tctctgaaga atataaaga       2820 tagtctacaa caaagctcag gtcggattga cattattcat agcaagaaga cagcagcatt     2880
gcaaagtgca acgcctgtgg aaagggtgaa gctacaggaa gctctctccc agcttgattt      2940
ccaatgggaa aaagttaaca aatgtacaa ggaccgacaa gggcgatttg acagatctgt       3000
tgagaaatgg cggcgttttc attatgatat aaagatattt aatcagtggc taacagaagc     3060
tgaacagttt ctcagaaaga cacaaattcc tgagaattgg gaacatgcta aatacaaatg     3120
gtatcttaag gaactccagg atggcattgg gcagcggcaa actgttgtca gaacattgaa     3180
tgcaactggg gaagaaataa ttcagcaatc ctcaaaaaca gatgccagta ttctacagga    3240
aaaattggga agcctgaatc tgcggtggca ggaggtctgc aaacagctgt cagacagaaa    3300
aaagaggcta aagaacaaa agaatatctt gtcagaattt caaagagatt taaatgaatt     3360
tgttttatgg ttggaggaag cagataacat tgctagtatc ccacttgaac ctggaaaaga     3420
gcagcaacta aaagaaaagc ttgagcaagt caagttactg gtggaagagt tgcccctgcg     3480
ccagggaatt ctcaaacaat taaatgaaac tggaggaccc gtgcttgtaa gtgctcccat     3540
aagcccagaa gagcaagata aacttgaaaa taagctcaag cagacaaatc tccagtggat     3600
```

-continued

```
aaaggtttcc agagctttac ctgagaaaca aggagaaatt gaagctcaaa taaaagacct      3660
tgggcagctt gaaaaaaagc ttgaagacct tgaagagcag ttaaatcatc tgctgctgtg      3720
gttatctcct attaggaatc agttggaaat ttataaccaa ccaaaccaag aaggaccatt      3780
tgacgttcag gaaactgaaa tagcagttca agctaaacaa ccggatgtgg aagagatttt      3840
gtctaaaggg cagcatttgt acaaggaaaa accagccact cagccagtga agaggaagtt      3900
agaagatctg agctctgagt ggaaggcggt aaaccgttta cttcaagagc tgagggcaaa      3960
gcagcctgac ctagctcctg gactgaccac tattggagcc tctcctactc agactgttac      4020
tctggtgaca caacctgtgg ttactaagga aactgccatc tccaaactag aaatgccatc      4080
ttccttgatg ttggaggtac ctgctctggc agatttcaac cgggcttgga cagaacttac      4140
cgactggctt tctctgcttg atcaagttat aaaatcacag agggtgatgg tgggtgacct      4200
tgaggatatc aacgagatga tcatcaagca gaaggcaaca atgcaggatt tggaacagag      4260
gcgtccccag ttggaagaac tcattaccgc tgcccaaaat ttgaaaaaca agaccagcaa      4320
tcaagaggct agaacaatca ttacggatcg aattgaaaga attcagaatc agtgggatga      4380
agtacaagaa caccttcaga accggcgcca acagttgaat gaaatgttaa aggattcaac      4440
acaatggctg gaagctaagg aagaatttac gcgttttgcg gccgctttac gtagataagt      4500
agcatggcgg gttaatcatt aactacaagg aaccccctagt gatggagttg ccactccct      4560 ctctgcgcgc tcgctcgctc actgaggccg ggcgaccaaa ggtcgcccga cgcccgggct      4620
ttgcccgggc ggcctcagtg agcgagcgag cgcgc                                 4655
```

<210> SEQ ID NO 19
<211> LENGTH: 4262
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: "DD 3'AAV"

<400> SEQUENCE: 19

```
ctgcgcgctc gctcgctcac tgaggccgcc cgggcaaagc ccgggcgtcg ggcgaccttt       60
ggtcgcccgg cctcagtgag cgagcgagcg cgcagagagg gagtggccaa ctccatcact      120
aggggttcct tgtagttaat gattaacccg ccatgctact tatctacgta tttgcggccg      180
ctttacgcgt ttttggaggt acctgctctg gcagatttca accgggcttg gacagaactt      240
accgactggc tttctctgct tgatcaagtt ataaaatcac agagggtgat ggtgggtgac      300
cttgaggata tcaacgagat gatcatcaag cagaaggcaa caatgcagga tttggaacag      360
aggcgtcccc agttggaaga actcattacc gctgcccaaa atttgaaaaa caagaccagc      420
aatcaagagg ctagaacaat cattacggat cgaattgaaa gaattcagaa tcagtgggat      480
gaagtacaag aacaccttca gaaccggcgc caacagttga tgaaatgtt aaaggattca      540 acacaatggc tggaagctaa ggaagaagct gagcaggtct taggacaggc cagagccaag      600
cttgagtcat ggaaggaggg tccctataca gtagatgcaa tccaaaagaa aatcacagaa      660
accaagcagt tggccaaaga cctccgccag tggcagacaa atgtagatgt ggcaaatgac      720 ttggcccctga aacttctccg ggattattct gcagatgata ccagaaaagt ccacatgata      780
acagagaata tcaatgcctc ttggagaagc attcataaaa gggtgagtga gcgagaggct      840
gctttggaag aaactcatag attactgcaa cagttccccc tggacctgga aaagtttctt      900
```

```
gcctggctta cagaagctga aacaactgcc aatgtcctac aggatgctac ccgtaaggaa      960
aggctcctag aagactccaa gggagtaaaa gagctgatga acaatggca agacctccaa      1020 ggtgaaattg aagctcacac agatgtttat cacaacctgg atgaaaacag ccaaaaaatc     1080
ctgagatccc tggaaggttc cgatgatgca gtcctgttac aaagacgttt ggataacatg     1140
aacttcaagt ggagtgaact tcggaaaaag tctctcaaca ttaggtccca tttggaagcc     1200
agttctgacc agtggaagcg tctgcacctt tctctgcagg aacttctggt gtggctacag     1260
ctgaaagatg atgaattaag ccggcaggca cctattggag gcgactttcc agcagttcag     1320
aagcagaacg atgtacatag ggccttcaag agggaattga aaactaaaga acctgtaatc     1380
atgagtactc ttgagactgt acgaatattt ctgacagagc agcctttgga aggactagag     1440
aaactctacc aggagcccag agagctgcct cctgaggaga gagcccagaa tgtcactcgg     1500
cttctacgaa agcaggctga ggaggtcaat actgagtggg aaaaattgaa cctgcactcc     1560
gctgactggc agagaaaaat agatgagacc cttgaaagac tccaggaact tcaagaggcc     1620
acggatgagc tggacctcaa gctgcgccaa gctgaggtga tcaagggatc ctggcagccc     1680
gtgggcgatc tcctcattga ctctctccaa gatcacctcg agaaagtcaa ggcacttcga     1740
ggagaaattg cgcctctgaa agagaacgtg agccacgtca atgaccttgc tcgccagctt     1800
accactttgg gcattcagct ctcaccgtat aacctcagca ctctggaaga cctgaacacc     1860
agatggaagc ttctgcaggt ggccgtcgag gaccgagtca ggcagctgca tgaagcccac     1920
agggactttg gtccagcatc tcagcacttt ctttccacgt ctgtccaggg tccctgggag     1980
agagccatct cgccaaacaa agtgccctac tatatcaacc acgagactca aacaacttgc     2040
tgggaccatc ccaaaatgac agagctctac cagtctttag ctgacctgaa taatgtcaga     2100
ttctcagctt ataggactgc catgaaactc cgaagactgc agaaggccct ttgcttggat     2160
ctcttgagcc tgtcagctgc atgtgatgcc ttggaccagc acaacctcaa gcaaaatgac     2220
cagcccatgg atatcctgca gattattaat tgtttgacca ctatttatga ccgcctggag     2280
caagagcaca caaatttggt caacgtccct ctctgcgtgg atatgtgtct gaactggctg     2340
ctgaatgttt atgatacggg acgaacaggg aggatccgtg tcctgtcttt taaaactggc     2400
atcatttccc tgtgtaaagc acatttggaa gacaagtaca gataccttt caagcaagtg     2460 gcaagttcaa caggatttg tgaccagcgc aggctgggcc tccttctgca tgattctatc     2520
caaattccaa gacagttggg tgaagttgca tcctttgggg gcagtaacat tgagccaagt     2580
gtccggagct gcttccaatt tgctaataat aagccagaga tcgaagcggc cctcttccta     2640
gactggatga actggaacc ccagtccatg gtgtggctgc ccgtcctgca cagagtggct     2700
gctgcagaaa ctgccaagca tcaggccaaa tgtaacatct gcaaagagtg tccaatcatt     2760
ggattcaggt acaggagtct aaagcacttt aattatgaca tctgccaaag ctgcttttt      2820 tctggtcgag ttgcaaaagg ccataaaatg cactatccca tggtgaata ttgcactccg      2880 actacatcag gagaagatgt tcgagacttt gccaaggtac taaaaaacaa atttcgaacc     2940
aaaaggtatt ttgcgaagca tccccgaatg ggctacctgc agtgcagac tgtcttagag      3000 ggggacaaca tggaaactcc cgttactctg atcaacttct ggccagtaga ttctgcgcct     3060
gcctcgtccc ctcagctttc acacgatgat actcattcac gcattgaaca ttatgctagc     3120
aggctagcag aaatggaaaa cagcaatgga tcttatctaa atgatagcat ctctcctaat     3180
gagagcatag atgatgaaca tttgttaatc cagcattact gccaaagttt gaaccaggac     3240
```

| | | |
|---|---|---|
| tccccccctga gccagcctcg tagtcctgcc cagatcttga tttccttaga gagtgaggaa | 3300 | |
| agagggagc tagagagaat cctagcagat cttgaggaag aaaacaggaa tctgcaagca | 3360 | |
| gaatatgacc gtctaaagca gcagcacgaa cataaaggcc tgtccccact gccgtcccct | 3420 | |
| cctgaaatga tgcccacctc tccccagagt ccccgggatg ctgagctcat tgctgaggcc | 3480 | |
| aagctactgc gtcaacacaa aggccgcctg gaagccagga tgcaaatcct ggaagaccac | 3540 | |
| aataaacagc tggagtcaca gttacacagg ctaaggcagc tgctggagca accccaggca | 3600 | |
| gaggccaaag tgaatggcac aacggtgtcc tctccttcta cctctctaca gaggtccgac | 3660 | |
| agcagtcagc ctatgctgct ccgagtggtt ggcagtcaaa cttcggactc catgggtgag | 3720 | |
| gaagatcttc tcagtcctcc ccaggacaca agcacagggt tagaggaggt gatggagcaa | 3780 | |
| ctcaacaact ccttccctag ttcaagagga gaaataccc ctggaaagcc aatgagagag | 3840 | |
| gacacaatgt agcagacatg ataagataca ttgatgagtt tggacaaacc acaactagaa | 3900 | |
| tgcagtgaaa aaaatgcttt atttgtgaaa tttgtgatgc tattgcttta tttgtaacca | 3960 | |
| ttataagctg caataaacaa gttaacaaca acaattgcat tcattttatg tttcaggttc | 4020 | |
| agggggagat gtgggaggtt ttttaaagca agtaaaacct ctacaaatgt ggtattgtcg | 4080 | |
| actttactag ttttttacgta gataagtagc atggcgggtt aatcattaac tacaaggaac | 4140 | |
| ccctagtgat ggagttggcc actccctctc tgcgcgctcg ctcgctcact gaggccgggc | 4200 | |
| gaccaaaggt cgcccgacgc ccgggctttg cccgggcggc ctcagtgagc gagcgagcgc | 4260 | |
| gc | 4262 | |

```
<210> SEQ ID NO 20
<211> LENGTH: 2427
<212> TYPE: PRT
<213> ORGANISM: Artificial Sequence
<220> FEATURE:
<223> OTHER INFORMATION: Synthetic Polypeptide
<220> FEATURE:
<221> NAME/KEY: misc_feature
<223> OTHER INFORMATION: "WL1 OPT codee"

<400> SEQUENCE: 20
```

Met Leu Trp Trp Glu Glu Val Glu Asp Cys Tyr Glu Arg Glu Asp Val
1               5                   10                  15

Gln Lys Lys Thr Phe Thr Lys Trp Val Asn Ala Gln Phe Ser Lys Phe
            20                  25                  30

Gly Lys Gln His Ile Glu Asn Leu Phe Ser Asp Leu Gln Asp Gly Arg
        35                  40                  45

Ser Leu Leu Asp Leu Leu Glu Gly Leu Thr Gly Gln Lys Leu Pro Lys
    50                  55                  60

Glu Lys Gly Ser Thr Arg Val His Ala Leu Asn Asn Val Asn Lys Ala
65                  70                  75                  80

Leu Arg Val Leu Gln Asn Asn Asn Val Asp Leu Val Asn Ile Gly Ser
                85                  90                  95

Thr Asp Ile Val Asp Gly Asn His Lys Leu Thr Leu Gly Leu Ile Trp
            100                 105                 110

Asn Ile Ile Leu His Trp Gln Val Lys Asn Val Met Lys Asn Ile Met
        115                 120                 125

Ala Gly Leu Gln Gln Thr Asn Ser Glu Lys Ile Leu Leu Ser Trp Val
    130                 135                 140

Arg Gln Ser Thr Arg Asn Tyr Pro Gln Val Asn Val Ile Asn Phe Thr
145                 150                 155                 160

-continued

```
Thr Ser Trp Ser Asp Gly Leu Ala Leu Asn Ala Leu Ile His Ser His
            165                 170                 175

Arg Pro Asp Leu Phe Asp Trp Asn Ser Val Val Cys Gln Gln Ser Ala
            180                 185                 190

Thr Gln Arg Leu Glu His Ala Phe Asn Ile Ala Arg Tyr Gln Leu Gly
            195                 200                 205

Ile Glu Lys Leu Leu Asp Pro Glu Asp Val Asp Thr Thr Tyr Pro Asp
210                 215                 220

Lys Lys Ser Ile Leu Met Tyr Ile Thr Ser Leu Phe Gln Val Leu Pro
225                 230                 235                 240

Gln Gln Val Ser Ile Glu Ala Ile Gln Glu Val Glu Met Leu Pro Arg
            245                 250                 255

Pro Pro Lys Val Thr Lys Glu Glu His Phe Gln Leu His His Gln Met
            260                 265                 270

His Tyr Ser Gln Gln Ile Thr Val Ser Leu Ala Gln Gly Tyr Glu Arg
            275                 280                 285

Thr Ser Ser Pro Lys Pro Arg Phe Lys Ser Tyr Ala Tyr Thr Gln Ala
            290                 295                 300

Ala Tyr Val Thr Thr Ser Asp Pro Thr Arg Ser Pro Phe Pro Ser Gln
305                 310                 315                 320

His Leu Glu Ala Pro Glu Asp Lys Ser Phe Gly Ser Ser Leu Met Glu
            325                 330                 335

Ser Glu Val Asn Leu Asp Arg Tyr Gln Thr Ala Leu Glu Glu Val Leu
            340                 345                 350

Ser Trp Leu Leu Ser Ala Glu Asp Thr Leu Gln Ala Gln Gly Glu Ile
            355                 360                 365

Ser Asn Asp Val Glu Val Val Lys Asp Gln Phe His Thr His Glu Gly
            370                 375                 380

Tyr Met Met Asp Leu Thr Ala His Gln Gly Arg Val Gly Asn Ile Leu
385                 390                 395                 400

Gln Leu Gly Ser Lys Leu Ile Gly Thr Gly Lys Leu Ser Glu Asp Glu
            405                 410                 415

Glu Thr Glu Val Gln Glu Gln Met Asn Leu Leu Asn Ser Arg Trp Glu
            420                 425                 430

Cys Leu Arg Val Ala Ser Met Glu Lys Gln Ser Asn Leu His Arg Val
            435                 440                 445

Leu Met Asp Leu Gln Asn Gln Lys Leu Lys Glu Leu Asn Asp Trp Leu
450                 455                 460

Thr Lys Thr Glu Glu Arg Thr Arg Lys Met Glu Glu Pro Leu Gly
465                 470                 475                 480

Pro Asp Leu Glu Asp Leu Lys Arg Gln Val Gln Gln His Lys Val Leu
            485                 490                 495

Gln Glu Asp Leu Glu Gln Glu Gln Val Arg Val Asn Ser Leu Thr His
            500                 505                 510

Met Val Val Val Asp Glu Ser Ser Gly Asp His Ala Thr Ala Ala
            515                 520                 525

Leu Glu Glu Gln Leu Lys Val Leu Gly Asp Arg Trp Ala Asn Ile Cys
530                 535                 540

Arg Trp Thr Glu Asp Arg Trp Val Leu Leu Gln Asp Ile Leu Leu Lys
545                 550                 555                 560

Trp Gln Arg Leu Thr Glu Glu Gln Cys Leu Phe Ser Ala Trp Leu Ser
            565                 570                 575

Glu Lys Glu Asp Ala Val Asn Lys Ile His Thr Thr Gly Phe Lys Asp
```

```
                  580                 585                 590
    Gln Asn Glu Met Leu Ser Ser Leu Gln Lys Leu Ala Val Leu Lys Ala
                    595                 600                 605

Asp Leu Glu Lys Lys Gln Ser Met Gly Lys Leu Tyr Ser Leu Lys
    610                 615                 620

Gln Asp Leu Leu Ser Thr Leu Lys Asn Lys Ser Val Thr Gln Lys Thr
    625                 630                 635                 640

Glu Ala Trp Leu Asp Asn Phe Ala Arg Cys Trp Asp Asn Leu Val Gln
                    645                 650                 655

Lys Leu Glu Lys Ser Thr Ala Gln Ile Ser Gln Ala Val Thr Thr Thr
                    660                 665                 670

Gln Pro Ser Leu Thr Gln Thr Val Met Glu Thr Val Thr Thr Val
                675                 680                 685

Thr Thr Arg Glu Gln Ile Leu Val Lys His Ala Gln Glu Glu Leu Pro
            690                 695                 700

Pro Pro Pro Pro Gln Lys Lys Arg Gln Ile Thr Val Asp Gly Leu Glu
    705                 710                 715                 720

Lys Thr Val Ser Leu Gln Lys Asp Leu Ser Glu Met His Glu Trp Met
                    725                 730                 735

Thr Gln Ala Glu Glu Tyr Leu Glu Arg Asp Ser Glu Tyr Lys Thr
                740                 745                 750

Pro Asp Glu Leu Gln Lys Ala Val Glu Met Lys Arg Ala Lys Glu
                755                 760                 765

Glu Ala Gln Gln Lys Glu Ala Lys Val Lys Leu Leu Thr Glu Ser Val
    770                 775                 780

Asn Ser Val Ile Ala Gln Ala Pro Pro Val Ala Gln Glu Ala Leu Lys
    785                 790                 795                 800

Lys Glu Leu Glu Thr Leu Thr Thr Asn Tyr Gln Trp Leu Cys Thr Arg
                    805                 810                 815

Leu Asn Gly Lys Cys Lys Thr Leu Glu Glu Val Trp Ala Cys Trp His
                820                 825                 830

Glu Leu Leu Ser Tyr Leu Glu Lys Ala Asn Lys Trp Leu Asn Glu Val
                835                 840                 845

Glu Phe Lys Leu Lys Thr Thr Glu Asn Ile Pro Gly Gly Ala Glu Glu
                850                 855                 860

Ile Ser Glu Val Leu Asp Ser Leu Glu Asn Leu Met Arg His Ser Glu
    865                 870                 875                 880

Asp Asn Pro Asn Gln Ile Arg Ile Leu Ala Gln Thr Leu Thr Asp Gly
                    885                 890                 895

Gly Val Met Asp Glu Leu Ile Asn Glu Glu Leu Glu Thr Phe Asn Ser
                900                 905                 910

Arg Trp Arg Glu Leu His Glu Glu Ala Val Arg Arg Gln Lys Leu Leu
                915                 920                 925

Glu Gln Ile His Thr Val Arg Glu Glu Thr Met Met Val Met Thr Glu
                930                 935                 940

Asp Met Pro Leu Glu Ile Ser Tyr Val Pro Ser Thr Tyr Leu Thr Glu
    945                 950                 955                 960

Ile Thr His Val Ser Gln Ala Leu Leu Glu Val Glu Gln Leu Leu Asn
                    965                 970                 975

Ala Pro Asp Leu Cys Ala Lys Asp Phe Glu Asp Leu Phe Lys Gln Glu
                980                 985                 990

Glu Ser Leu Lys Asn Ile Lys Asp Ser Leu Gln Gln Ser Ser Gly Arg
                995                 1000                1005
```

```
Ile Asp Ile Ile His Ser Lys Lys Thr Ala Ala Leu Gln Ser Ala Thr
    1010                1015                1020

Pro Val Glu Arg Val Lys Leu Gln Glu Ala Leu Ser Gln Leu Asp Phe
1025                1030                1035                1040

Gln Trp Glu Lys Val Asn Lys Met Tyr Lys Asp Arg Gln Gly Arg Phe
            1045                1050                1055

Asp Arg Ser Val Glu Lys Trp Arg Arg Phe His Tyr Asp Ile Lys Ile
            1060                1065                1070

Phe Asn Gln Trp Leu Thr Glu Ala Glu Gln Phe Leu Arg Lys Thr Gln
        1075                1080                1085

Ile Pro Glu Asn Trp Glu His Ala Lys Tyr Lys Trp Tyr Leu Lys Glu
        1090                1095                1100

Leu Gln Asp Gly Ile Gly Gln Arg Gln Thr Val Val Arg Thr Leu Asn
1105                1110                1115                1120

Ala Thr Gly Glu Glu Ile Ile Gln Gln Ser Ser Lys Thr Asp Ala Ser
                1125                1130                1135

Ile Leu Gln Glu Lys Leu Gly Ser Leu Asn Leu Arg Trp Gln Glu Val
                1140                1145                1150

Cys Lys Gln Leu Ser Asp Arg Lys Lys Arg Leu Glu Glu Gln Pro Asp
            1155                1160                1165

Leu Ala Pro Gly Leu Thr Thr Ile Gly Ala Ser Pro Thr Gln Thr Val
1170                1175                1180

Thr Leu Val Thr Gln Pro Val Val Thr Lys Glu Thr Ala Ile Ser Lys
1185                1190                1195                1200

Leu Glu Met Pro Ser Ser Leu Met Leu Glu Val Pro Ala Leu Ala Asp
                1205                1210                1215

Phe Asn Arg Ala Trp Thr Glu Leu Thr Asp Trp Leu Ser Leu Leu Asp
        1220                1225                1230

Gln Val Ile Lys Ser Gln Arg Val Met Val Gly Asp Leu Glu Asp Ile
            1235                1240                1245

Asn Glu Met Ile Ile Lys Gln Lys Ala Thr Met Gln Asp Leu Glu Gln
    1250                1255                1260

Arg Arg Pro Gln Leu Glu Glu Leu Ile Thr Ala Ala Gln Asn Leu Lys
1265                1270                1275                1280

Asn Lys Thr Ser Asn Gln Glu Ala Arg Thr Ile Ile Thr Asp Arg Ile
            1285                1290                1295

Glu Arg Ile Gln Asn Gln Trp Asp Glu Val Gln Glu His Leu Gln Asn
            1300                1305                1310

Arg Arg Gln Gln Leu Asn Glu Met Leu Lys Asp Ser Thr Gln Trp Leu
    1315                1320                1325

Glu Ala Lys Glu Glu Ala Glu Gln Val Leu Gly Gln Ala Arg Ala Lys
    1330                1335                1340

Leu Glu Ser Trp Lys Glu Gly Pro Tyr Thr Val Asp Ala Ile Gln Lys
1345                1350                1355                1360

Lys Ile Thr Glu Thr Lys Gln Leu Ala Lys Asp Leu Arg Gln Trp Gln
            1365                1370                1375

Thr Asn Val Asp Val Ala Asn Asp Leu Ala Leu Lys Leu Leu Arg Asp
        1380                1385                1390

Tyr Ser Ala Asp Asp Thr Arg Lys Val His Met Ile Thr Glu Asn Ile
            1395                1400                1405

Asn Ala Ser Trp Arg Ser Ile His Lys Arg Val Ser Glu Arg Glu Ala
    1410                1415                1420
```

```
Ala Leu Glu Glu Thr His Arg Leu Leu Gln Gln Phe Pro Leu Asp Leu
1425                1430                1435                1440

Glu Lys Phe Leu Ala Trp Leu Thr Glu Ala Glu Thr Thr Ala Asn Val
            1445                1450                1455

Leu Gln Asp Ala Thr Arg Lys Glu Arg Leu Leu Glu Asp Ser Lys Gly
            1460                1465                1470

Val Lys Glu Leu Met Lys Gln Trp Gln Asp Leu Gln Gly Glu Ile Glu
        1475                1480                1485

Ala His Thr Asp Val Tyr His Asn Leu Asp Glu Asn Ser Gln Lys Ile
    1490                1495                1500

Leu Arg Ser Leu Glu Gly Ser Asp Asp Ala Val Leu Leu Gln Arg Arg
1505                1510                1515                1520

Leu Asp Asn Met Asn Phe Lys Trp Ser Glu Leu Arg Lys Lys Ser Leu
            1525                1530                1535

Asn Ile Arg Ser His Leu Glu Ala Ser Ser Asp Gln Trp Lys Arg Leu
            1540                1545                1550

His Leu Ser Leu Gln Glu Leu Leu Val Trp Leu Gln Leu Lys Asp Asp
        1555                1560                1565

Glu Leu Ser Arg Gln Ala Pro Ile Gly Gly Asp Phe Pro Ala Val Gln
    1570                1575                1580

Lys Gln Asn Asp Val His Arg Ala Phe Lys Arg Glu Leu Lys Thr Lys
1585                1590                1595                1600

Glu Pro Val Ile Met Ser Thr Leu Glu Thr Val Arg Ile Phe Leu Thr
            1605                1610                1615

Glu Gln Pro Leu Glu Gly Leu Glu Lys Leu Tyr Gln Glu Pro Arg Glu
            1620                1625                1630

Leu Pro Pro Glu Glu Arg Ala Gln Asn Val Thr Arg Leu Leu Arg Lys
        1635                1640                1645

Gln Ala Glu Glu Val Asn Thr Glu Trp Glu Lys Leu Asn Leu His Ser
    1650                1655                1660

Ala Asp Trp Gln Arg Lys Ile Asp Glu Thr Leu Glu Arg Leu Gln Glu
1665                1670                1675                1680

Leu Gln Glu Ala Thr Asp Glu Leu Asp Leu Lys Leu Arg Gln Ala Glu
            1685                1690                1695

Val Ile Lys Gly Ser Trp Gln Pro Val Gly Asp Leu Leu Ile Asp Ser
            1700                1705                1710

Leu Gln Asp His Leu Glu Lys Val Lys Ala Leu Arg Gly Glu Ile Ala
        1715                1720                1725

Pro Leu Lys Glu Asn Val Ser His Val Asn Asp Leu Ala Arg Gln Leu
    1730                1735                1740

Thr Thr Leu Gly Ile Gln Leu Ser Pro Tyr Asn Leu Ser Thr Leu Glu
1745                1750                1755                1760

Asp Leu Asn Thr Arg Trp Lys Leu Leu Gln Val Ala Val Glu Asp Arg
            1765                1770                1775

Val Arg Gln Leu His Glu Ala His Arg Asp Phe Gly Pro Ala Ser Gln
        1780                1785                1790

His Phe Leu Ser Thr Ser Val Gln Gly Pro Trp Glu Arg Ala Ile Ser
        1795                1800                1805

Pro Asn Lys Val Pro Tyr Tyr Ile Asn His Glu Thr Gln Thr Thr Cys
    1810                1815                1820

Trp Asp His Pro Lys Met Thr Glu Leu Tyr Gln Ser Leu Ala Asp Leu
1825                1830                1835                1840

Asn Asn Val Arg Phe Ser Ala Tyr Arg Thr Ala Met Lys Leu Arg Arg
```

```
                1845             1850            1855
Leu Gln Lys Ala Leu Cys Leu Asp Leu Leu Ser Leu Ser Ala Ala Cys
            1860             1865            1870

Asp Ala Leu Asp Gln His Asn Leu Lys Gln Asn Asp Gln Pro Met Asp
            1875             1880            1885

Ile Leu Gln Ile Ile Asn Cys Leu Thr Thr Ile Tyr Asp Arg Leu Glu
            1890             1895            1900

Gln Glu His Asn Asn Leu Val Asn Val Pro Leu Cys Val Asp Met Cys
1905             1910            1915            1920

Leu Asn Trp Leu Leu Asn Val Tyr Asp Thr Gly Arg Thr Gly Arg Ile
            1925             1930            1935

Arg Val Leu Ser Phe Lys Thr Gly Ile Ile Ser Leu Cys Lys Ala His
            1940             1945            1950

Leu Glu Asp Lys Tyr Arg Tyr Leu Phe Lys Gln Val Ala Ser Ser Thr
            1955             1960            1965

Gly Phe Cys Asp Gln Arg Arg Leu Gly Leu Leu Leu His Asp Ser Ile
            1970             1975            1980

Gln Ile Pro Arg Gln Leu Gly Glu Val Ala Ser Phe Gly Gly Ser Asn
1985             1990            1995            2000

Ile Glu Pro Ser Val Arg Ser Cys Phe Gln Phe Ala Asn Asn Lys Pro
            2005             2010            2015

Glu Ile Glu Ala Ala Leu Phe Leu Asp Trp Met Arg Leu Glu Pro Gln
            2020             2025            2030

Ser Met Val Trp Leu Pro Val Leu His Arg Val Ala Ala Ala Glu Thr
            2035             2040            2045

Ala Lys His Gln Ala Lys Cys Asn Ile Cys Lys Glu Cys Pro Ile Ile
            2050             2055            2060

Gly Phe Arg Tyr Arg Ser Leu Lys His Phe Asn Tyr Asp Ile Cys Gln
2065             2070            2075            2080

Ser Cys Phe Phe Ser Gly Arg Val Ala Lys Gly His Lys Met His Tyr
            2085             2090            2095

Pro Met Val Glu Tyr Cys Thr Pro Thr Thr Ser Gly Glu Asp Val Arg
            2100             2105            2110

Asp Phe Ala Lys Val Leu Lys Asn Lys Phe Arg Thr Lys Arg Tyr Phe
            2115             2120            2125

Ala Lys His Pro Arg Met Gly Tyr Leu Pro Val Gln Thr Val Leu Glu
            2130             2135            2140

Gly Asp Asn Met Glu Thr Pro Val Thr Leu Ile Asn Phe Trp Pro Val
2145             2150            2155            2160

Asp Ser Ala Pro Ala Ser Ser Pro Gln Leu Ser His Asp Asp Thr His
            2165             2170            2175

Ser Arg Ile Glu His Tyr Ala Ser Arg Leu Ala Glu Met Glu Asn Ser
            2180             2185            2190

Asn Gly Ser Tyr Leu Asn Asp Ser Ile Ser Pro Asn Glu Ser Ile Asp
            2195             2200            2205

Asp Glu His Leu Leu Ile Gln His Tyr Cys Gln Ser Leu Asn Gln Asp
            2210             2215            2220

Ser Pro Leu Ser Gln Pro Arg Ser Pro Ala Gln Ile Leu Ile Ser Leu
2225             2230            2235            2240

Glu Ser Glu Glu Arg Gly Glu Leu Glu Arg Ile Leu Ala Asp Leu Glu
            2245             2250            2255

Glu Glu Asn Arg Asn Leu Gln Ala Glu Tyr Asp Arg Leu Lys Gln Gln
            2260             2265            2270
```

His Glu His Lys Gly Leu Ser Pro Leu Pro Ser Pro Glu Met Met
                2275                2280                2285

Pro Thr Ser Pro Gln Ser Pro Arg Asp Ala Glu Leu Ile Ala Glu Ala
    2290                2295                2300

Lys Leu Leu Arg Gln His Lys Gly Arg Leu Glu Ala Arg Met Gln Ile
2305                2310                2315                2320

Leu Glu Asp His Asn Lys Gln Leu Glu Ser Gln Leu His Arg Leu Arg
                2325                2330                2335

Gln Leu Leu Glu Gln Pro Gln Ala Glu Ala Lys Val Asn Gly Thr Thr
            2340                2345                2350

Val Ser Ser Pro Ser Thr Ser Leu Gln Arg Ser Asp Ser Ser Gln Pro
        2355                2360                2365

Met Leu Leu Arg Val Val Gly Ser Gln Thr Ser Asp Ser Met Gly Glu
    2370                2375                2380

Glu Asp Leu Leu Ser Pro Pro Gln Asp Thr Ser Thr Gly Leu Glu Glu
2385                2390                2395                2400

Val Met Glu Gln Leu Asn Asn Ser Phe Pro Ser Ser Arg Gly Arg Asn
                2405                2410                2415

Thr Pro Gly Lys Pro Met Arg Glu Asp Thr Met
            2420                2425

<210> SEQ ID NO 21
<211> LENGTH: 7221
<212> TYPE: DNA
<213> ORGANISM: artificial sequence
<220> FEATURE:
<223> OTHER INFORMATION: Synthetic Polynucleotide
<220> FEATURE:
<221> NAME/KEY: misc_feature
<223> OTHER INFORMATION: "WL2 wt"

<400> SEQUENCE: 21

| | | | | | |
|---|---|---|---|---|---|
| atgctttggt | gggaagaagt | agaggactgt | tatgaaagag | aagatgttca | aaagaaaaca | 60 |
| ttcacaaaat | gggtaaatgc | acaatttttct | aagtttggga | agcagcatat | tgagaacctc | 120 |
| ttcagtgacc | tacaggatgg | gaggcgcctc | ctagacctcc | tcgaaggcct | gacagggcaa | 180 |
| aaactgccaa | agaaaaagg | atccacaaga | gttcatgccc | tgaacaatgt | caacaaggca | 240 |
| ctgcgggttt | tgcagaacaa | taatgttgat | ttagtgaata | ttggaagtac | tgacatcgta | 300 |
| gatggaaatc | ataaactgac | tcttggtttg | atttggaata | taatcctcca | ctggcaggtc | 360 |
| aaaaatgtaa | tgaaaaatat | catggctgga | ttgcaacaaa | ccaacagtga | aaagattctc | 420 |
| ctgagctggg | tccgacaatc | aactcgtaat | tatccacagg | ttaatgtaat | caacttcacc | 480 |
| accagctggt | ctgatggcct | ggcttttgaat | gctctcatcc | atagtcatag | gccagaccta | 540 |
| tttgactgga | atagtgtggt | ttgccagcag | tcagccacac | aacgactgga | acatgcattc | 600 |
| aacatcgcca | gatatcaatt | aggcatagag | aaactactcg | atcctgaaga | tgttgatacc | 660 |
| acctatccag | ataagaagtc | catcttaatg | tacatcacat | cactcttcca | agttttgcct | 720 |
| caacaagtga | gcattgaagc | catccaggaa | gtggaaatgt | tgccaaggcc | acctaaagtg | 780 |
| actaaagaag | aacattttca | gttacatcat | caaatgcact | attctcaaca | gatcacggtc | 840 |
| agtctagcac | agggatatga | gagaacttct | tcccctaagc | ctcgattcaa | gagctatgcc | 900 |
| tacacacagg | ctgcttatgt | caccaccctct | gaccctacac | ggagcccatt | tccttcacag | 960 |
| catttggaag | ctcctgaaga | caagtcattt | ggcagttcat | tgatggagag | tgaagtaaac | 1020 |
| ctggaccgtt | atcaaacagc | tttagaagaa | gtattatcgt | ggcttctttc | tgctgaggac | 1080 |

| | |
|---|---|
| acattgcaag cacaaggaga gatttctaat gatgtggaag tggtgaaaga ccagtttcat | 1140 |
| actcatgagg ggtacatgat ggatttgaca gcccatcagg gccgggttgg taatattcta | 1200 |
| caattgggaa gtaagctgat tggaacagga aaattatcag aagatgaaga aactgaagta | 1260 |
| caagagcaga tgaatctcct aaattcaaga tgggaatgcc tcagggtagc tagcatggaa | 1320 |
| aaacaaagca atttacatag agttttaatg gatctccaga atcagaaact gaaagagttg | 1380 |
| aatgactggc taacaaaaac agaagaaaga acaaggaaaa tggaggaaga gcctcttgga | 1440 |
| cctgatcttg aagacctaaa acgccaagta caacaacata aggtgcttca agaagatcta | 1500 |
| gaacaagaac aagtcagggt caattctctc actcacatgg tggtggtagt tgatgaatct | 1560 |
| agtggagatc acgcaactgc tgctttggaa gaacaactta aggtattggg agatcgatgg | 1620 |
| gcaaacatct gtagatggac agaagaccgc tgggttcttt tacaagacat ccttctcaaa | 1680 |
| tggcaacgtc ttactgaaga acagtgcctt tttagtgcat ggctttcaga aaagaagat | 1740 |
| gcagtgaaca agattcacac aactggcttt aaagatcaaa atgaaatgtt atcaagtctt | 1800 |
| caaaaactgg ccgttttaaa agcggatcta gaaaagaaaa agcaatccat gggcaaactg | 1860 |
| tattcactca acaagatctc tcttcaaca ctgaagaata agtcagtgac ccagaagacg | 1920 |
| gaagcatggc tggataactt tgcccggtgt tgggataatt tagtccaaaa acttgaaaag | 1980 |
| agtacagcac agatttcaca ggctgtcacc accactcagc catcactaac acagacaact | 2040 |
| gtaatggaaa cagtaactac ggtgaccaca agggaacaga tcctggtaaa gcatgctcaa | 2100 |
| gaggaacttc caccaccacc tccccaaaag aagaggcaga ttactgtgga tggtttggag | 2160 |
| aaaactgtaa gcctccagaa agatctatca gagatgcacg aatggatgac acaagctgaa | 2220 |
| gaagagtatc ttgagagaga ttttgaatat aaaactccag atgaattaca gaaagcagtt | 2280 |
| gaagagatga agagagctaa agaagaggcc caacaaaaag aagcgaaagt gaaactcctt | 2340 |
| actgagtctg taaatagtgt catagctcaa gctccacctg tagcacaaga ggccttaaaa | 2400 |
| aaggaacttg aaactctaac caccaactac cagtggctct gcactaggct gaatgggaaa | 2460 |
| tgcaagactt tggaagaagt ttgggcatgt tggcatgagt tattgtcata cttggagaaa | 2520 |
| gcaaacaagt ggctaaatga agtagaattt aaacttaaaa ccactgaaaa cattcctggc | 2580 |
| ggagctgagg aaatctctga ggtgctagat tcacttgaaa atttgatgcg acattcagag | 2640 |
| gataacccaa atcagattcg catattggca cagaccctaa cagatggcgg agtcatggat | 2700 |
| gagctaatca atgaggaact tgagacattt aattctcgtt ggagggaact acatgaagag | 2760 |
| gctgtaagga ggcaaaagtt gcttgaacag cctttgaagg aattggagca gtttaactca | 2820 |
| gatatacaaa aattgcttga accactggag gctgaaattc agcaggggt gaatctgaaa | 2880 |
| gaggaagact tcaataaaga tatgaatgaa gacaatgagg gtactgtaaa agaattgttg | 2940 |
| caaagaggag acaacttaca acaaagaatc acagatgaga gaaagagaga ggaaataaag | 3000 |
| ataaaacagc agctgttaca gacaaaacat aacgcgttca aggatttgag gtctcaagga | 3060 |
| agaaaaaagg ctctagaaat ttctcatcag tggtatcagt acaagaggca ggctgatgat | 3120 |
| ctcctgaaat gcttggatga cattgaaaaa aaattagcca gcctacctga gcccagagat | 3180 |
| gaaaggaaaa taaggaaat tgatcgggaa ttgcagaaga agaaagagga gctgaatgca | 3240 |
| gtgcgtaggc aagctgaggg cttgtctgag gatggggccg caatggcagt ggagccaact | 3300 |
| cagatccagc tcagcaagcg ctggcgggaa attgagagca aatttgctca gtttcgaaga | 3360 |
| ctcaactttg cacaaattca cactgtccgt gaagaaacga tgatggtgat gactgaagac | 3420 |

-continued

```
atgcctttgg aaatttctta tgtgccttct acttatttga ctgaaatcac tcatgtctca   3480
caagccctat tagaagtgga acaacttctc aatgctcctg acctctgtgc taaggacttt   3540
gaagatctct ttaagcaaga ggagtctctg aagaatataa aagatagtct acaacaaagc   3600
tcaggtcgga ttgacattat tcatagcaag aagacagcag cattgcaaag tgcaacgcct   3660
gtggaaaggg tgaagctaca ggaagctctc tcccagcttg atttccaatg ggaaaaagtt   3720
aacaaaatgt acaaggaccg acaagggcga tttgacagat ctgttgagaa atggcggcgt   3780
tttcattatg atataaagat atttaatcag tggctaacag aagctgaaca gtttctcaga   3840
aagacacaaa ttcctgagaa ttgggaacat gctaaataca aatggtatct taaggaactc   3900
caggatggca ttgggcagcg gcaaactgtt gtcagaacat tgaatgcaac tggggaagaa   3960
ataattcagc aatcctcaaa aacagatgcc agtattctac aggaaaaatt gggaagcctg   4020
aatctgcggt ggcaggaggt ctgcaaacag ctgtcagaca gaaaaaagag ctagaagag    4080 cagcctgacc tagctcctgg actgaccact attggagcct ctcctactca gactgttact   4140
ctggtgacac aacctgtggt tactaaggaa actgccatct ccaaactaga aatgccatct   4200
tccttgatgt tggaggtacc aactcataga ttactgcaac agttcccct ggacctggaa     4260 aagtttcttg cctggcttac agaagctgaa acaactgcca atgtcctaca ggatgctacc   4320
cgtaaggaaa ggctcctaga agactccaag ggagtaaaag agctgatgaa acaatggcaa   4380
gacctccaag gtgaaattga agctcacaca gatgtttatc acaacctgga tgaaaacagc   4440
caaaaaatcc tgagatccct ggaaggttcc gatgatgcag tcctgttaca aagacgtttg   4500
gataacatga acttcaagtg gagtgaactt cggaaaaagt ctctcaacat taggtcccat   4560
ttggaagcca gttctgacca gtggaagcgt ctgcaccttt ctctgcagga acttctggtg   4620
tggctacagc tgaaagatga tgaattaagc cggcaggcac ctattggagg cgactttcca   4680
gcagttcaga agcagaacga tgtacatagg gccttcaaga gggaattgaa aactaaagaa   4740
cctgtaatca tgagtactct tgagactgta cgaatatttc tgacagagca gcctttggaa   4800
ggactagaga aactctacca ggagcccaga gagctgcctc ctgaggagag agcccagaat   4860
gtcactcggc ttctacgaaa gcaggctgag gaggtcaata ctgagtggga aaaattgaac   4920
ctgcactccg ctgactggca gagaaaaata gatgagaccc ttgaaagact ccaggaactt   4980
caagaggcca cggatgagct ggacctcaag ctgcgccaag ctgaggtgat caagggatcc   5040
tggcagcccg tgggcgatct cctcattgac tctctccaag atcacctcga gaaagtcaag   5100
gcacttcgag gagaaattgc gcctctgaaa gagaacgtga gccacgtcaa tgaccttgct   5160
cgccagctta ccactttggg cattcagctc tcaccgtata acctcagcac tctggaagac   5220
ctgaacacca gatggaagct tctgcaggtg gccgtcgagg accgagtcag gcagctgcat   5280
gaagcccaca gggactttgg tccagcatct cagcactttc tttccacgtc tgtccagggt   5340
ccctgggaga gagccatctc gccaaacaaa gtgccctact atatcaacca cgagactcaa   5400
acaacttgct gggaccatcc caaaatgaca gagctctacc agtctttagc tgacctgaat   5460
aatgtcagat tctcagctta taggactgcc atgaaactcc gaagactgca gaaggccctt   5520
tgcttggatc tcttgagcct gtcagctgca tgtgatgcct tggaccagca aaccctcaag   5580
caaaatgacc agcccatgga tatcctgcag attattaatt gtttgaccac tatttatgac   5640
cgcctggagc aagagcacaa caatttggtc aacgtccctc tctgcgtgga tatgtgtctg   5700
aactggctgc tgaatgttta tgatacggga cgaacaggga ggatccgtgt cctgtctttt   5760
aaaactggca tcatttccct gtgtaaagca catttggaag acaagtacag atacctttc    5820
```

```
aagcaagtgg caagttcaac aggattttgt gaccagcgca ggctgggcct ccttctgcat    5880
gattctatcc aaattccaag acagttgggt gaagttgcat cctttggggg cagtaacatt    5940
gagccaagtg tccggagctg cttccaattt gctaataata agccagagat cgaagcggcc    6000
ctcttcctag actggatgag actggaaccc cagtccatgg tgtggctgcc cgtcctgcac    6060
agagtggctg ctgcagaaac tgccaagcat caggccaaat gtaacatctg caaagagtgt    6120
ccaatcattg gattcaggta caggagtcta aagcacttta attatgacat ctgccaaagc    6180
tgcttttttt ctggtcgagt tgcaaaaggc cataaaatgc actatcccat ggtggaatat    6240
tgcactccga ctacatcagg agaagatgtt cgagactttg ccaaggtact aaaaaacaaa    6300
tttcgaacca aaggtattt tgcgaagcat ccccgaatgg gctacctgcc agtgcagact    6360
gtcttagagg gggacaacat ggaaactccc gttactctga tcaacttctg gccagtagat    6420
tctgcgcctg cctcgtcccc tcagctttca cacgatgata ctcattcacg cattgaacat    6480
tatgctagca ggctagcaga aatggaaaac agcaatggat cttatctaaa tgatagcatc    6540
tctcctaatg agagcataga tgatgaacat ttgttaatcc agcattactg ccaaagtttg    6600
aaccaggact ccccccctgag ccagcctcgt agtcctgccc agatcttgat ttccttagag    6660
agtgaggaaa gaggggagct agagagaatc ctagcagatc ttgaggaaga aaacaggaat    6720
ctgcaagcag aatatgaccg tctaaagcag cagcacgaac ataaaggcct gtccccactg    6780
ccgtcccctc ctgaaatgat gcccacctct ccccagagtc cccgggatgc tgagctcatt    6840
gctgaggcca agctactgcg tcaacacaaa ggccgcctgg aagccaggat gcaaatcctg    6900
gaagaccaca ataaacagct ggagtcacag ttacacaggc taaggcagct gctggagcaa    6960
ccccaggcag aggccaaagt gaatggcaca acggtgtcct ctccttctac ctctctacag    7020
aggtccgaca gcagtcagcc tatgctgctc cgagtggttg gcagtcaaac ttcggactcc    7080
atgggtgagg aagatcttct cagtcctccc caggacacaa gcacagggtt agaggaggtg    7140
atggagcaac tcaacaactc cttccctagt tcaagaggaa gaaatacccc tggaaagcca    7200
atgagagagg acacaatgta g                                              7221
```

<210> SEQ ID NO 22
<211> LENGTH: 7284
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: "WL1 cor"

<400> SEQUENCE: 22

```
atgctgtggt gggaggaggt ggaggactgc tatgagagag aggatgtgca gaagaagacc      60
ttcaccaagt gggtgaatgc ccagttcagc aagtttggca agcagcacat tgagaacctg     120
ttctctgacc tgcaggatgg caggaggctg ctggacctgc tggagggcct aacaggccag     180
aagctgccca aggagaaggg cagtaccagg gtgcatgccc tgaacaatgt gaacaaggcc     240
ctgagggtgc tgcagaacaa caatgtggac ctagtaataa ttggcagtac agatattgtg     300
gatggcaacc acaagctgac cctgggcctg atctggaata ttatcctaca ctggcaggtg     360
aagaatgtga tgaagaatat tatggctggc ctgcagcaga ccaactctga aagatcctg      420 ctgagctggg tgaggcagag taccaggaac taccccaggg tgaatgtgat caacttcacc     480
accagctggt ctgatggcct ggccctgaat gccctaatcc acagccacag gcctgacctg     540
```

```
tttgactgga actctgtggt gtgccagcag tctgccaccc agaggctaga gcatgccttc    600
aatattgcca ggtaccagct ggggattgag aagctgctgg accctgagga tgtggataca    660
acctaccctg acaagaagag catcctgatg tacatcacca gcctgttcca ggtgctgccc    720
cagcaggtga gcattgaggc catccaggag gtggagatgc tacccaggcc ccccaaggtg    780
accaaggagg agcacttcca gctacaccac cagatgcact acagccagca gatcacagtg    840
agcctggccc agggctatga gaggaccagc agccccaagc ccaggttcaa gagctatgcc    900
tacacccagg ctgcctatgt gaccacctca gaccccacca ggagcccctt ccccagccag    960
cacctggagg cccctgagga caagagcttt ggcagcagcc tgatggagtc tgaggtgaac   1020
ctggacaggt accagacagc cctggaggag gtgctgagct ggctgctgtc tgctgaggat   1080
accctacagg cccagggaga gatcagcaat gatgtggagg tggtgaagga ccagttccat   1140
acccatgagg gctacatgat ggacctaaca gcccaccagg gcagggtggg caacatcctg   1200
cagctgggca gcaagctgat tggcacaggc aagctgtctg aggatgagga cacagaggtg   1260
caggagcaga tgaacctgct gaacagcagg tgggagtgcc tgagggtggc cagtatggag   1320
aagcagagca acctacacag ggtgctgatg gacctgcaga accagaagct gaaggagctg   1380
aatgactggc tgaccaagac agaggagagg accaggaaga tggaggagga cccctgggc   1440 cctgacctgg aggacctaaa gaggcaggtg cagcagcaca aggtgctgca ggaggacctg   1500
gagcaggagc aggtgagggt gaacagccta acccatatgg tggtggtggt ggatgagagc   1560
tcaggagacc atgctacagc tgccctggag gagcagctga aggtgctggg agacaggtgg   1620
gctaatatct gcaggtggac agaggacagg tgggtgctgc tgcaggatat cctgctgaag   1680
tggcagaggc tgacagagga gcagtgcctg ttctctgcct ggctgtcaga aaggaggat   1740 gctgtgaaca agatccatac aacaggcttc aaggaccaga atgagatgct gagcagcctg   1800
cagaagctgg ctgtgctgaa ggctgacctg gagaagaaga gcagagtat gggcaagctg   1860 tacagcctga gcaggacctg ctgagtaccc tgaagaacaa agtctgtgac ccagaagaca   1920
gaggcctggc tggacaactt tgccaggtgc tgggataacc tggtgcagaa gctggagaag   1980
agtacagccc agatcagcca ggctgtgaca acaacccagc ccagcctgac ccagacaaca   2040
gtgatggaga cagtgacaac agtgacaacc agggagcaga tcctagtgaa gcatgcccag   2100
gaggagctgc ccccccccc ccccagaag aagaggcaga ttacagtgga tggcctggag   2160
aagacagtga gcctccagaa ggacctgtca gagatgcatg agtggatgac ccaggctgag   2220
gaggagtacc tggagaggga cttcgagtac aagacccctg atgagctgca gaaggctgtg   2280
gaggagatga gagggccaa ggaggaggcc cagcagaagg aggccaaggt gaagctgctg   2340
acagagtctg tgaactctgt gattgcccag gcccccctg tggcccagga ggccctgaag   2400
aaggagctgg agaccctgac aaccaactac cagtggctgt gcaccaggct gaatggcaag   2460
tgcaagaccc tagaggaggt gtgggcctgc tggcatgagc tgctgagcta cctggagaag   2520
gccaacaagt ggctgaatga ggtggagttc aagctgaaga ccacagagaa catccctgga   2580
ggagctgagg agatctctga ggtgctggac agcctggaga acctaatgag gcactctgag   2640 gacaaccca accagatcag gatcctggcc cagaccctga cagatggagg agtgatggat   2700
gagctgatca tgaggagct ggagaccttc aacagcaggt ggaggagct acatgaggag   2760 gctgtgagga ggcagaagct gctagagcag atccatacag tgaggaggag acaatgatg   2820 gtgatgacag aggatatgcc cctggagatc agctatgtgc ccagcaccta cctaacagag   2880
```

```
atcacccatg tgagccaggc cctgctggag gtggagcagc tgctgaatgc ccctgacctg    2940
tgtgccaagg actttgagga cctgttcaag caggaggaga gcctgaagaa catcaaggac    3000
agcctgcagc agagctcagg caggattgat attatccaca gcaagaagac agctgccctg    3060
cagtctgcta cccctgtgga gagggtgaag ctgcaggagg ccctgagcca gctggacttc    3120
cagtgggaga aggtgaacaa gatgtacaag acaggcagg gcaggtttga caggtcagtg     3180
gagaagtgga ggaggttcca ctatgacatc aagatcttca accagtggct gacagaggct    3240
gagcagttcc taaggaagac ccagatccct gagaactggg agcatgccaa gtacaagtgg    3300
taccttaagg agctgcagga tggcattggc cagaggcaga cagtggtgag gaccctgaat    3360
gctacagggg aggagattat ccagcagagc agcaagacag atgccagtat cctgcaggag    3420
aagctgggca gcctgaacct gaggtggcag gaggtgtgca agcagctgtc tgacaggaag    3480
aagaggctgg aggagcagcc tgacctggcc cctggcctga caacaattgg agccagccct    3540
acccagacag tgaccctggt gacccagcct gtggtgacca aggagacagc tatcagcaag    3600
ctggagatgc ccagcagcct gatgctggag gtgcctgccc tggctgactt caacagggcc    3660
tggacagagc tgacagactg gctgagcctg ctggaccagg tgatcaagag ccagagggtg    3720
atggtgggg acctggagga tatcaatgag atgattatca gcagaaggc tacaatgcag      3780
gacctggagc agaggaggcc ccagctggag gagctgatta cagctgccca gaacctaaag    3840
aacaagacca gcaaccagga ggccaggaca attattacag acaggattga gaggatccag    3900
aaccagtggg atgaggtgca ggagcacctg cagaacagga ggcagcagct gaatgagatg    3960
ctgaaggaca gtacccagtg gctggaggcc aaggaggagg ctgagcaggt gctgggccag    4020
gccagggcca agctggagag ctggaaggag ggccctaca cagtggatgc catccagaag     4080
aagatcacag agaccaagca gctggccaag gacctgaggc agtggcagac caatgtggat    4140
gtggccaatg acctggccct gaagctgctg agggactact cagctgatga caccaggaag    4200
gtgcacatga tcacagagaa catcaatgcc agctggagga gcatccacaa gagggtgtct    4260
gagagggagg ctgccctaga ggagacccac aggctgctgc agcagttccc cctggacctg    4320
gagaagttcc tggcctggct gacagaggct gagacaacag ccaatgtgct gcaggatgct    4380
accaggaagg agaggctgct ggaggacagc aagggagtga aggagctgat gaagcagtgg    4440
caggacctac aggggagat tgaggcccat acagatgtgt accacaacct ggatgagaac    4500
agccagaaga tcctgaggag cctggagggc tctgatgatg ctgtgctgct gcagaggagg    4560
ctggacaata tgaacttcaa gtggtctgag ctgaggaaga agagcctaaa tatcaggagc    4620
cacctggagg ccagctctga ccagtggaag aggctacacc tgagcctgca ggagctgctg    4680
gtgtggctgc agctgaagga tgatgagcta agcaggcagg cccctattgg gggagacttc    4740
cctgctgtgc agaagcagaa tgatgtgcac agggccttca gagggagct gaagaccaag     4800
gagcctgtga ttatgagtac cctggagaca gtgaggatct tcctgacaga gcagccctg     4860
gagggcctgg agaagctgta ccaggagccc agggagctgc cccctgagga gagggcccag    4920
aatgtgacca ggctgctgag gaagcaggct gaggaggtga atacagagtg ggagaagctg    4980
aacctacact ctgctgactg gcagaggaag attgatgaga ccctggagag gctgcaggag    5040
ctgcaggagg ctacagatga gctggaccctg aagctgaggc aggctgaggt gatcaagggc    5100
agctggcagc tgtgtggga cctgctgatt gacagcctac aggaccacct ggagaaggtg    5160
aaggccctga ggggagagat tgccccccta aaggagaatg tgagtcatgt gaatgacctg    5220
gccaggcagc tgaccacccc tgggcatcca gctgagcccct acaacctgag caccctggag    5280
```

```
gacctgaaca ccaggtggaa gctgctgcag gtggctgtgg aggacagggt gaggcagcta    5340
catgaggccc acagggactt tggccctgcc agccagcact tcctaagcac ctctgttcag    5400
ggcccctggg agagggccat cagccccaac aaggtgccct actacatcaa ccatgagacc    5460
cagaccacct gctgggacca ccccaagatg acagagctgt accagagcct ggctgacctg    5520
aacaatgtga ggttctctgc ctacaggaca gccatgaagc tgaggaggct gcagaaggcc    5580
ctgtgcctgg acctgctgag cctgtctgct gcctgtgatg ccctagacca gcacaacctg    5640
aagcagaatg accagcccat ggacatcctt cagatcatca actgcctgac caccatctat    5700
gacaggctag agcaggagca caacaacctg gtgaatgtgc ccctgtgtgt ggacatgtgc    5760
ctgaactggc tgctgaatgt gtatgacaca ggcaggacag gcaggatcag ggtgctgagc    5820
ttcaagacag gcatcatcag cctatgcaag gctcacctgg aggacaagta caggtacctg    5880
ttcaagcagg tggccagcag cacaggcttc tgtgaccaga ggaggctggg cctgctactt    5940
catgacagca ttcagatccc caggcagctg ggagaggtgg ccagctttgg aggcagcaac    6000
attgagccct cagtgaggag ctgcttccag tttgccaaca caagcctga gattgaggct    6060 gccctgttcc tggactggat gaggctggag cctcagagca tggtgtggct gcctgtgctg    6120
cacagggtgg ctgctgctga gacagccaag catcaggcca agtgcaacat ctgcaaggag    6180
tgccccatca ttggcttcag gtacaggagc ctaaagcact tcaactatga catctgccag    6240
agctgcttct tctcaggcag ggtggccaag ggccacaaga tgcactaccc catggtggag    6300
tactgcaccc ccaccacctc aggagaggat gtgagggact tgccaaggt gctgaagaac    6360 aagttcagga ccaagaggta ctttgccaag caccccagga tgggctacct gcctgtgcag    6420
acagtgctgg aggggacaa catggagacc cctgtgaccc tgatcaactt ctggcctgtg    6480
gactcagccc ctgccagcag cccccagctg agccatgatg acacccacag caggattgag    6540
cactatgcca gcaggctggc tgagatggag aacagcaatg gcagctacct aaatgacagc    6600
atcagcccca tgagagcat tgatgatgag cacctgctaa tccagcacta ctgccagagc    6660
ctgaaccagg acagcccct gagccagccc aggagccctg cccagatcct gatcagcctg    6720
gagtctgagg agagggggga gctggagagg atcctggctg acctggagga ggagaacagg    6780
aaccttcagg ctgagtatga caggctaaag cagcagcatg agcacaaggg cctgagcccc    6840
ctacccagcc cccctgagat gatgcccacc agccccagga gccccaggga tgctgagctg    6900
attgctgagg ccaagctgct gaggcagcac aagggcaggc tggaggccag gatgcagatc    6960
ctagaggacc acaacaagca gctggagagc cagctacaca ggctgaggca gctgctggag    7020
cagcctcagg ctgaggccaa ggtgaatggc accacagtga gcagcccag caccagcctg    7080 cagaggtctg acagcagtca gcccatgctg ctcagggtgg tgggcagtca gacctctgac    7140
agcatgggag aggaggacct gctgagcccc cctcaggaca ccagcacagg cctggaggag    7200
gtgatggagc agctgaacaa cagcttcccc agcagcaggg caggaacac ccctggcaag    7260 cccatgaggg aggacaccat gtag                                           7284
```

<210> SEQ ID NO 23
<211> LENGTH: 4768
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: "5' WL1 cor"

<400> SEQUENCE: 23

```
ctgcgcgctc gctcgctcac tgaggccgcc cgggcaaagc ccgggcgtcg ggcgaccttt      60
ggtcgcccgg cctcagtgag cgagcgagcg cgcagagagg gagtggccaa ctccatcact     120
aggggttcct tgtagttaat gattaacccg ccatgctact tatctacgta ttggccgtcc     180
gccctcggca ccatcctcac gacacccaaa tatggcgacg ggtgaggaat ggtggggagt     240
tattttttaga gcggtgagga aggtgggcag gcagcaggtg ttggcgctct aaaaataact     300
cccgggagtt attttagag cggaggaatg gtggacaccc aaatatggcg acggttcctc     360
acccgtcgcc atatttgggt gtccgccctc ggccgggggcc gcattcctgg gggccgggcg     420
gtgctcccgc ccgcctcgat aaaaggctcc ggggccggcg gcggcccacg agctacccgg     480
aggagcggga ggcgccaagc tctagagtaa gtatcaaggt tacaagacag gtttaaggag     540
accaatagaa actgggcttg tcgagacaga gaagactctt gcgtttctga taggcaccta     600
ttggtcttac tgacatccac tttgcctttc tctccacagg ccaccatgct gtggtgggag     660
gaggtggagg actgctatga gagagaggat gtgcagaaga agaccttcac caagtgggtg     720
aatgcccagt tcagcaagtt tggcaagcag cacattgaga acctgttctc tgacctgcag     780
gatggcagga ggctgctgga cctgctggag ggcctaacag gccagaagct gcccaaggag     840
aagggcagta ccagggtgca tgccctgaac aatgtgaaca aggccctgag ggtgctgcag     900
aacaacaatg tggacctagt gaatattggc agtacagata ttgtggatgg caaccacaag     960
ctgaccctgg gcctgatctg gaatattatc ctacactggc aggtgaagaa tgtgatgaag    1020
aatattatgg ctggcctgca gcagaccaac tctgagaaga tcctgctgag ctgggtgagg    1080
cagagtacca ggaactaccc ccaggtgaat gtgatcaact tcaccaccag ctggtctgat    1140
ggcctggccc tgaatgccct aatccacagc cacaggcctg acctgtttga ctggaactct    1200
gtggtgtgcc agcagtctgc cacccagagg ctagagcatg ccttcaatat tgccaggtac    1260
cagctgggga ttgagaagct gctggaccct gaggatgtgg atacaaccta ccctgacaag    1320
aagagcatcc tgatgtacat caccagcctg ttccaggtgc tgccccagca ggtgagcatt    1380
gaggccatcc aggaggtgga gatgctaccc aggcccccca aggtgaccaa ggaggagcac    1440
ttccagctac accaccagat gcactacagc cagcagatca cagtgagcct ggcccagggc    1500
tatgagagga ccagcagccc caagcccagg ttcaagagct atgcctacac ccaggctgcc    1560
tatgtgacca cctcagaccc caccaggagc cccttcccca gccagcacct ggaggcccct    1620
gaggacaaga gctttggcag cagcctgatg gagtctgagg tgaacctgga caggtaccag    1680
acagccctgg aggaggtgct gagctggctg ctgtctgctg aggatatccct acaggcccag    1740
ggagagatca gcaatgatgt ggaggtggtg aaggaccagt tccatcccca tgagggctac    1800
atgatggacc taacagccca ccagggcagg gtgggcaaca tcctgcagct gggcagcaag    1860
ctgattggca caggcaagct gtctgaggat gaggagacag aggtgcagga gcagatgaac    1920
ctgctgaaca gcaggtggga gtgcctgagg gtggccagta tggagaagca gagcaaccta    1980
cacagggtgc tgatggacct gcagaaccag aagctgaagg agctgaatga ctggctgacc    2040
aagacagaga gaggaccag gaagatggag gaggagcccc tgggccctga cctggaggac    2100
ctaaagaggc aggtgcagca gcacaaggtg ctgcaggagg acctggagca ggagcaggtg    2160
agggtgaaca gcctaaccca tatggtggtg gtggtggatg agagctcagg agaccatgct    2220
acagctgccc tggaggagca gctgaaggtg ctgggagaca ggtgggctaa tatctgcagg    2280
```

```
tggacagagg acaggtgggt gctgctgcag gatatcctgc tgaagtggca gaggctgaca    2340
gaggagcagt gcctgttctc tgcctggctg tcagagaagg aggatgctgt gaacaagatc    2400
catacaacag gcttcaagga ccagaatgag atgctgagca gcctgcagaa gctggctgtg    2460
ctgaaggctg acctggagaa gaagaagcag agtatgggca agctgtacag cctgaagcag    2520
gacctgctga gtaccctgaa gaacaagtct gtgacccaga agacagaggc ctggctggac    2580
aactttgcca ggtgctggga taacctggtg cagaagctgg agaagagtac agcccagatc    2640
agccaggctg tgacaacaac ccagcccagc ctgacccaga acagtgatg gagacagtg    2700
acaacagtga caaccaggga gcagatccta gtgaagcatg cccaggagga gctgcccccc    2760
cccccccccc agaagaagag gcagattaca gtggatggcc tggagaagac agtgagcctc    2820
cagaaggacc tgtcagagat gcatgagtgg atgacccagg ctgaggagga gtacctggag    2880
agggacttcg agtacaagac ccctgatgag ctgcagaagg ctgtggagga gatgaagagg    2940
gccaaggagg aggcccagca gaaggaggcc aaggtgaagc tgctgacaga gtctgtgaac    3000
tctgtgattg cccaggcccc ccctgtggcc caggaggccc tgaagaagga gctggagacc    3060
ctgacaacca actaccagtg gctgtgcacc aggctgaatg gcaagtgcaa gaccctagag    3120
gaggtgtggg cctgctggca tgagctgctg agctacctgg agaaggccaa caagtggctg    3180
aatgaggtgg agttcaagct gaagaccaca gagaacatcc ctggaggagc tgaggagatc    3240
tctgaggtgc tggacagcct ggagaaccta atgaggcact ctgaggacaa ccccaaccag    3300
atcaggatcc tggcccagac cctgacagat ggaggagtga tggatgagct gatcaatgag    3360
gagctggaga ccttcaacag caggtggagg gagctacatg aggaggctgt gaggaggcag    3420
aagctgctag agcagatcca tacagtgagg gaggagacaa tgatggtgat gacagaggat    3480
atgccctgg agatcagcta tgtgcccagc acctacctaa cagagatcac ccatgtgagc    3540
caggccctgc tggaggtgga gcagctgctg aatgcccctg acctgtgtgc caaggacttt    3600
gaggacctgt tcaagcagga ggagagcctg aagaacatca ggacagcct gcagcagagc    3660
tcaggcagga ttgatattat ccacagcaag aagacagctg ccctgcagtc tgctacccct    3720
gtggagaggg tgaagctgca ggaggccctg agccagctgg acttccagtg ggagaaggtt    3780
aacaagatgt acaaggacag gcagggcagg tttgacaggt cagtggagaa gtggaggagg    3840
ttccactatg acatcaagat cttcaaccag tggctgacag aggctgagca gttcctaagg    3900
aagacccaga tccctgagaa ctgggagcat gccaagtaca gtggtacct taaggagctg    3960
caggatggca ttggccagag gcagacagtg gtgaggaccc tgaatgctac aggggaggag    4020
attatccagc agagcagcaa gacagatgcc agtatcctgc aggagaagct gggcagcctg    4080
aacctgaggt ggcaggaggt gtgcaagcag ctgtctgaca ggaagaagag gctggaggag    4140
cagcctgacc tggcccctgg cctgacaaca attggagcca gccctaccca gacagtgacc    4200
ctggtgaccc agcctgtggt gaccaaggag acagctatca gcagctggga gatgcccagc    4260
agcctgatgc tggaggtgcc tgccctggct gacttcaaca gggcctggac agagctgaca    4320
gactggctga gcctgctgga ccaggtgatc aagagccaga gggtgatggt gggggacctg    4380
gaggatatca atgagatgat tatcaagcag aaggctacaa tgcaggacct ggagcagagg    4440
aggcccagc tggaggagct gattacagct gcccagaacc taaagaacaa gaccagcaac    4500
caggaggcca ggacaattat tacagacagg attgagagga tccagaacca gtgggatgag    4560
gtgcaggagc acctgcagtt tacgcgtttt gcggccgctt tacgtagata agtagcatgg    4620
cgggttaatc attaactaca aggaaccect agtgatggag ttggccactc cctctctgcg    4680
```

```
cgctcgctcg ctcactgagg ccgggcgacc aaaggtcgcc cgacgcccgg gctttgcccg    4740
ggcggcctca gtgagcgagc gagcgcgc                                       4768
```

PRODUCTION OF LARGE-SIZED QUASIDYSTROPHINS USING OVERLAPPING AAV VECTORS

CROSS-REFERENCE TO RELATED APPLICATIONS

This application is the U.S. National Phase under 35 U.S.C. § 371 of International Application PCT/EP2020/058372, filed Mar. 25, 2020, which claims the benefit of European Application No. 19305377.4, filed Mar. 25, 2019, the disclosures of which are incorporated by reference herein in their entireties.

The present invention relates to gene therapy vectors which are useful in the treatment or prevention of dystrophic diseases, especially Duchenne muscular dystrophy (DMD) or Becker muscular dystrophy (BMD).

The present application reports that the use of overlapping AAV vectors allows the production of large amount of active truncated dystrophins displaying important functional domains.

BACKGROUND OF THE INVENTION

Duchenne muscular dystrophy (DMD) is the most frequent progressive muscle degenerative disease, affecting approximately one in 3,500 to 5000 male births. DMD is caused by deletions or mutations in the gene encoding dystrophin, located on the X chromosome. Dystrophin is required for the assembly of the dystrophin-glycoprotein complex, and provides a mechanical and functional link between the cytoskeleton of the muscle fiber and the extracellular matrix. The absence of functional dystrophin causes fiber degeneration, inflammation, necrosis and replacement of muscle with scar and fat tissue, resulting in progressive muscle weakness and premature death due to respiratory and cardiac failure between the second and fourth decade of life (Moser, H., Hum Genet, 1984. 66(1): 17-40).

A milder form of the disease called Becker muscular dystrophy (BMD) is distinguished from DMD by delayed onset, later dependence on wheelchair support, and longer life span. BMD usually corresponds to mutations maintaining the reading frame (Muntoni F et al, Lancet Neurol, 2003. 2(12): 731-40).

There is no cure nor effective treatment available for DMD (Rodino-Klapac, L. R. et al., Curr Neurol Neurosci Rep, 2013. 13(3): 332) or BMD. Conventional therapies are limited to supportive care, which partially alleviates signs and symptoms, but does not directly target the disease mechanism nor reverse the phenotype.

There are currently several therapeutic strategies being developed for DMD including in vivo gene therapy, cell transplantation therapy, pharmacologic rescue of DMD nonsense mutations and exon skipping or gene editing strategies to repair the dystrophin gene reading frame. All of these strategies have problems to overcome, including efficiency, targeting different muscle groups, optimization of delivery, long-term expression of the transgene, and potential immune response (Jarmin et al., Expert Opin Biol Ther, 2014. 14(2): 209-30).

Different gene transfer approaches for DMD aim to compensate for dystrophin loss-of-function and offer the potential to treat all patients using a single medication. In order to prevent muscle degeneration, around 30% of normal levels of dystrophin proteins are likely to be required.

The dystrophin gene is the largest known gene in the human genome, spanning over 2.5 Mb or some 2% of the entire X chromosome in humans. It consists of 79 exons (full length cDNA: 11.1 kb), which encodes for a 3685 amino acids, 427 kD dystrophin protein. The dystrophin protein is defined by four structural regions (FIG. 1A). These are the actin binding domain at the $NH_2$ terminus (exons 1 to 8), central rod domain (24 spectrin-like repeats R1-24 and 4 Hinge regions H1-4; exons 9 to 62), cysteine-rich (CR) domain (exons 63 to 69), and carboxy-terminal (CT) domain (exons 70 to 79).

The cDNA size is too large to fit inside known gene therapy vector systems, especially in Adeno-Associated Virus (AAV) vector which is one of the promising candidates with efficient gene transfer into various muscle groups depending on tropism of AAV serotypes. AAV vector has a potential to show long term gene transduction in both dividing (myofibres and cardiomyocytes) and non-dividing (mature myotubes) muscle cells.

Indeed, a major limitation of AAV is its cargo capacity which is thought to be limited to around 5 kb, the size of parental viral genome (Wu Z. et al., Mol Ther., 2010, 18(1): 80-86; Lai Y. et al., Mol Ther., 2010, 18(1): 75-79; Wang Y. et al., Hum Gene Ther Methods, 2012, 23(4): 225-33). Larger vector genomes resulted in truncated packaged genomes, heterogeneous population of genome with broad size distribution, and lower expression efficiency (Wu Z. et al., Mol Ther., 2010, 18(1): 80-86).

To overcome the DNA packaging limitation of AAV (<5 kb), several research groups have attempted to engineer synthetic truncated but functional dystrophins (MD, also known as "microdystrophin" or "minidystrophin"). A series of microdystrophins has been designed to encode truncated dystrophins optimized to contain the more clinically important regions of the protein. Such regions have generally been thought to lie within dystrophin's N-terminal and cysteine-rich domains.

A microdystrophin, which contains the first 3 and the last of the 24 spectrin-like repeats without the C-terminal domain (ΔR4-R23/ΔCT), named MD1 (see FIG. 1B), displayed to highly functional activity to restore dystrophin and co-localise with syntrophin and dystrobrevin, but it failed to recruit nNOS at the sarcolemma in mdx mouse model (Yue et al., Mol Ther, 2006. 14(1): 79-87).

Trials with AAV2/8 vector encoding a sequence optimized canine MD1 microdystrophin, with expression driven by a muscle-specific spc512 promoter (AAV8-spc512-cMD1) in the dystrophic CXMDj dog (Koo et al. J. Gene Med. 2011. 13:497) have proved encouraging. Locoregional delivery induces high levels of microdystrophin expression in limb musculature and significant amelioration of histological and functional parameters. Systemic intravenous administration without immunosuppression results in significant and sustained levels of microdystrophin in skeletal muscles and reduces dystrophic symptoms for over 2 years (Le Guiner et al. Nat Commun. 2017. 8:16105). No toxicity or adverse immune consequences of vector administration are observed.

However, the relevance of the deleted regions, e.g. of the R16-R17 nNOS binding site and/or the R8-R9 Par1b binding site and/or the R10 to R17 binding sites with F-actin, in muscle function remains questioned.

As an alternative strategy, it has been proposed to produce quasidystrophins relying on a recombination event and using a dual AAV vector system. As known in the art, the two vectors of the dual AAV system can be overlapping vectors, trans-splicing AAV vectors or hybrid trans-splicing AAV vectors (see e.g. Pryadkina et al., Molecular Therapy, 2015, 2, 15009).

Based on this strategy and as illustrated in FIG. 1C, Kodippili et al. (Human Gene Therapy, 2018, 29 (3), 299-311) reported expression of a canine ΔH2-R15 minidystrophin (SEQ ID NO: 1) using a pair of dual AAV9 vectors in a canine model of Duchenne Muscular Dystrophy (DMD). More precisely, a first vector contains the cytomegalovirus (CMV) promoter, a flag tag fused to the N-terminal end of the dystrophin gene and the 5' half of the ΔH2-R15 minidystrophin gene (including the N-terminal domain, hinges 1 and 3, and spectrin like repeats R1-R3, R16-R20 and part of R21). The second vector contains the 3' half of the ΔH2-R15 minidystrophin gene (including a part of hinge 3, spectrin-like repeats R20-R24, hinge 4, the cysteine rich domain and the C-terminal domain), a GFP tag fused to the C-terminal end and the SV40 polyadenylation signal. A 375 nucleotide dystrophin gene fragment (from the late part of hinge 3 to the first part of R21) was shared by both vectors.

Anyway, there is still a need in the art for producing high levels of active quasidystrophins.

BRIEF SUMMARY OF THE INVENTION

The present invention aims at alleviating or curing the devastating Duchenne muscular dystrophy (DMD) as well as Becker muscular dystrophy (BMD) by expressing a shorter but functional dystrophin polypeptide, called quasidystrophin, using a dual AAV vector system.

To the knowledge of the Applicants, the present invention reports for the first time genetic tools, i.e. a dual AAV vector system enabling the production of high amount of large active quasidystrophins which display both the R16-R17 nNOS binding site and the R8-R9 Par1b binding site. This offers new therapeutic tools for treating dystrophic diseases.

Over the last few years it has indeed been revealed that DMD pathology is caused by myofiber fragility as well as muscle stem cell dysfunction that impairs muscle regeneration and lead to muscle wasting. The impact of satellite cell dysfunction in DMD associated muscle wasting is a relatively recent finding and could ameliorate by far the current strategies based on AAV-dystrophin delivery by preserving key binding sites and key molecular function of dystrophin.

Par1b, also known as Marks, is a serine-threonine kinase that associates with dystrophin and regulates polarity of satellite cells thereby ensuring asymmetric division (Dumont et al., Nat Med, 2015, 21(12):1455-63). Lack of dystrophin results in downregulation of Par1b and impairment of asymmetric division that is required for proper generation of myogenic progenitors. Therefore, maintenance of Par1b binding site (R8-R9) in the quasidystrophin, is crucial to guarantee satellite cell polarity and asymmetric division for generation of myogenic progenitors and efficient muscle regeneration.

It appears also critical to preserve the binding sites for nNOS (neural Nitric oxide synthase) because it's known that the dystrophin-mediated assembly of cytosolic transmembrane protein nNOS is required for NO production in sarcolemma, a crucial event for the control of blood flow regulation in skeletal muscles (Ervasti, Biochim Biophys Acta, 2007, 1772(2): 108-17).

Definitions

The articles "a" and "an" are used herein to refer to one or to more than one (i.e., to at least one) of the grammatical object of the article. By way of example, "an element" means one element or more than one element.

"About" or "approximately" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

"Isolated" means altered or removed from the natural state. For example, a nucleic acid or a peptide naturally present in a living animal is not "isolated," but the same nucleic acid or peptide partially or completely separated from the coexisting materials of its natural state is "isolated." An isolated nucleic acid or protein can exist in substantially purified form, or can exist in a non-native environment such as, for example, a host cell.

In the context of the present invention, the following abbreviations for the commonly occurring nucleic acid bases are used. "A" refers to adenosine, "C" refers to cytosine, "G" refers to guanosine, "T" refers to thymidine, and "U" refers to uridine.

Unless otherwise specified, a "nucleotide sequence encoding an amino acid sequence" includes all nucleotide sequences that are degenerate versions of each other and that encode the same amino acid sequence. The phrase nucleotide sequence that encodes a protein or a RNA or a cDNA may also include introns to the extent that the nucleotide sequence encoding the protein may in some version contain an intron(s).

"Encoding" refers to the inherent property of specific sequences of nucleotides in a polynucleotide, such as a gene, a cDNA, or an mRNA, to serve as templates for synthesis of other polymers and macromolecules in biological processes having either a defined sequence of nucleotides (i.e., rRNA, tRNA and mRNA) or a defined sequence of amino acids and the biological properties resulting therefrom. Thus, a gene encodes a protein if transcription and translation of mRNA corresponding to that gene produces the protein in a cell or other biological system. Both the coding strand, the nucleotide sequence of which is identical to the mRNA sequence and is usually provided in sequence listings, and the non-coding strand, used as the template for transcription of a gene or cDNA, can be referred to as encoding the protein or other product of that gene or cDNA.

The term "polynucleotide" as used herein is defined as a chain of nucleotides. Furthermore, nucleic acids are polymers of nucleotides. Thus, nucleic acids and polynucleotides as used herein are interchangeable. One skilled in the art has the general knowledge that nucleic acids are polynucleotides, which can be hydrolyzed into the monomeric "nucleotides." The monomeric nucleotides can be hydrolyzed into nucleosides. As used herein polynucleotides include, but are not limited to, all nucleic acid sequences which are obtained by any means available in the art, including, without limitation, recombinant means, i.e., the cloning of nucleic acid sequences from a recombinant library or a cell genome, using ordinary cloning technology and PCR and the like, and by synthetic means.

As used herein, the terms "peptide," "polypeptide," and "protein" are used interchangeably, and refer to a compound comprised of amino acid residues covalently linked by peptide bonds. A protein or peptide must contain at least two amino acids, and no limitation is placed on the maximum number of amino acids that can comprise a protein's or peptide's sequence. Polypeptides include any peptide or protein comprising two or more amino acids joined to each other by peptide bonds. As used herein, the term refers to both short chains, which also commonly are referred to in the art as peptides, oligopeptides and oligomers, for example, and to longer chains, which generally are referred to in the art as proteins, of which there are many types. "Polypeptides" include, for example, biologically active fragments, substantially homologous polypeptides, oligopeptides, homodimers, heterodimers, variants of polypeptides, modified polypeptides, derivatives, analogs, fusion proteins, among others. The polypeptides include natural peptides, recombinant peptides, synthetic peptides, or a combination thereof.

"Identical" refers to the sequence similarity or sequence identity between two polypeptides or between two nucleic acid molecules. When a position in both of the two compared sequences is occupied by the same base or amino acid monomer subunit, e.g., if a position in each of two DNA molecules is occupied by adenine, then the molecules are homologous or identical at that position. The percent of homology/identity between two sequences is a function of the number of matching positions shared by the two sequences divided by the number of positions compared X 100. For example, if 6 of 10 of the positions in two sequences are matched then the two sequences are 60% identical. Generally, a comparison is made when two sequences are aligned to give maximum homology/identity.

A "vector" is a composition of matter which comprises an isolated nucleic acid and which can be used to deliver the isolated nucleic acid to the interior of a cell. Numerous vectors are known in the art including, but not limited to, linear polynucleotides, polynucleotides associated with ionic or amphiphilic compounds, plasmids, and viruses. Thus, the term "vector" includes an autonomously replicating plasmid or a virus. The term should also be construed to include non-plasmid and non-viral compounds which facilitate transfer of nucleic acid into cells, such as, for example, polylysine compounds, liposomes, and the like. Examples of viral vectors include, but are not limited to, adenoviral vectors, adeno-associated virus vectors, retroviral vectors, and the like.

"Expression vector" refers to a vector comprising a recombinant polynucleotide comprising expression control sequences operatively linked to a nucleotide sequence to be expressed. An expression vector comprises sufficient cis-acting elements for expression; other elements for expression can be supplied by the host cell or in an in vitro expression system. Expression vectors include all those known in the art, such as cosmids, plasmids (e.g., naked or contained in liposomes) and viruses (e.g., lentiviruses, retroviruses, adenoviruses, and adeno-associated viruses) that incorporate the recombinant polynucleotide.

The term "promoter" as used herein is defined as a DNA sequence recognized by the synthetic machinery of the cell, or introduced synthetic machinery, required to initiate the specific transcription of a polynucleotide sequence.

As used herein, the term "promoter/regulatory sequence" means a nucleic acid sequence which is required for expression of a gene product operably linked to the promoter/regulatory sequence. In some instances, this sequence may be the core promoter sequence and in other instances, this sequence may also include an enhancer sequence and other regulatory elements which are required for expression of the gene product. The promoter/regulatory sequence may, for example, be one which expresses the gene product in a tissue specific manner.

A "constitutive" promoter is a nucleotide sequence which, when operably linked with a polynucleotide which encodes or specifies a gene product, causes the gene product to be produced in a cell under most or all physiological conditions of the cell.

An "inducible" promoter is a nucleotide sequence which, when operably linked with a polynucleotide which encodes or specifies a gene product, causes the gene product to be produced in a cell substantially only when an inducer which corresponds to the promoter is present in the cell.

A "tissue-specific" promoter is a nucleotide sequence which, when operably linked with a polynucleotide encodes or specified by a gene, causes the gene product to be produced in a cell preferentially if the cell is a cell of the tissue type corresponding to the promoter.

The terms "patient," "subject," "individual," and the like are used interchangeably herein, and refer to any animal, or cells thereof whether in vitro or in situ, amenable to the methods described herein. In certain non-limiting embodiments, the patient, subject or individual is a human.

A "disease" is a state of health of an animal wherein the animal cannot maintain homeostasis, and wherein if the disease is not ameliorated then the animal's health continues to deteriorate. In contrast, a "disorder" in an animal is a state of health in which the animal is able to maintain homeostasis, but in which the animal's state of health is less favorable than it would be in the absence of the disorder. Left untreated, a disorder does not necessarily cause a further decrease in the animal's state of health.

A disease or disorder is "alleviated" or "ameliorated" if the severity of a symptom of the disease or disorder, the frequency with which such a symptom is experienced by a patient, or both, is reduced. This also includes halting progression of the disease or disorder. A disease or disorder is "cured" if the severity of a symptom of the disease or disorder, the frequency with which such a symptom is experienced by a patient, or both, is eliminated.

A "therapeutic" treatment is a treatment administered to a subject who exhibits signs of pathology, for the purpose of diminishing or eliminating those signs.

As used herein, "treating a disease or disorder" means reducing the frequency or severity of at least one sign or symptom of a disease or disorder experienced by a subject. Disease and disorder are used interchangeably herein in the context of treatment.

An "effective amount" of a compound is that amount of compound which is sufficient to provide a beneficial effect to the subject to which the compound is administered. The phrase "therapeutically effective amount", as used herein, refers to an amount that is sufficient or effective to prevent or treat (delay or prevent the onset of, prevent the progression of, inhibit, decrease or reverse) a disease or condition, including alleviating symptoms of such diseases. An "effective amount" of a delivery vehicle is that amount sufficient to effectively bind or deliver a compound.

DETAILED DESCRIPTION OF THE INVENTION

According to a first aspect, the present invention concerns a quasidystrophin (QD), advantageously a functional quasidystrophin, more advantageously of human origin.

In the frame of the present application, quasidystrophin means a peptide or protein which is shorter than the native or wild type dystrophin. In the context of the invention, the terms "microdystrophin", "minidystrophin" and "quasidystrophin" have the same meaning. In the rest of the application, the term "quasidystrophin" will be used since the proteins according to the invention are larger than the microdystrophins previously described, e.g. by Yue et al. (MD1).

According to a specific embodiment, a quasidystrophin according to the invention has a size of more than 35%, 40%, 45%, 50%, 55% or even more than 60% of the size of the full-length dystrophin (e.g. 3685 amino acids for the human version). According to a preferred embodiment, it has a size of more than 61.1%, 62%, 63%, 64% or even 65% of the size of the full-length dystrophin. In relation to the human version, this means that according to the invention, the quasidystrophin advantageously contains more than 2361 amino acids, still advantageously more than 2400 amino acids, e.g. 2406 aa (WL2) or 2427 aa (WL1).

The structure of dystrophin is well documented (see FIG. 1A) and active fragments thereof have been disclosed. As it would be understood in the art, an active fragment is a portion or portions of a full length sequence that retain at least some of the biological functions of the full length sequence.

A "functional" truncated dystrophin or quasidystrophin means that the corresponding peptide or protein is able to perform at least some of the functions of the wild-type dystrophin protein and is able to alleviate, at least partially, one or more of the symptoms associated with the absence of a native dystrophin, especially fiber degeneration, inflammation, necrosis, replacement of muscle with scar and fat tissue, muscle weakness, respiratory and cardiac failure, as well as premature death.

It is preferred that the quasidystrophin according to the invention displays (to a greater or lesser extent) at least one of the properties disclosed in relation to the microdystrophins of the prior art, especially those disclosed by Yue, et al. (Mol Ther, 2006. 14(1): 79-87) or Kodippili et al. (Human Gene Therapy, 2018, 29 (3), 299-311).

Among others, preferred properties are:
Binding with at least one DAP ("dystrophin associated proteins"), especially with syntrophin, dystrobrevin, nNOS and/or PAR-1b proteins;
Recruitment of the DAP complex at the sarcolemma;
Rescue of the microtubule network;
Muscle protection from damage;
Preservation of the global structure of the protein and organization of spectrin repeat (R) domains;
Restoration of muscle structure and function. Of particular interest are the skeletal muscles, but also the cardiac muscle and the diaphragm;
More generally, amelioration of muscular function, gait, cardiac function, respiratory function, survival, quality and/or expectancy of life.

As known in the art, said properties can be tested in vitro on various cells expressing dystrophin, e.g. on iPS derived human DMD myogenic cells, ex vivo on muscle fibres isolated from various animal models, or in vivo based on animal models or even on patients suffering from DMD or BMD. Animal models are e.g. the mdx mouse (Foster H. et al., Mol Ther, 2008. 16(11): p. 1825-32), the $mdx^{4cv}$ mouse (Decrouy et al., Gen Ther, 1997. 4(5): 401-8), the D2.B10-mdx/J mouse (Coley et al., Human Molecular genetics, 2016. 25(1): 130-45), the CXMDj dog (Koo et al., J Gene Med, 2011. 13(9): 497-506) or the GRMD dog (Le Guiner et al., Mol Ther., 2014. 22(11): 1923-35). The mouse model is commonly used to test new constructs encoding microdystrophins. However, this model has drawbacks because the mouse displays a less severe form of the disease, without immune reactions. The other animal model is the dog which is considered more reliable to predict the therapeutic potential of a gene therapy product in humans. The rat model as disclosed by Larcher et al. (Plos One, 2014, 9(10),e110371) is also very interesting since it displays cardiomyopathy.

As mentioned above, the full length dystrophin (FIG. 1A) is characterized by different domains:
a N-terminal domain which binds to actin (CH1CH2);
4 hinge domains (H1 to H4);
24 spectrin-like repeats or rod domains (R1 to R24);
a cysteine-rich (CR) domain;
a C-terminal (CT) domain.

According to one embodiment, a quasidystrophin according to the invention has at least one domain lacking, advantageously at least one spectrin-like-repeat (R), compared to the full length dystrophin.

According to one aspect, quasidystrophins of the invention contain at least one key protein binding site, especially for F-actin, the nNOS protein and the PAR-1b protein. Advantageously, quasidystrophins of interest contain the binding site of nNOS and/or PAR1b. The binding site of nNOS was shown to lie in repeats 16 and 17 (R16, R17) of the rod domain (Lai et al., J. Clin. Invest., 2009. 119:624-635) while a binding of dystrophin repeats 8 and 9 (R8, R9) to PAR1b was demonstrated in vitro (Yamashita et al., Biochem. Biophys. Res. Commun., 2010. 391: 812-817). According to a preferred embodiment, quasidystrophins of interest contain the R16-17 and/or R8-9 rod domains.

According to this aspect, the invention concerns a quasidystrophin comprising the R8, R9, R16 and R17 rod domains.

According to another aspect, the quasidystrophins of the invention are characterized by a N-terminal part lacking or deprived of the R4, R5, R6 and R7 rod domains (ΔR4-R7).

In other words, a quasidystrophin according to the invention has a N-terminal part defined as follows, from its N terminal end and in the following order:
a N-terminal domain which binds to actin (CH1CH2);
the H1 hinge domain;
the R1, R2 and R3 rod domains;
the H2 hinge;
the R8 and R9 rod domains.

Such a quasidystrophin displays the structure CH1CH2H1R1R2R3H2R8R9 in its N terminal part.

According to a preferred embodiment, such a quasidystrophin further contains the R16 and R17 rod domains.

According to a particular embodiment, the quasidystrophins of the invention contains at least the spectrin-like-repeats of the MD1 microdystrophin of the prior art (FIG. 1B), i.e. R1-R2-R3 and R24.

Advantageously, quasidystrophins according to the invention contain further rod (R) domains compared to the MD1 microdystrophin, advantageously at least one chosen in the group consisting of R14, R15, R20, R21, R22 and R23. According to a preferred embodiment, quasidystrophins further contain R22-R23, and possibly R14-R15 or R20-R21.

According to specific embodiments, quasidystrophins according to the invention lack the following rod domains:
R4 to R7, R10 to R15 and R18-R19. In other words, such a quasidystrophin contains R1 to R3, R8-R9, R16-R17 and R20 to R24; or
R4 to R7, R10 to R13 and R18 to R21. In other words, such a quasidystrophin contains R1 to R3, R8-R9, R14 to R17 and R22 to R24;

Advantageously, it further contains:
a complete N-terminal domain, corresponding to amino acids 1 to 252 of SEQ ID NO: 2 or 3
a complete cysteine-rich (CR) domain, corresponding to amino acids 1822 to 2102 of SEQ ID NO: 2 or SEQ ID NO: 20, or to amino acids 1801 to 2081 of SEQ ID NO: 3, respectively;
a partial or full-length C-terminal domain, advantageously the full-length C-terminal domain corresponding to amino acids 2103 to 2427 of SEQ ID NO: 2 or SEQ ID NO: 20, or to amino acids 2082 to 2406 of SEQ ID NO: 3, respectively. Possible partial C-terminal domains are the truncated C-terminal domains of MD1, MD2, MD3 or MD4 as disclosed in WO2016/177911;
Possibly at least one hinge (H) domain, chosen in the group consisting of H1, H2, H3 and H4, advantageously at least H1, H2 and H4, possibly H1, H2, H3 and H4.

According to specific embodiments, the quasidystrophin according to the invention is:
a ΔR4-R7ΔR10-R15ΔR18-R19 quasidystrophin (further named WL1), advantageously of SEQ ID NO: 2; or
a ΔR4-R7ΔR10-R13ΔR18-R21 quasidystrophin (further named WL2), advantageously of SEQ ID NO: 3.

According to one preferred embodiment, the quasidystrophin according to the invention is a ΔR4-R7ΔR10-R15ΔR18-R19 or a ΔR4-R7ΔR10-R13ΔR18-R21 quasidystrophin. According to another preferred embodiment, the quasidystrophin of the invention consists of or comprises the sequence SEQ ID NO: 2 or SEQ ID NO: 3.

According to one embodiment, the quasidystrophin is "substantially identical", that is, is about 60% identical, preferably about 70% identical, more preferably about 80% identical, even more preferably about 90%, 91%, 92%, 93%, 94%, 95%, 96%, 97%, 98% or even more preferably about 99% identical to the quasidystrophins disclosed therein, especially those of sequence SEQ ID NO: 2 or SEQ ID NO: 3.

According to specific embodiments, the ΔR4-R7ΔR10-R15ΔR18-R19 quasidystrophin according to the invention harbors at least one of the two following mutations in its coding sequence (in comparison to SEQ ID NO: 2):
a serine instead of an arginine (R→S) at position 49; and/or
a serine instead of a phenylalanine (F→S) at position 748.

According to a specific embodiment, the ΔR4-R7ΔR10-R15ΔR18-R19 quasidystrophin of the invention consists of or comprises SEQ ID NO: 20.

According to a further aspect, the invention relates to a nucleic acid sequence encoding a quasidystrophin as defined above.

According to one embodiment, the nucleic acid sequence encoding a quasidystrophin according to the invention comprises or consists of SEQ ID NO: 4.

According to another embodiment, the nucleic acid sequence encoding a quasisdystrophin according to the invention is "substantially identical", that is, is about 60% identical, preferably about 70% identical, more preferably about 80% identical, even more preferably about 90%, 91%, 92%, 93%, 94%, 95%, 96%, 97%, 98% or even more preferably about 99% identical to the sequence SEQ ID NO: 4.

According to a preferred embodiment, the nucleic acid sequence according to the invention comprises or consists of SEQ ID NO: 5 or SEQ ID NO: 22.

According to another embodiment, the nucleic acid sequence encoding a quasisdystrophin according to the invention comprises or consists of SEQ ID NO: 21.

According to another embodiment, the nucleic acid sequence encoding a quasisdystrophin according to the invention is "substantially identical", that is, is about 60% identical, preferably about 70% identical, more preferably about 80% identical, even more preferably about 90%, 91%, 92%, 93%, 94%, 95%, 96%, 97%, 98% or even more preferably about 99% identical to the sequence SEQ ID NO: 21.

According to a preferred embodiment, the quasidystrophins of the invention are produced using a so-called dual AAV vector system.

The expression system according to the invention is typically composed of 2 AAV vectors. After in vivo recombination based on the overlapping region shared by the 2 AAV vectors, high amounts of the resulting quasidistrophin are produced. Therefore, the nucleic acid sequence encoding the quasidystrophin is split into 2 parts, i.e. a 5' sequence encoding its N-terminal part and a 3'sequence encoding its C-terminal part. The 3' end of the 5' sequence and the 5' end of the 3'sequence are homologous or even identical so that homologous recombination can take place.

According to a further aspect, the present invention concerns a dual AAV vector system comprising two AAV vectors, wherein
a first AAV vector comprises, between 5' and 3' AAV ITRs, a first nucleic acid sequence that encodes a N-terminal part of the quasidystrophin, and
a second AAV vector comprises, between 5' and 3' AAV ITRs, a second nucleic acid sequence that encodes a C-terminal part of the quasidystrophin,
wherein the first and second nucleic acid sequences comprise an overlapping region that permits the production of the quasidystrophin of the invention by recombination.

In the frame of the invention and as explained below, the terms "overlapping region" (or "overlapping sequences") and "region of homology" (or "region of sequence homology") have the same meaning and are used interchangeably.

In other words, this invention concerns a composition comprising recombinant adeno-associated viral (AAV) vectors, preferably two in number, carrying complementary constructs allowing the functional quasidystrophin of the invention to be expressed.

In the frame of the invention, the term "composition" can be replaced by "association" "combination" or "expression system". It means that the two AAV vectors work together and have to be in contact so that the homologous recombination can take place and then produce an active protein. However, they can be found in a single composition, or in two distinct compositions possibly mixed before use.

According to a specific embodiment, a first adeno-associated viral (AAV) vector comprises:
i) an AAV 5'ITR (Inverted Terminal Repeat) sequence;
ii) a gene portion controlled by a promoter;
iii) an AAV 3'ITR sequence.

In addition, the second adeno-associated viral (AAV) vector comprises:
iv) an AAV 5'ITR (Inverted Terminal Repeat) sequence;
v) a gene portion advantageously followed by a polyadenylation signal;
vi) an AAV 3'ITR sequence.

These two AAV vectors have complementary sequences which will form a functional unit at the time of recombination. As known by the skilled person, recombination occurs by the recognition of homologous sequences present on each of the AAV vectors, thanks to the cellular DNA repair pathway.

Therefore, the gene portions of the two AAV vectors have to fulfil the following requirements:
the gene portions of the first and second AAV vectors together comprise an open reading frame which codes for the quasidystrophin of the invention, preferably of human origin;
the gene portions of the first and second AAV vectors both comprise a region of homology which allows, after homologous recombination, the reconstitution of said open reading frame.

By "dual AAV system", it is meant a vector system composed of two AAV vectors, in which system each vector carries a part of a sequence encoding the quasidystrophin of the invention to be delivered to a cell and an open reading frame (ORF) encoding said quasidystrophin is reconstituted by interaction between the first and the second nucleic acid sequences into the cell. According to the invention, the dual vector system of the invention implements vectors comprising sequences allowing (homologous) recombination, i.e. overlapping vectors. Therefore, a quasidystrophin protein is reconstituted by implementation of homologous recombination by adding an appropriate overlapping region to each of part of the dystrophin gene introduced in each AAV vector.

According to the invention, each adeno-associated viral (AAV) vector of the system comprises an expression construct, also named "expression cassette" or "insert". In the frame of the present application, said "insert" is advantageously defined as the nucleic acid sequence located between the 5' and 3' ITR ("Inverted Terminal Repeat") sequences of the AAV genome.

According to common knowledge in the art, the size of the insert should not largely exceed the wild-type AAV genome length. For example, AAV2 contains 2 ITR sequences of 145 bp each and has a genome of 4682 pb (including the ITR sequences).

In a particular embodiment, the nucleic acid sequences encoding a part of the quasidystrophin introduced in each AAV vector have a length of less than 5 kb, such as less than 4.9, 4.8, 4.7, 4.6 or 4.5 kb.

To advantage, and to limit the constraint of the size of the AAV packaging, said nucleic acid sequences correspond to exons. In other words, they are preferably cDNA fragments.

To advantage, the reading frame formed from combining the two AAVs encodes a quasidystrophin (MD), advantageously a functional quasidystrophin, more advantageously of human origin, as disclosed above.

According to a preferred embodiment, the quasidystrophin to be produced with the claimed dual AAV vector system contains at least 2000 amino acids (aa), advantageously at least 2100 aa, 2200 aa, 2300 aa, 2400 aa or 2500 aa. According to another embodiment, the microdystrophin to be produced with the claimed AAV vector contains no more than 3000 amino acids (aa), advantageously no more than 2900 aa, 2800 aa, 2700 aa, 2600aa 2550 aa or 2500 aa. In a preferred embodiment, a quasidystrophin to be produced with the claimed dual AAV vector system contains between 2400 and 2500 aa, i.e. has a size corresponding to about 70% of the size of the full length dystrophin.

In the dual vector system according to the invention, the first and second nucleic acid sequences display a region of sequence homology to promote intermolecular homologous recombination, thus generating the large quasidystrophin transgene by recombining the two vectors of the dual AAV system, i.e. the nucleic acid sequences encoding the N-terminal part and the C-terminal part of the quasidystrophin, respectively. In a particular embodiment implementing this overlapping system, the length of the region of sequence to homology may vary to a large extent as long as the size of the resulting inserts (including the 5'- and 3'-ITR sequences, and any expression control sequence) is compatible with the size limit for encapsidation within an AAV vector. One skilled in the art is well aware of this size limit and is able to adapt the size of both the first and second nucleic acid sequences, and therefore of the region of sequence homology, according to this knowledge. Therefore, in a particular embodiment, the region of sequence homology is a polynucleotide sequence of the dystrophin gene having a length of less than 4599 nucleotides, for example of less than 4500, 4000, 3500, 3000, 2500, 2000, 1500 or 1000 nucleotides. In another particular embodiment, the region of sequence homology is a polynucleotide sequence of the quasidystrophin sequence having a length of at least 100 nucleotides, such as of at least 100, 200, 300, 400, 500, 600, 700 or 800 nucleotides. In a further particular embodiment, the region of sequence homology is a polynucleotide sequence of the dystrophin gene having a length comprised between 100 and 1000 nucleotides, in particular between 500 and 1000 nucleotides, such as between 700 and 900 nucleotides, advantageously between 750 and 850 nucleotides.

According to another embodiment, said region of homology contains at least one (1) complete spectrin-like domain (R), advantageously two (2) complete, possibly with further two (2) truncated, and optionally one (1) hinge domain (H). They possibly correspond to contiguous domains on the native dystrophin. Advantageously, they are located in the central part of the native dystrophin, e.g. located between R14 and R21.

According to specific embodiments, the overlapping region corresponds to a sequence encoding:
a truncated R16, R17, H3 and a truncated R20, or
a truncated R14, R15, R16 and a truncated R17; or
a truncated H3, R20 and R21.

In one particular embodiment, the first nucleic acid sequence may encode the N-terminal domain of dystrophin, H1, R1 to R3, H2, R8, R9, R16, R17, H3 and a truncated R20, wherein the second nucleic acid sequence encodes a truncated R16, R17, H3, R20 to R24, H4, the CR domain and the C-terminal domain of dystrophin (full length or truncated as disclosed above, advantageously full length).

According to a specific embodiment, the first nucleic acid sequence comprises or consists of SEQ ID NO: 6 or SEQ ID NO: 23 and the second nucleic acid sequence comprises or consists of SEQ ID NO: 7. The 800 bp overlapping region of sequence SEQ ID NO: 12 corresponds to nucleotides 3779 to 4578 of SEQ ID NO: 6 (or SEQ ID NO: 23) and to nucleotides 173 to 972 of SEQ ID NO: 7.

According to another embodiment, the first nucleic acid sequence comprises nucleotides 646 to 4578 of SEQ ID NO: 6 (or SEQ ID NO: 23) and the second nucleic acid sequence comprises nucleotides 173 to 4323 of SEQ ID NO: 7.

According to a specific embodiment, the first nucleic acid sequence comprises or consists of SEQ ID NO: 8 and the second nucleic acid sequence comprises or consists of SEQ ID NO: 9. The 800 bp overlapping region corresponds to nucleotides 3798 to 4597 of SEQ ID NO: 8 and to nucleotides 193 to 992 of SEQ ID NO: 9. According to further embodiments, the 800 bp overlapping region has the sequence SEQ ID NO: 10, SEQ ID NO: 11 or SEQ ID NO: 12.

According to another embodiment, the first nucleic acid sequence comprises nucleotides 665 to 4597 of SEQ ID NO: 8 and the second nucleic acid sequence comprises nucleotides 193 to 4343 of SEQ ID NO: 9.

In another particular embodiment, the first nucleic acid sequence may encode the N-terminal domain of dystrophin, H1, R1 to R3, H2, R8, R9, R14, R15, R16 and a truncated R17, wherein the second nucleic acid sequence encodes a truncated R14, R15, R16, R17, R22 to R24, H4, the CR domain and the C-terminal domain of dystrophin (full length or truncated as disclosed above, advantageously full length).

According to a specific embodiment, the first nucleic acid sequence comprises or consists of SEQ ID NO: 13 and the second nucleic acid sequence comprises or consists of SEQ ID NO: 14. The 800 bp overlapping region corresponds to nucleotides 3701 to 4500 of SEQ ID NO: 13 and to nucleotides 182 to 981 of SEQ ID NO: 14. According to further embodiments, the 800 bp overlapping region has the sequence SEQ ID NO: 15, SEQ ID NO: 16 or SEQ ID NO: 17.

According to another embodiment, the first nucleic acid sequence comprises nucleotides 646 to 4500 of SEQ ID NO: 13 and the second nucleic acid sequence comprises nucleotides 182 to 4347 of SEQ ID NO: 14.

In a further particular embodiment, the first nucleic acid sequence may encode the N-terminal domain of dystrophin, H1, R1 to R3, R16, R17, R18, R19, H3, R20 and R21, wherein the second nucleic acid sequence encodes a truncated H3, R20 to R24, H4, the CR domain and the C-terminal domain of dystrophin (full length or truncated as disclosed above, advantageously full length).

According to a specific embodiment, the first nucleic acid sequence comprises or consists of SEQ ID NO: 18 and the second nucleic acid sequence comprises or consists of SEQ ID NO: 19. The 375 bp overlapping region corresponds to nucleotides 4091 to 4465 of SEQ ID NO: 18 and to nucleotides 193 to 567 of SEQ ID NO: 19.

The nucleic acid sequence encoding the quasidystrophin is advantageously of human origin but can also be a canine, a rat, a murine or a non-human primate sequence. In one embodiment, the nucleic acid sequence originates from the organism it will be administered to, advantageously a human sequence for administration in humans.

According to the invention, the region of sequence homology, i.e. the overlapping region may be a sequence optimized for recombination. Such sequences include those shown in SEQ ID NO: 10, SEQ ID NO: 11 or SEQ ID NO: 12, optimized from the corresponding wild-type sequence (nucleotides 193 to 992 of SEQ ID NO: 9), or those shown in SEQ ID NO: 15, SEQ ID NO: 16 or SEQ ID NO: 17, optimized from the corresponding wild-type sequence (nucleotides 182 to 981 of SEQ ID NO: 14).

In a known manner, there are different ways to optimize a sequence encoding a protein, so as to increase the mRNA level (recombination and transcription) and/or the protein level (translation). In the frame of the invention, the sequences in the vectors of the dual AAV vector system of the invention are advantageously optimized for increasing recombination, and possibly for increasing the expression of the quasidystrophin polypeptide in vivo.

In practise, the following sequences may be optimized:
the first nucleic acid sequence encoding the N-terminal part of dystrophin;
the second nucleic acid sequence encoding the C-terminal part of dystrophin; and/or
the overlapping region between the first and second nucleic acid sequences.

In a particular embodiment, both the non-overlapping sequence of dystrophin and the region of recombination are optimized. Sequence optimization may include a number of changes in a nucleic acid sequence, including codon optimization, increase of GC content, decrease of the number of CpG islands, decrease of the number of alternative open reading frames (ARFs) and/or decrease of the number of splice donor and splice acceptor sites. Because of the degeneracy of the genetic code, different nucleic acid molecules may encode the same protein. It is also well known that the genetic codes of different organisms are often biased towards using one of the several codons that encode the same amino acid over the others. Through codon optimization, changes are introduced in a nucleotide sequence that take advantage of the codon bias existing in a given cellular context so that the resulting codon optimized nucleotide sequence is more likely to be expressed in such given cellular context at a relatively high level compared to the non-codon optimised sequence. In a preferred embodiment of the invention, such sequence optimized nucleotide sequence encoding a functional quasidystrophin is codon-optimized to improve its expression and stability in human cells compared to non-codon optimized nucleotide sequences coding for the same protein, for example by taking advantage of the human specific codon usage bias. In a particular embodiment, the whole sequence of the quasidystrophin, i.e. the non-overlapping and the overlapping regions, is optimized for improving its production by the target or host cell, advantageously in humans.

According to another aspect, the present invention also concerns an AAV vector corresponding to the first AAV vector or to the second AAV vector of the dual AAV vector system according to the invention.

Each AAV vector comprises the nucleic acid sequences encoding the relevant part of the dystrophin gene (N-terminal and C-terminal part, respectively), advantageously as defined above, but also all the sequences required for a proper expression of said quasidystrophin, after recombination and reconstitution of the whole gene.

According to one embodiment, the first and second nucleic acid sequences of the first and second AAV vectors are placed under the control of regulatory sequence(s). Advantageously, the first nucleic acid sequence is preceded by a promoter optionally followed by an intron, and the second nucleic acid sequence is followed by a polyadenylation signal.

Such promoters can be natural or synthetic (artificial) promoters, inducible or constitutive.

In one embodiment, the promoter is a ubiquitous promoter or has a low tissue-specificity. As an example, the expression vector can harbor the phosphoglycerate kinase 1 (PGK), EF1, ACTA1, β-actin, Desmin, all MCK variants, cardiac Troponin and CMV promoter.

In a preferred embodiment, the promoter sequence is chosen in order to adequately govern the expression of the nucleic acid sequence placed under its control, in terms of expression level, but also of tissue specificity.

In one embodiment, the expression vector comprises a muscle specific promoter. Such a promoter allows a robust expression in the skeletal muscles, in the diaphragm and possibly in the cardiac muscle, as well as in satellite cells. Examples of suitable promoters known by the skilled person are e.g. the desmin promoter, the muscle creatine kinase (MCK) promoter, truncated creatine kinase promoters such as e.g. CK6, CK7 or CK8 promoter, the Syn promoter, MyoD, Myf5, Vcam, Pax3 and Pax7 satellite cell promoter. Another promoter is the synthetic promoter C5-12 (spC5-12). It is also possible to use a hybrid promoter comprising sequences from two or more transcriptional regulatory elements (see e.g. PCT/EP2019/053061).

Advantageously, the first nucleic acid sequence is placed under the control of a muscle-specific promoter. In other words, the first AAV vector further comprises a muscle-specific promoter which is operably linked to the nucleic acid sequence encoding the N-terminal part of a dystrophin.

As known in the art, a non-exhaustive list of other possible regulatory sequences to be introduced in one or in the other AAV vector is:
- a polyadenylation signal, advantageously in 3' of the sequence encoding the functional microdystrophin;
- sequences for transcript stabilization, e.g. intron;
- enhancer sequences;
- miRNA target sequences, which can inhibit the expression of the sequence encoding the functional dystrophin in non target tissues, in which said expression is not desired, for example where it can be toxic.

According to one aspect, the intron is selected in the group consisting of a human beta globin b2 (or HBB2) intron, a FIX intron and a chicken beta-globin intron, wherein said intron is optionally a modified intron such as a modified HBB2 intron, a modified FIX intron, or a modified chicken beta-globin intron.

According to another embodiment, the polyadenylation signal is selected among the human beta globin polyadenylation signal, the bovine growth hormone polyadenylation signal, the SV40 polyadenylation (pA) signal, or another naturally occurring or artificial polyadenylation signal.

According to a specific embodiment, the dual AAV vector system according to the invention contains at least one of the following elements, advantageously all of them:
- a spC5-12 promoter, advantageously corresponding to nucleotides 173 to 506 of SEQ ID NO: 6 (or SEQ ID NO: 23);
- a chimeric intron, advantageously corresponding to nucleotides 507 to 639 of SEQ ID NO: 6 (or SEQ ID NO: 23) and
- a SV40 pA signal, advantageously corresponding to nucleotides 4324 to 4545 of SEQ ID NO: 7.

For cloning purposes and production of viral particles, the expression construct can be inserted in a plasmid suitable for selection, replication and production of the quasidystrophin.

According to the invention, the viral vectors containing the expression constructs are adeno-associated viral (AAV) vectors.

Adeno-associated viral (AAV) vectors have become powerful gene delivery tools for the treatment of various disorders. AAV vectors possess a number of features that render them ideally suited for gene therapy, including a lack of pathogenicity, moderate immunogenicity, and the ability to transduce postmitotic cells and tissues in a stable and efficient manner. Expression of a particular gene contained within an AAV vector can be specifically targeted to one or more types of cells by choosing the appropriate combination of AAV serotype, promoter, and delivery method.

In one embodiment, the encoding sequence is contained within an AAV vector. More than 100 naturally occurring serotypes of AAV are known. Many natural variants in the AAV capsid exist, allowing identification and use of an AAV with properties specifically suited for dystrophic pathologies. AAV viruses may be engineered using conventional molecular biology techniques, making it possible to optimize these particles for cell specific delivery of nucleic acid sequences, for minimizing immunogenicity, for tuning stability and particle lifetime, for efficient degradation, for accurate delivery to the nucleus.

As mentioned above, the use of AAVs is a common mode of exogenous delivery of DNA as it is relatively non-toxic, provides efficient gene transfer, and can be easily optimized for specific purposes. Among the serotypes of AAVs isolated from human or non-human primates (NHP) and well characterized, human serotype 2 is the first AAV that was developed as a gene transfer vector. Other currently used AAV serotypes include AAV1, AAV3, AAV4, AAV5, AAV6, AAV7, AAV8, AAV9, AAV10, AAV11 and AAV12. In addition, non-natural engineered variants and chimeric or hybrid AAV can also be useful.

Desirable AAV fragments for assembly into vectors include the cap proteins, including the vp1, vp2, vp3 and hypervariable regions, the rep proteins, including rep 78, rep 68, rep 52, and rep 40, and the sequences encoding these proteins. These fragments may be readily utilized in a variety of vector systems and host cells.

Such fragments may be used alone, in combination with other AAV serotype sequences or fragments, or in combination with elements from other AAV or non-AAV viral sequences. As used herein, artificial AAV serotypes include, without limitation, AAV with a non-naturally occurring capsid protein. Such an artificial capsid may be generated by any suitable technique, using a selected AAV sequence (e.g., a fragment of a vp1 capsid protein) in combination with heterologous sequences which may be obtained from a different selected AAV serotype, non-contiguous portions of the same AAV serotype, from a non-AAV viral source, or from a non-viral source. An artificial AAV serotype may be, without limitation, a chimeric AAV capsid, a recombinant AAV capsid, or a "humanized" AAV capsid. Thus exemplary AAVs, or artificial AAVs, include AAV2/8 (U.S. Pat. No. 7,282,199), AAV2/5 (available from the National Institutes of Health), AAV2/9 (WO2005/033321), AAV2/6 (U.S. Pat. No. 6,156,303), AAVrh8 (WO2003/042397), and rh74-AAV9 (EP18305399.0) among others. In one embodiment, the vectors useful in the compositions and methods described herein contain, at a minimum, sequences encoding a selected AAV serotype capsid, e.g., an AAV8 capsid, or a fragment thereof. In another embodiment, useful vectors contain, at a minimum, sequences encoding a selected AAV serotype rep protein, e.g., AAV8 rep protein, or a fragment thereof. Optionally, such vectors may contain both AAV cap and rep proteins. In vectors in which both AAV rep and cap are provided, the AAV rep and AAV cap sequences can both be of one serotype origin, e.g., all AAV8 origin. Alternatively, vectors may be used in which the rep sequences are from an AAV serotype, which differs from that which is providing the cap sequences. In one embodiment, the rep and cap sequences are expressed from separate sources (e.g., separate vectors, or a host cell and a vector). In another embodiment, these rep sequences are fused in frame to cap sequences of a different AAV serotype to form a chimeric AAV vector, such as AAV2/8 (U.S. Pat. No. 7,282,199).

According to one embodiment, each of said first and second AAV vectors is an AAV vector with an AAV-derived capsid, such as an AAV1, AAV2, variant AAV2, AAV3, variant AAV3, AAV3B, variant AAV3B, AAV4, AAV5, AAV6, variant AAV6, AAV7, AAV8, AAV9, AAV2G9, AAV10 such as AAVcy10 and AAVrh10, AAVrh74, AAVdj, AAV-Anc80, AAV-LK03, AAV2i8, and porcine AAV, such as AAVpo4 and AAVpo6 capsid or with a chimeric capsid, in particular an AAV vector having an AAV8, AAV9, AAVrh74, AAV2i8 capsid or an AAV9-rh74 chimeric capsid, in particular an AAV8, AAV9 or AAVrh74 capsid, more particularly an AAV8 or AAV9 capsid.

In the AAV vectors used in the present invention, the AAV genome is advantageously a single stranded (ss) nucleic acid.

As known in the art, recombinant viral particles can be obtained, e.g. by tri-transfection of 293 HEK cells, by the herpes simplex virus system and by the baculovirus system, or using specific cell lines. Advantageously, the viral particles are obtained by tri-transfection of 293 HEK cells.

The vector titers are usually expressed as viral genomes per ml (vg/ml).

The invention also concerns cells transduced with the dual AAV vector system as disclosed above, especially muscle cells.

According to another aspect, the present invention concerns a composition, advantageously a therapeutic composition or medicament, comprising the dual AAV vector system as disclosed above and possibly other active molecules (other gene therapy products, chemical molecules, peptides, proteins, . . . ), dedicated to the treatment of the same disease or another disease.

The present invention then provides pharmaceutical compositions comprising the dual AAV vector system or the first or second AAV vector of said system. Such compositions comprise a therapeutically effective amount of the therapeutic (the nucleic acid or vector of the invention), and a pharmaceutically acceptable carrier. In a specific embodiment, the term "pharmaceutically acceptable" means approved by a regulatory agency of the Federal or a state government or listed in the U.S. or European Pharmacopeia or other generally recognized pharmacopeia for use in animals, and humans. The term "carrier" refers to a diluent, adjuvant, excipient, or vehicle with which the therapeutic is administered. Such pharmaceutical carriers can be sterile liquids, such as water and oils, including those of petroleum, animal, vegetable or synthetic origin, such as peanut oil, soybean oil, mineral oil, sesame oil and the like. Water is a preferred carrier when the pharmaceutical composition is administered intravenously. Saline solutions and aqueous dextrose and glycerol solutions can also be employed as liquid carriers, particularly for injectable solutions. Suitable pharmaceutical excipients include starch, glucose, lactose, sucrose, sodium stearate, glycerol monostearate, talc, sodium chloride, dried skim milk, glycerol, propylene glycol, water, ethanol and the like.

The composition, if desired, can also contain minor amounts of wetting or emulsifying agents, or pH buffering agents. These compositions can take the form of solutions, suspensions, emulsions, sustained-release formulations and the like. Examples of suitable pharmaceutical carriers are described in "Remington's Pharmaceutical Sciences" by E. W. Martin. Such compositions will contain a therapeutically effective amount of the therapeutic, preferably in purified form, together with a suitable amount of carrier so as to provide the form for proper administration to the subject.

In a preferred embodiment, the composition is formulated in accordance with routine procedures as a pharmaceutical composition adapted for intravenous administration to human beings. Typically, compositions for intravenous administration are solutions in sterile isotonic aqueous buffer. Where necessary, the composition may also include a solubilizing agent and a local anesthetic such as lidocaine to release pain at the site of the injection.

In one embodiment, the composition according to the invention is suitable for administration in humans. The composition is preferably in a liquid form, advantageously a saline composition, more advantageously a phosphate buffered saline (PBS) composition or a Ringer-Lactate solution.

The amount of the therapeutic (i.e. a nucleic acid or a vector) of the invention which will be effective in the treatment of dystrophic diseases can be determined by standard clinical techniques. In addition, in vivo and/or in vitro assays may optionally be employed to help predict optimal dosage ranges. The precise dose to be employed in the formulation will also depend on the route of administration, the weight and the seriousness of the disease, and should be decided according to the judgment of the practitioner and each patient's circumstances.

The above-disclosed AAV vectors or composition can be used as a medicament, especially as a gene therapy product, to be administered to a subject in need thereof. According to another aspect, the present invention concerns the use of the above-disclosed AAV vectors or composition for the preparation of a medicament.

Suitable administration should allow the delivery of a therapeutically effective amount of the gene therapy product to the target tissues, especially skeletal muscles and possibly diaphragm and heart. In the context of the invention, when the gene therapy product is a viral vector comprising a nucleic acid sequence encoding a quasidystrophin, the therapeutic dose is defined as the quantity of viral particles (vg for viral genomes) containing the quasidystrophin sequence, administered per kilogram (kg) of the subject.

Available routes of administration are topical (local), enteral (system-wide effect, but delivered through the gastrointestinal (GI) tract), or parenteral (systemic action, but delivered by routes other than the GI tract). Preferred route of administration of the compositions disclosed herein is parenteral and includes intramuscular administration (i.e. into the muscle) and systemic administration (i.e. into the circulating system). In this context, the term "injection" (or "perfusion" or "infusion") encompasses intravascular, in particular intravenous (IV), and intramuscular (IM) administration. Injections are usually performed using syringes or catheters.

In one embodiment, systemic delivery of the composition comprises administering the composition near a local treatment site, i.e. in a vein or artery nearby a weakened muscle. In certain embodiments, the invention comprises the local delivery of the composition, which produces systemic effects. This route of administration, usually called "regional (loco-regional) infusion", "administration by isolated limb perfusion" or "high-pressure transvenous limb perfusion" has been successfully used as a gene delivery method in muscular dystrophy (Zheng Fan et al. (2012, Molecular Therapy 20(2), 456-461).

A preferred method of administration according to the invention is systemic administration. Systemic injection opens the way to an injection of the whole body, in order to reach the entire muscles of the body of the subject including the heart and the diaphragm and then a real treatment of these systemic and still incurable diseases. In certain embodiments, systemic delivery comprises delivery of the composition to the subject such that composition is accessible throughout the body of the subject.

According to a preferred embodiment, systemic administration, including in utero administration, occurs via injection of the composition in a blood vessel, i.e. intravascular (intravenous or intra-arterial) administration. According to one embodiment, the composition is administered by intravenous injection, through a peripheral vein. Alternatively, systemic administration occurs via intramuscular injection.

When systemically delivered, the composition containing the dual AAV vector system of the invention is preferably administered with a dose less than or equal to $10^{15}$ vg/kg or even $10^{14}$ vg/kg, advantageously between $10^{12}$ vg/kg and $10^{14}$ vg/kg, more advantageously between $5.10^{12}$ vg/kg and $10^{14}$ vg/kg, e.g. 1, 2, 3, 4, 5, 6, 7, 8 or $9.10^{13}$ vg/kg. A dose of e.g. 1, 2, 3, 4, 5, 6, 7, 8 or $9.10^{12}$ vg/kg or even lower can also be contemplated in order to avoid potential toxicity and/or immune reactions. As known by the skilled person, a dose as low as possible given a satisfying result in term of efficiency is preferred.

In a specific embodiment, the treatment comprises a single administration of the composition.

In one embodiment, the presence of the AAV vectors and/or the expression of the quasidystrophin, as well as the associated therapeutic benefits, are observed for up to 1 month, or 3 months or 6 months or even 1 year, 2 years, 5 years, 10 years, or even more the whole life of the subject.

According to the invention, the subject is preferably a human, but can also be a mouse, a rat, a nonhuman primate or a dog.

"Dystrophic disease" in the context of the invention means a disease linked to a defect in the dystrophin gene. This defect can be deletions or mutations leading to low level of expression or absence of expression, introduction of a premature stop codon in the open reading frame, or the production of an inactive protein. Preferred dystrophic diseases are Duchenne and Becker muscular dystrophy (DMD/BMD) caused by mutations of the dystrophin gene. Said mutations can result in the absence or a low level of dystrophin expression, or in the production of a partially or fully inactive, possibly truncated, protein.

Subjects that could benefit from the compositions of the invention include all patients diagnosed with a muscular dystrophy or at risk of developing such a muscular dystrophy. A subject to be treated can then be selected based on the identification of mutations or deletions in the dystrophin gene by any method known to the one skilled in the art, including for example sequencing of the dystrophin gene, and/or through the evaluation of the dystrophin level of expression or activity by any method known to the one skilled in the art. Therefore, said subjects include both subjects already exhibiting symptoms of a dystrophic disease and subjects at risk of developing said disease. In one embodiment, said subjects include subjects already exhibiting symptoms of a dystrophic disease. In another embodiment, said subjects are ambulatory patients and early non-ambulant patients.

According to one embodiment, the invention concerns a dual AAV vector system as disclosed above or a composition comprising said AAV vector for use in the treatment of a dystrophic disease. According to another embodiment, the invention concerns the use of an AAV vector as disclosed above or a composition comprising said AAV vector for the preparation of a medicament for the treatment of a dystrophic disease.

In other words, the present invention provides a method for treating a dystrophic disease in a subject, comprising administrating to the subject a dual AAV vector system as disclosed above or a composition comprising said system.

Such dual AAV vector systems and compositions comprising said systems are notably intended for gene therapy, particularly for the treatment of subjects suffering from Duchenne muscular dystrophy (DMD) or Becker muscular dystrophy (BMD). A first target of is to provide a safe (not toxic) treatment. A further aim is to provide an efficient treatment which allows to postpone, slow down or prevent the development of the disease, and possibly to ameliorate the phenotype of the patient which can be easily monitored at the clinical level. In a subject, AAV vectors and compositions according to the invention can be used:

for ameliorating muscular function. Of particular interest are the skeletal muscles, but also the cardiac muscle and the diaphragm;
for ameliorating gait;
for ameliorating cardiac function;
for ameliorating respiratory function;
for prolonging survival, more generally to ameliorate the quality and the expectancy of life.

The practice of the present invention employs, unless otherwise indicated, conventional techniques of molecular biology (including recombinant techniques), microbiology, cell biology, biochemistry and immunology, which are well within the purview of the skilled artisan. Such techniques are explained fully in the literature, such as, "Molecular Cloning: A Laboratory Manual", fourth edition (Sambrook, 2012); "Oligonucleotide Synthesis" to (Gait, 1984); "Culture of Animal Cells" (Freshney, 2010); "Methods in Enzymology" "Handbook of Experimental Immunology" (Weir, 1997); "Gene Transfer Vectors for Mammalian Cells" (Miller and Calos, 1987); "Short Protocols in Molecular Biology" (Ausubel, 2002); "Polymerase Chain Reaction: Principles, Applications and Troubleshooting", (Babar, 2011); "Current Protocols in Immunology" (Coligan, 2002). These techniques are applicable to the production of the polynucleotides and polypeptides of the invention, and, as such, may be considered in making and practicing the invention. Particularly useful techniques for particular embodiments will be discussed in the sections that follow.

The disclosures of each and every patent, patent application, and publication cited herein are hereby incorporated herein by reference in their entirety.

Without further description, it is believed that one of ordinary skill in the art can, using the preceding description and the following illustrative examples, make and utilize the compounds of the present invention and practice the claimed methods.

EXPERIMENTAL EXAMPLES

The invention is further described in detail by reference to the following experimental examples and the attached figures. These examples are provided for purposes of illustration only, and are not intended to be limiting.

A/ Western blotting with anti-dystrophin antibody

Figure 1A:
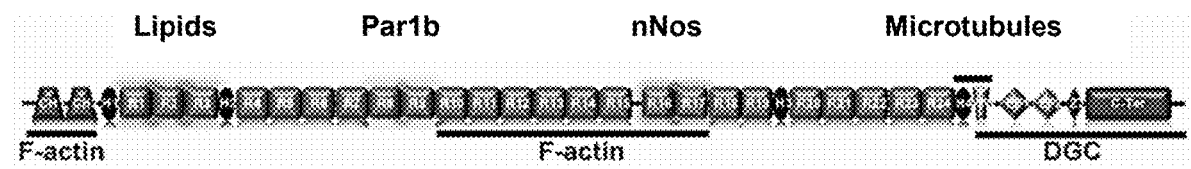
FIG. 1: Scheme of the different forms of dystrophins:
A/ Scheme of the full-length dystrophin;
B/ Scheme of the MD1 microdystrophin as disclosed by Yue et al.;
C/ Scheme of the ΔH2-R15 quasidystrophin (SEQ ID NO: 1) as disclosed by Kodippili et al. (DD);
D/ Scheme of the ΔR4-R7ΔR10-R15ΔR18-R19 quasidystrophin (SEQ ID NO: 2) according to the invention (WL1);
E/ Scheme of the ΔR4-R7ΔR10-R13ΔR18-R21 quasidystrophin (SEQ ID NO: 3) according to the invention (WL2).

The TA muscles of 3-month old mdx mice were injected with 1×10$^{10}$ vg of AAVs. TA muscles were recovered 30 days after injection and processed for western blotting with an antibody (DysB) against dystrophin. Panels 6 to 8 (Opt) show the level of protein WL1 (280 kDa) obtained with a dual AAV vector system according to the invention in comparison to that obtained with AAV2/9-hMD1 (panel 9: 138 kDa), human control sample (FL: panel 2: 427 kDa) and mdx (KO: panels 3 and 4), respectively. Control muscles from age-matched mdx and C57BL/10 were injected with saline only.

B and C/ The TA muscles of 1-2 month old WT mice were injected with 1-3×10$^{10}$ vg of AAVs. TA muscles were collected 30 days after injection and processed for western blotting with an antibody against dystrophin (DysB and Dys2) and against α-actinin level (α-actinin level was used as a normalizer). Comparison of protein level expressed from different constructs:
WL1 wt (expressed from SEQ ID NO: 8+9) panels 1 to 3 in upper blot;
WL2 wt (expressed from SEQ ID NO: 13+14: panels 4 to 6 in upper blot;
WL1 Opt (expressed from SEQ ID NO: 6+7): panels 7 to 9 in upper blot;
PBS: panel 10 in upper blot;
DD (expressed from SEQ ID NO: 18+19): panels 1 to 3 in lower blot;
WL1 Opt (expressed from SEQ ID NO: 6+7: panels 4 to 6) in lower blot;
PBS: panel 7 in lower blot.

FIG. 3: Evaluation of the dystrophin expression and distribution in TA muscles 1 month old Dba2_Mdx mice were intravenously injected with either:
5'AAV vector harboring SEQ ID NO: 6 and 3'AAV vector harboring SEQ ID NO: 7 (7 mice injected; n=3 representative ones on WB);
5'AAV vector harboring SEQ ID NO: 6 only (2 mice injected; n=1 representative one on WB);
3'AAV vector harboring SEQ ID NO: 7 only (2 mice injected; n=1 representative one on WB);
No vector, i.e. PBS (5 mice injected; n=2 representative ones on WB)

TA muscles were recovered 70 days after injection and processed for western blotting or cryosectioning.

A/ Western blotting (WB) with anti-dystrophin antibodies (Dys N-ter and Dys C-ter) and α-actinin antibody. Expected size=280 kDa; Full-length dystrophin=427 kDa.

B/ Immunolabelling in cryosections with Dys N-ter antibody. The percentage of positive fibers is mentioned on each picture.

FIG. 4: Evaluation of the dystrophin therapeutic effect in TA muscles treated as in FIG. 3
A/ Staining of sections with Hematoxylin, Phloxine, Saffron (HPS)
B/ Expression level of TMEM8C (top left), CD11b (top right) and fibronectin (bottom)

Figure 5:
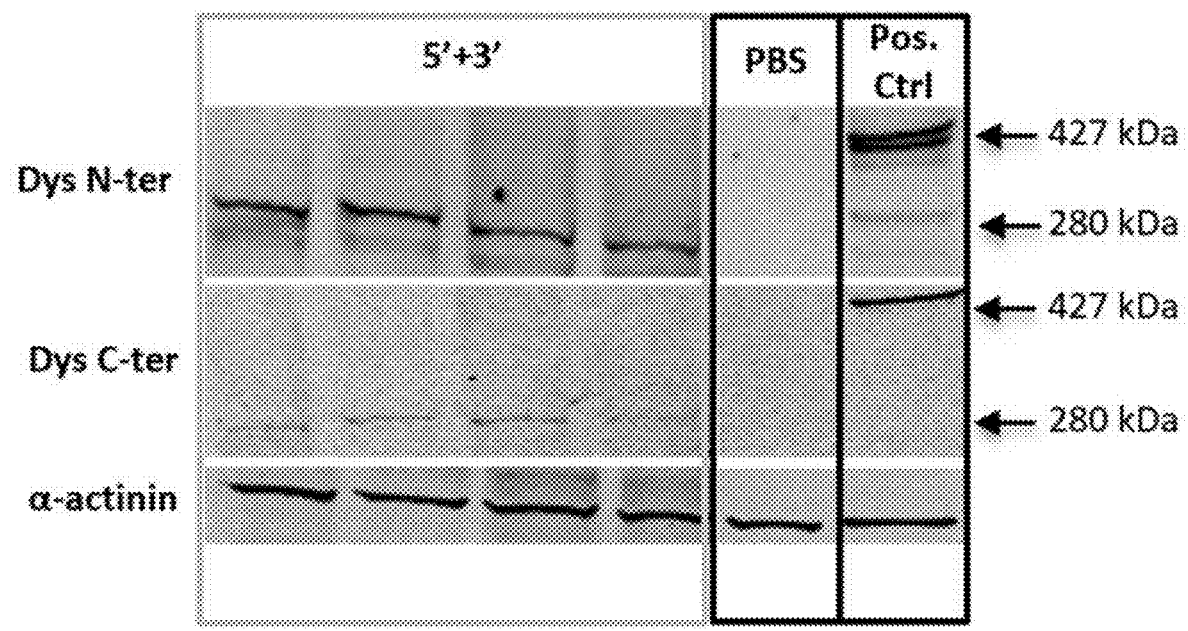

FIG. 5: Evaluation of the dystrophin expression in the heart of mice treated as in FIG. 3 by western blotting with anti-dystrophin antibodies (Dys N-ter and Dys C-ter) and α-actinin antibody FIG. 6: Evaluation of the dystrophin expression and distribution in TA (Tibialis Anterior) and DIA (diaphragm) Dba2_Mdx mice were intravenously injected with either:
5'AAV vector harboring SEQ ID NO: 6 and 3'AAV vector harboring SEQ ID NO: 7 (5'mut+3' or Dual Dys mut); 5 mice injected;
5'AAV vector harboring SEQ ID NO: 23 and 3'AAV vector harboring SEQ ID NO: 7 (5'cor+3' or Dual Dys cor); 5 mice injected;

For comparison, non injected (NI) Dba2_Mdx mice (n=3) and Dba2 WT mice were included in the experiments.

TA and DA muscles were recovered 3 weeks after injection and processed for western blotting or cryosectioning.

A/ Western blotting (WB) with anti-dystrophin antibody (Dys2) and α-actinin antibody (used to normalize the sample). Expected size=280 kDa; Full-length dystrophin=427 kDa; L=ladder; HL=high molecular weight ladder, T+=positive control.

B/ Immunolabelling in cryosections with Dys2 antibody. The percentage of positive fibers is mentioned on each picture.

Figure 6A:
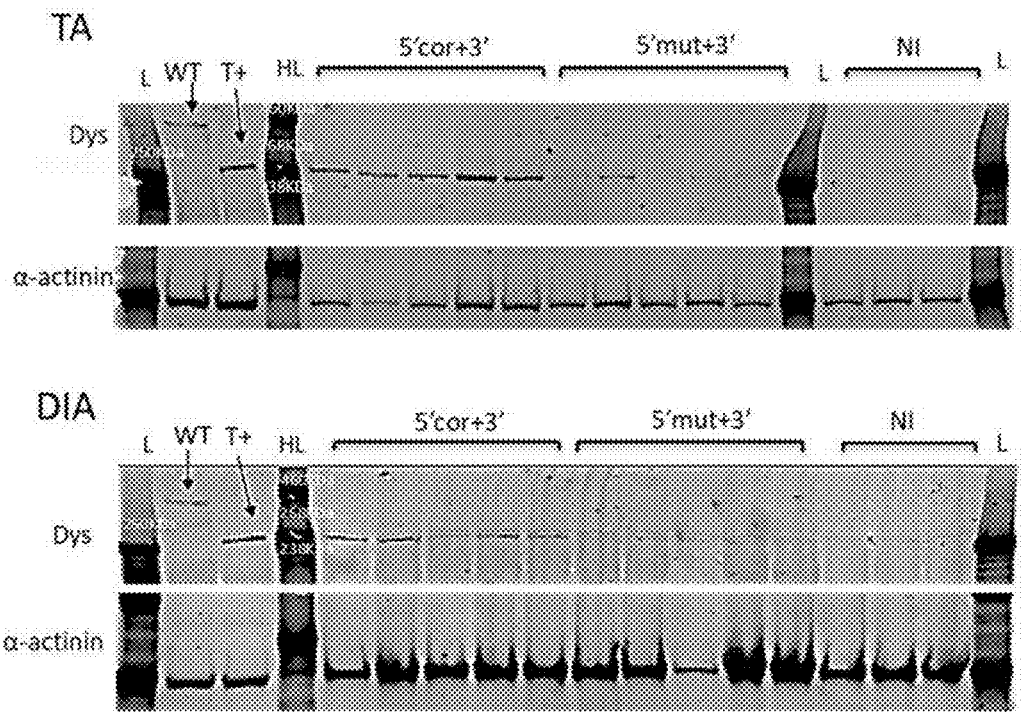
Figure 6B:
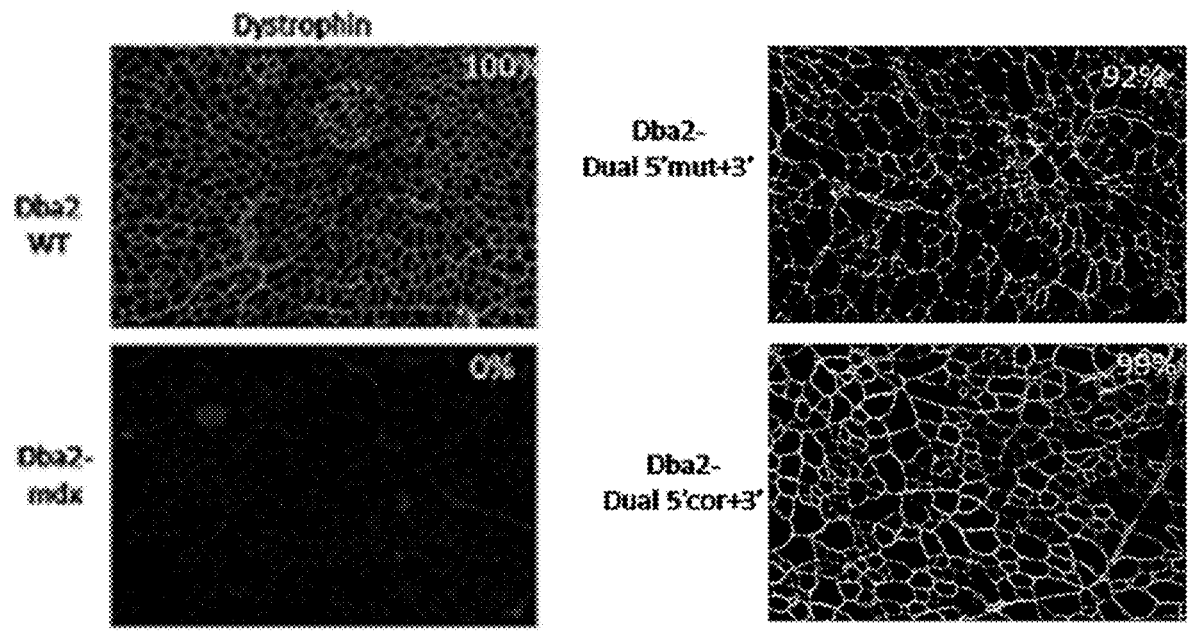
Figure 7:
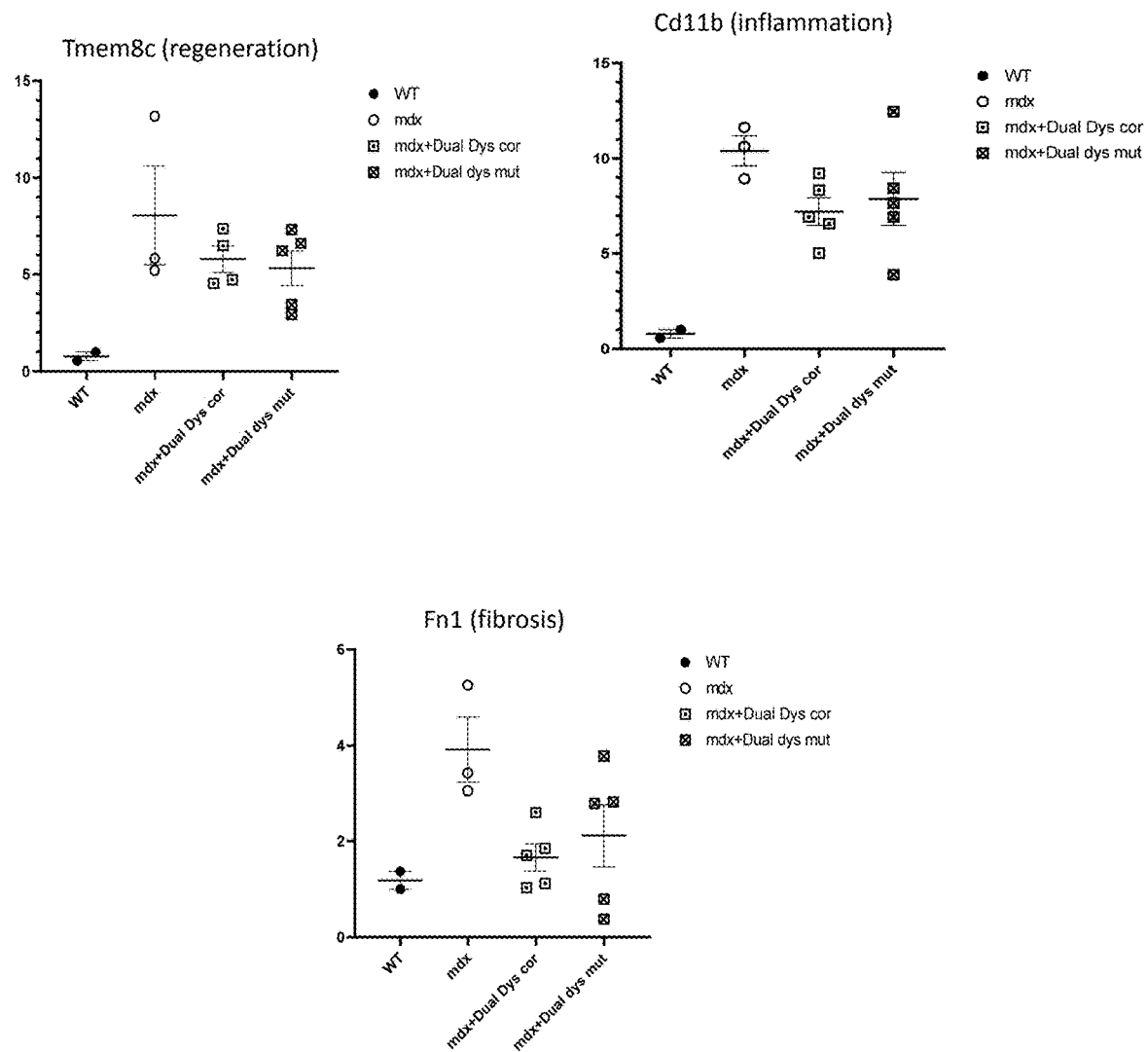

FIG. 7: Evaluation of the dystrophin therapeutic effect in muscles treated as in FIG. 6: Expression level of TMEM8C (top left), CD11 b (top right) and fibronectin (bottom).

MATERIAL AND METHODS

In vivo gene transfer. Different mouse models were used in this study: wild-type C57BL/10 and C57BL/6J; mdx and Dba_2Mdx (D2.B10-mdx/J). All mouse procedures were done according to protocol approved by the Ethic Committee at the CERFE of Evry animal facility and under appropriate biological containment. Adeno-associated virus vectors were produced using three-plasmid constructs protocol. After sacrifice, tissues (TA muscles and heart) were collected, snap-frozen in liquid nitrogen-cooled isopentane and stored at −80° C.

Western blot. Total proteins were extracted from tissue samples. Protein extracts were separated on gels NuPAGE™, then transferred on a nitrocellulose membrane. Membranes were then blocked with Odyssey Blocking Buffer and PBS, then hybridized with the adequate antibody (antiDystrophin DysB or Dys2 antibody, rabbit alpha-actinin (Life Technologies)) and with secondary anti-mouse or anti-rabbit-conjugated (680 or 800) antibodies.

Immunohistochemistry TA muscle cryo-sections were stained using Mouse on Mouse (M.O.M) kit (Vector Labs). Primary antibodies were incubated overnight at 4° C. followed by 3 washes with PBS-0.1% tween, and incubated with goat anti-mouse or goat anti-rabbit secondary antibodies Alexa 594 (Life Technologies). Antibodies against dystrophin (Dys2, 1:100, mouse monoclonal, Novocastra) were used.

HPS staining. TA muscle cryo-sections were stained using Hematoxylin (nuclear staining), Phloxine (cytoplasmic staining) and Saffron (collagen).

PCR quantification of dystrophic profile. Expression of TMEM8C (for measuring fiber regeneration/TGE Mm00481256_ml, ThermoFisher), CD11b (for measuring inflammation/TGE Mm00434455_ml) and fibronectin (for measuring fibrosis/TGE Mm01256744_ml) was quantified on cDNA collected from cryo-sections by RT-quantitative PCR (RTqPCR).

Results:
1) Construction of AAV Vectors

Different recombinant AAV2/8 or AAV2/9 vectors were constructed to evaluate their relative efficiency for dystrophin production:

TABLE 1

List of tested dystrophins

Figure 1B:
Figure 1C:
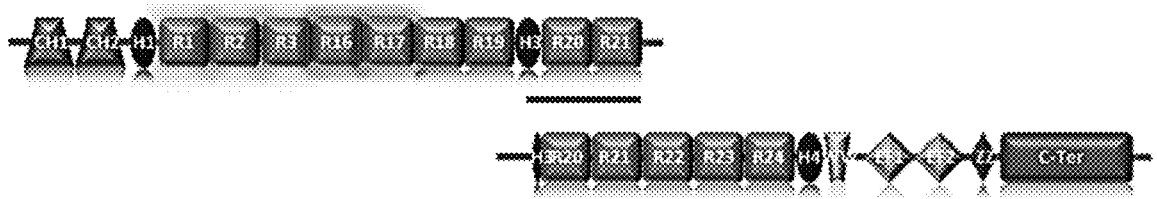
Figure 1D:
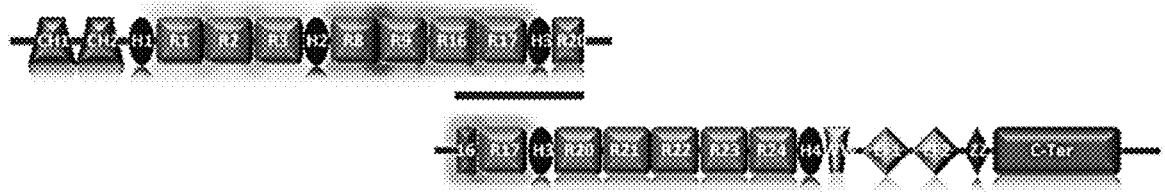
Figure 1E:
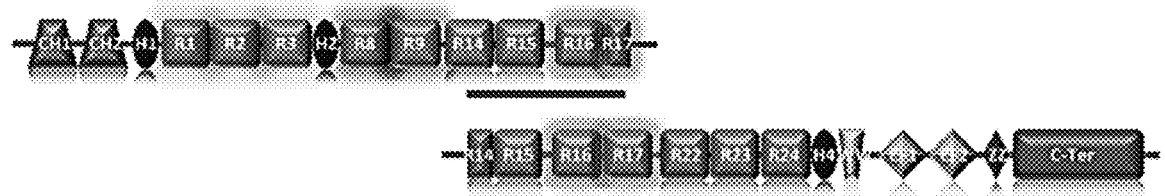

| Name | Dystrophin (MW) | Encoding sequences | Regulatory sequences |
|---|---|---|---|
| FL (FIG. 1A) | Full length dystrophin (427 kDa) | — | — |
| MD1 (FIG. 1B) | Microdystrophin (138 kDa) | See Yue et al. | See Yue et al. |
| DD (FIG. 1C) | Minidystrophin (280 kDa) (SEQ ID NO: 1) | 5'AAV: SEQ ID NO: 18 3'AAV: SEQ ID NO: 19 | See Kodippili et al. |
| WL1 wt (FIG. 1D) | quasidystrophin (280 kDa) (SEQ ID NO: 2) | Overlapping AAV vectors: 5'AAV: SEQ ID NO: 8 3'AAV: SEQ ID NO: 9 | spC5-12 promoter, chimeric intron and SV40 pA |
| WL1 Opt or hDysOpt or T+ (FIG. 1D) | quasidystrophin (280 kDa) (SEQ ID NO: 20) | Overlapping AAV vectors: 5'AAV (5'mut): SEQ ID NO: 6 3'AAV: SEQ ID NO: 7 | spC5-12 promoter, chimeric intron and SV40 pA signal |
| WL1 Cor (FIG. 1D) | quasidystrophin (280 kDa) (SEQ ID NO: 2) | Overlapping AAV vectors: 5'AAV (5'cor): SEQ ID NO: 23 3'AAV: SEQ ID NO: 7 | spC5-12 promoter, chimeric intron and SV40 pA signal |
| WL2 wt (FIG. 1E) | quasidystrophin (280 kDa) (SEQ ID NO: 3) | Overlapping AAV vectors: 5'AAV: SEQ ID NO: 13 3'AAV: SEQ ID NO: 14 | spC5-12 promoter, chimeric intron and SV40 pA signal |

2) Analysis of Dystrophin Profile after Intramuscular (IM) Delivery

Figure 2A:
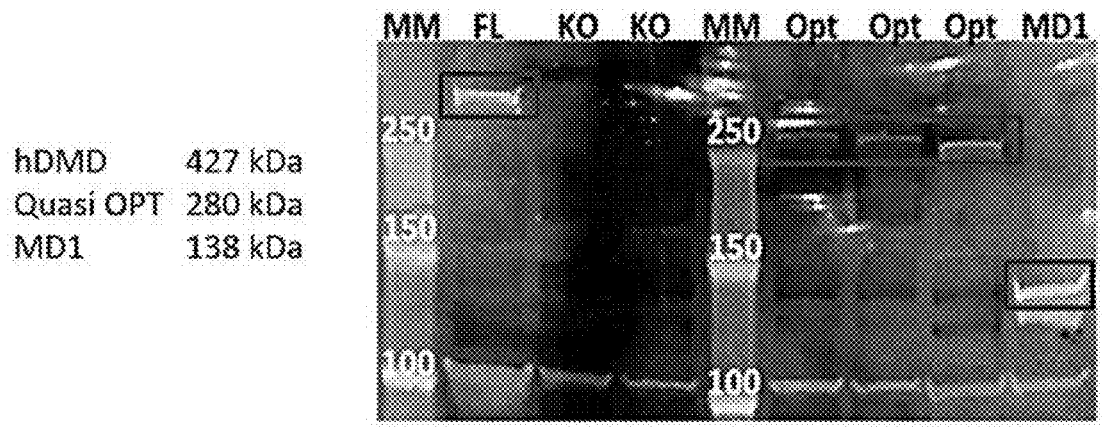
FIG. 2: Analysis of the production level of the different forms of dystrophins.

To evaluate the muscle transduction and level of expression of the protein produced from the dual vector system according the invention, an in vivo analysis of the vectors was performed. One-month-old dystrophin deficient (mdx) mice were intramuscularly injected with 1e10 vg of AAV vectors. Tibialis anterior (TA) muscles were recovered 30 days after injection and processed for western blotting with an antibody (DysB) against dystrophin (FIG. 2A): Panels 6 to 8 (Opt) show the level of protein WL1 OPT (280 kDa) obtained with a dual AAV vector system according to the invention in comparison to that obtained with AAV2/9-hMD1 (panel 9: 138 kDa), human dystrophin (FL: panel 2: 427 kDa) and mdx (KO: panels 3 and 4), respectively. Control muscles from age-matched mdx and C57BL/10 were injected with saline only. As shown, these data confirm that a truncated dystrophin according to the invention can be efficiently produced based on a dual AAV vector system.

Figure 2B:
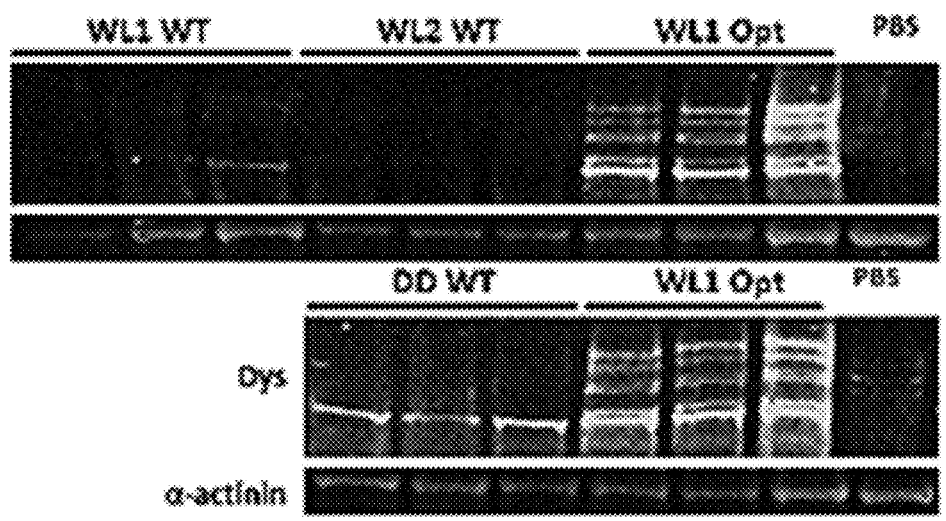
Figure 2C:
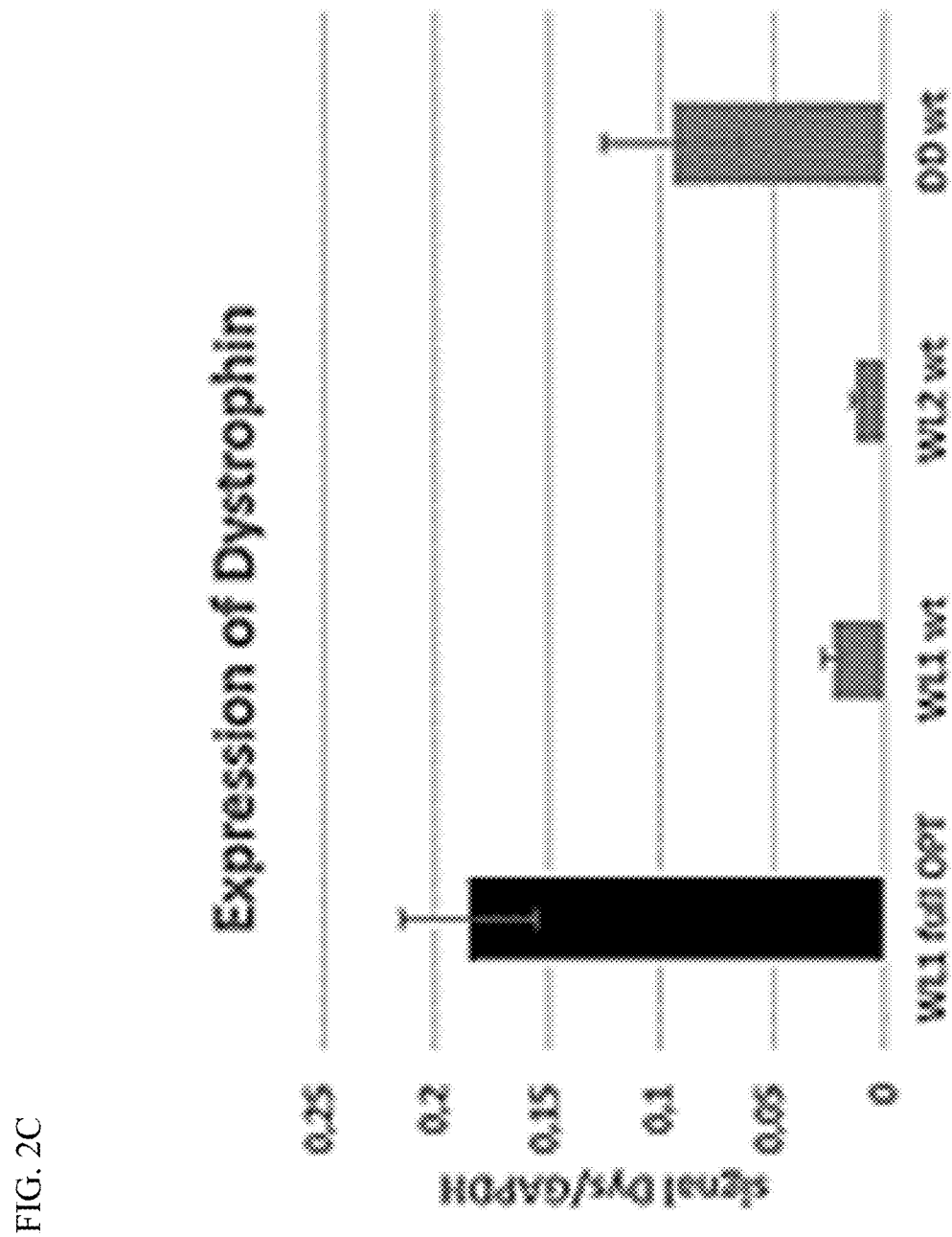

Further experiments were performed to evaluate different dual AAV vector systems. 1-month-old wt mice were intramuscularly injected with 1-3e10 vg of AAV vectors. Tibialis anterior (TA) muscles were recovered 30 days after injection and processed for western blotting with antibodies against dystrophin (Dys2 and DysB) and α-actinin. FIGS. 2B and C show the quantification of protein level obtained after normalization with α-actinin using StudioLight software.

FIG. 2B shows the results revealing that the quasidystrophin according to the invention (WL1 Opt) is produced at a significant level, higher than WL1 wt and WL2 wt and even better than the one obtained with the construct according to the prior art (DD).

Therefore, further experiments were performed using said construct identified as the most promising for functional evaluation.

3) Analysis of Dystrophin Profile after Intravascular (IV) Injection

A/ Using WL1 Opt

Following the IM analysis, WL1 Opt was selected for intravascular (IV) injection. Four week old Dba_2Mdx mice received the preparations (n=7 for 5'+3'; n=2 for 5' alone; n=2 for 3' alone; n=5 for PBS) by intravascular injection (5e11vg/mouse). Endpoint analyses were performed 70 days post gene transfer.

3-1 in the Muscles

Figure 3A:
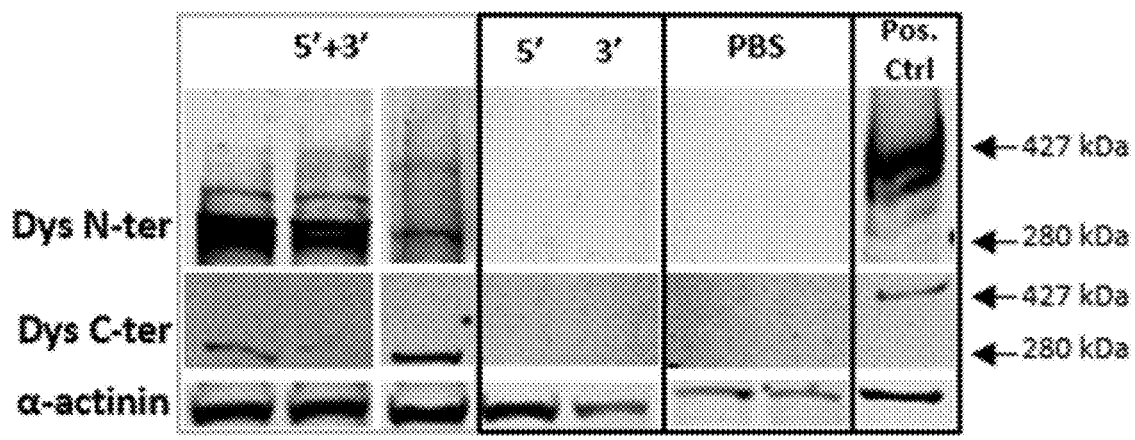
Figure 3B:
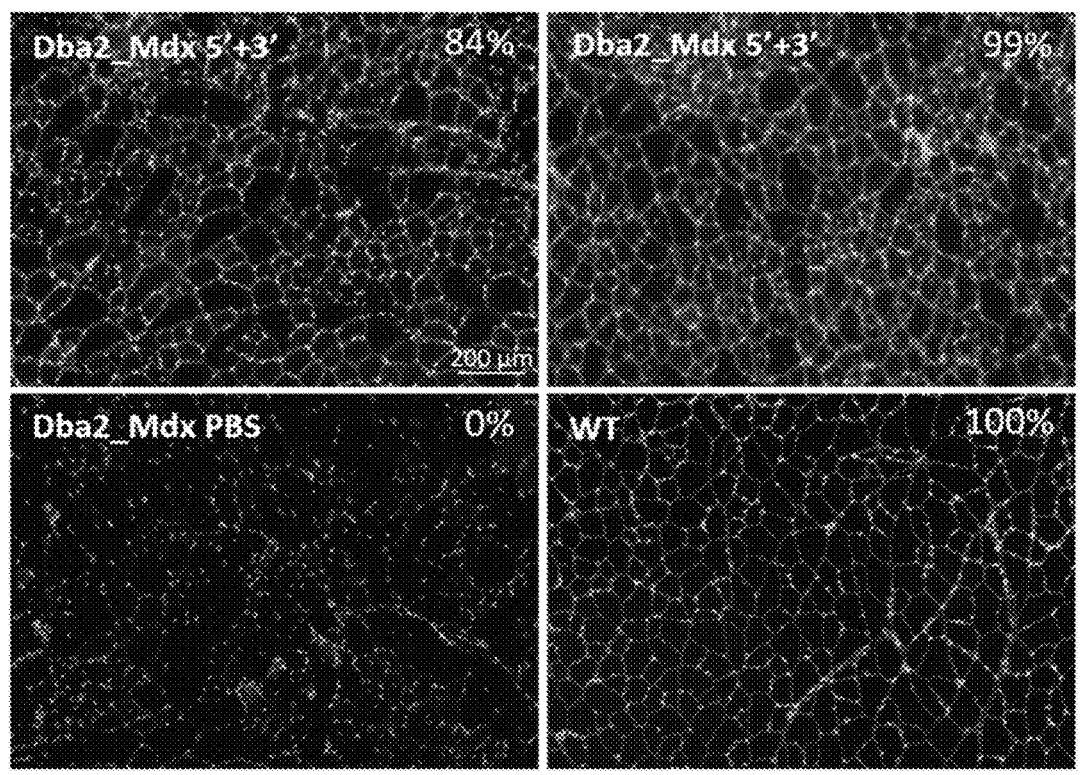

Quasidystrophin production based on the dual AAV vector system according to the invention was confirmed after intravenous injection (FIG. 3A).

Immunohistochemical analysis of TA muscle sections (FIG. 3B) shows a labelling of dystrophin at the membrane and confirms the proper expression of the quasidystrophin according to the invention, despite a certain heterogeneity in the expression level between mice.

Figure 4A:
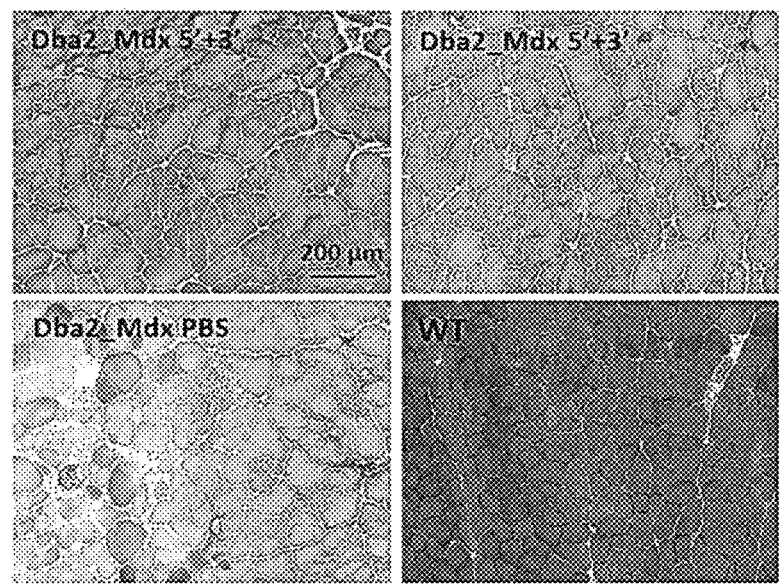
Figure 4B:
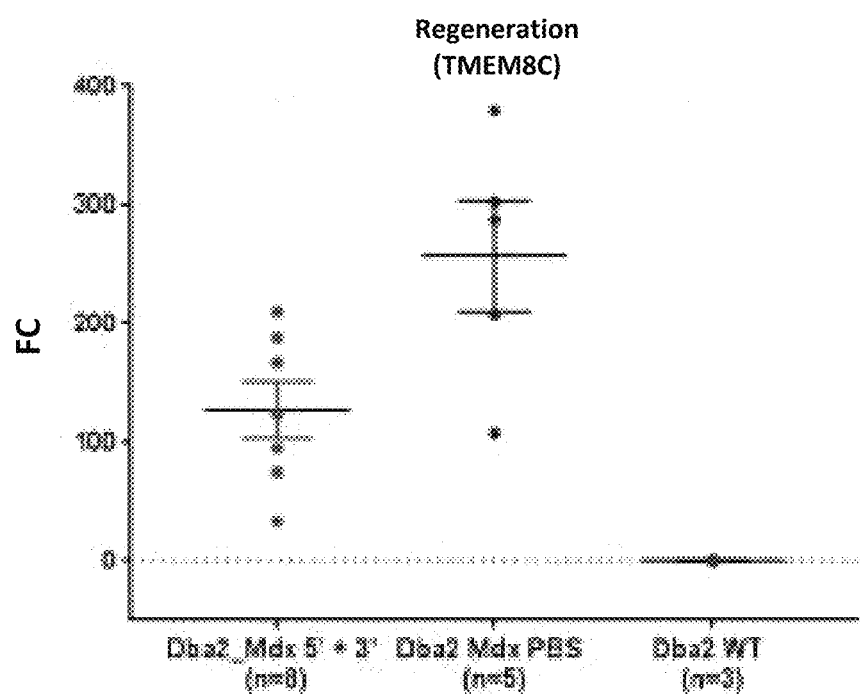
Figure 4B:
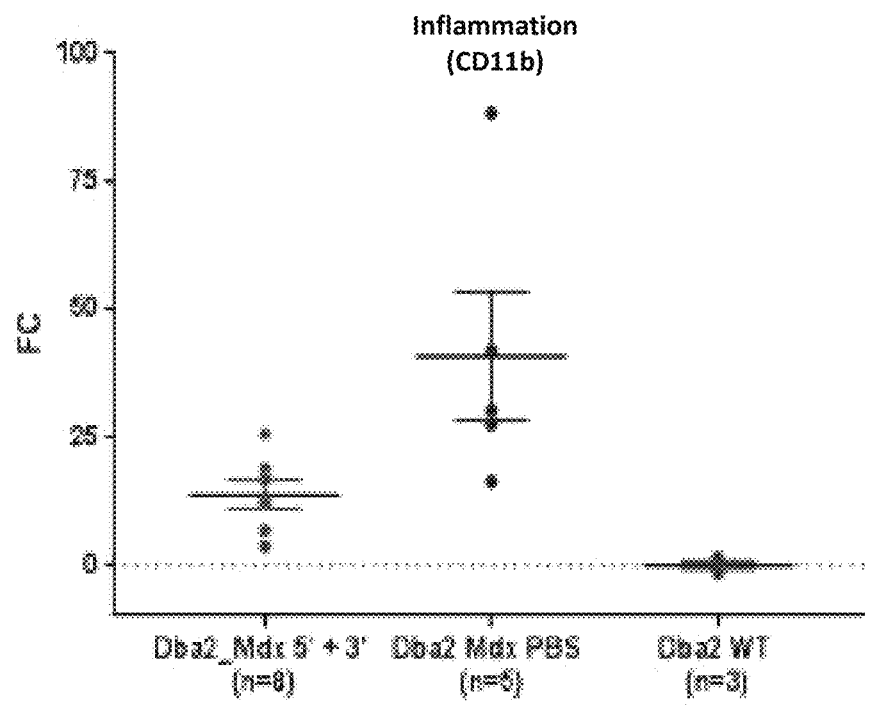
Figure 4B:
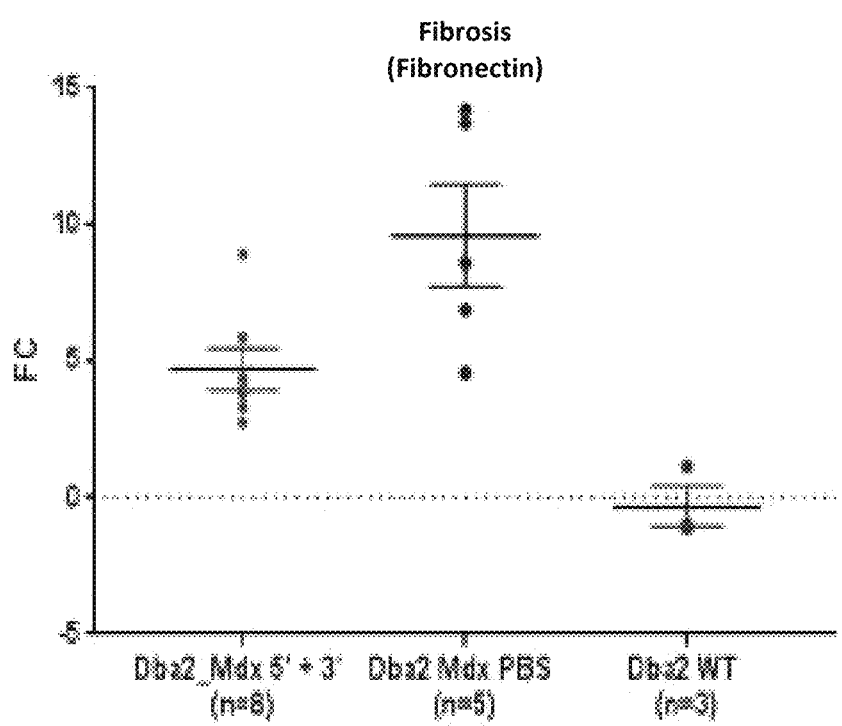

In order to evaluate the therapeutic effect of the quasidystrophin according to the invention administered by intravenous injection, TA sections were stained with HPS which reveals the general state of a tissue, especially inflammation, fiber regeneration, fibrosis. When compared to wt and mdx mice, the deficient mice expressing the quasidystrophin of the invention show an intermediate profile (FIG. 4A). This observation was corroborated by the measurement of relevant markers (see FIG. 4B). An improvement can be observed with a level in treated animals between the level observed in wt and mdx mice for each criteria.

3-2 in the Heart

Besides its beneficial effects on muscles as reported above, the transgenic quasidystrophin according to the invention is also expressed in the heart of the injected mice (see FIG. 5).

B/ Using WL1 Cor

It has been noticed that codon optimization of WL1 resulted in two mutations in WL1 ORF (R49S and F748S). Therefore, the corresponding sequence in the 5'AAV vector (SEQ ID NO: 6) have been corrected (AGC at position 790 converted into AGG and TCT at position 2887 converted into TTC).

The experiments have then be repeated using both constructs: the new (cor) Dual Dys vector system (mutations corrected; 5'cor+3') corresponding to WL1 Cor (SEQ ID NO: 22) and the old (mut) Dual Dys vector system (5'mut+3', n=5) corresponding to WL1 Opt (SEQ ID NO: 5).

As shown in FIG. 6A/6B and even at an early stage after intravenous injection (3 weeks), proper quasidystrophin production was observed with both dual AAV vector systems in the tibialis anterior and diaphragm muscles.

With respect to the level of expression, it appears that the new (cor) Dual Dys vector system (mutations corrected; 5'cor+3'), i.e. the optimized version encoding the native quasidystrophin, gives promising results.

With respect to the therapeutic effect of the quasidystrophins so produced, FIG. 7 confirms that both constructs give rise to similar profiles of the treated mice, i.e. an amelioration in relevant markers for regeneration, inflammation and fibrosis.

The invention claimed is:

1. A dual AAV vector system comprising two AAV vectors, wherein
a first AAV vector comprises, between 5' and 3' AAV ITRs, a first nucleic acid sequence that encodes a N-terminal part of a quasidystrophin, and
a second AAV vector comprises, between 5' and 3' AAV ITRs, a second nucleic acid sequence that encodes a C-terminal part of a quasidystrophin,
wherein the first and second nucleic acid sequences comprise an overlapping region that permits the production by recombination of the quasidystrophin, wherein the quasidystrophin is encoded by a sequence according to SEQ ID NO: 22.

2. The dual AAV vector system according to claim 1, wherein the first nucleic acid sequence has the sequence SEQ ID NO: 6 or SEQ ID NO: 23 and the second nucleic acid sequence has the sequence SEQ ID NO: 7.

3. The dual AAV vector system according to claim 1, wherein the first nucleic acid sequence has the sequence SEQ ID NO: 8 and the second nucleic acid sequence has the sequence SEQ ID NO: 9.

4. A cell transduced with the dual AAV vector system according to claim 1.

5. The cell of claim 4, wherein the cell is a muscle cell.

6. A composition comprising, in a pharmaceutically acceptable carrier, the dual AAV vector system according to claim 1.

7. The composition according to claim 6, wherein the dual AAV vector system is present in a cell into which it has been transduced.

8. An AAV vector which is the first AAV vector or the second AAV vector of the dual AAV vector system according to claim 1.

9. A method of treating muscular dystrophy in a subject in need thereof comprising administering to the subject a therapeutically effective amount of a recombinant AAV comprising the polynucleotide sequence of claim 1.

10. The method of claim 9, wherein the muscular dystrophy is Duchenne muscular dystrophy (DMD).

* * * * *